United States Patent
Li et al.

(10) Patent No.: US 10,264,483 B2
(45) Date of Patent: Apr. 16, 2019

(54) GROUP COMMUNICATION METHOD, APPARATUS, AND SYSTEM

(71) Applicant: Huawei Technologies Co., Ltd., Shenzhen (CN)

(72) Inventors: Zhiming Li, Reading (GB); Longyu Cao, Shanghai (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 15/656,629

(22) Filed: Jul. 21, 2017

(65) Prior Publication Data

US 2017/0325118 A1 Nov. 9, 2017

Related U.S. Application Data

(63) Continuation of application No. PCT/CN2015/071431, filed on Jan. 23, 2015.

(51) Int. Cl.
*H04L 12/18* (2006.01)
*H04W 4/06* (2009.01)
(Continued)

(52) U.S. Cl.
CPC ....... *H04W 28/0252* (2013.01); *H04L 12/185* (2013.01); *H04L 12/1845* (2013.01);
(Continued)

(58) Field of Classification Search
CPC ...... H04L 12/1845; H04W 4/06; H04W 76/40
See application file for complete search history.

(56) References Cited

U.S. PATENT DOCUMENTS

| 2013/0194999 | A1 | 8/2013 | Anchan | |
|---|---|---|---|---|
| 2017/0251342 | A1* | 8/2017 | Bhalla | H04W 4/08 |
| 2018/0206137 | A1* | 7/2018 | Ryu | H04W 4/06 |

FOREIGN PATENT DOCUMENTS

| CN | 102264037 A | 11/2011 |
|---|---|---|
| CN | 102857873 A | 1/2013 |

(Continued)

OTHER PUBLICATIONS

"3rd Generation Partnership Project; Technical Specification Group Radio Access Network; Feasibility study for Further Advancements for E-UTRA (LTE-Advanced) (Release 12)," 3GPP TR 36.912 V12.0.0, pp. 1-62, 3rd Generation Partnership Project, Valbonne, France (Sep. 2014).

(Continued)

*Primary Examiner* — Hoon J Chung
(74) *Attorney, Agent, or Firm* — Leydig, Voit & Mayer, Ltd.

(57) ABSTRACT

The present invention relates to the communications field and provides a group communication method. The method includes: obtaining location information of UE; when determining that an L-BM-SC is deployed at a location of an eNB to which the UE belongs, determining, according to the location information of the UE, an MCE that manages the eNB to which the UE belongs; and sending a first bearer activation request to the MCE, where the first bearer activation request includes the location information of the UE, so that the MCE determines, according to the location information of the UE, a first L-BM-SC deployed at the location of the eNB to which the UE belongs, and establishes a bearer between the first L-BM-SC and a GCS AS, where the bearer between the first L-BM-SC and the GCS AS is used by the GCS AS to send a packet to the first L-BM-SC.

20 Claims, 23 Drawing Sheets

(51) Int. Cl.
H04W 28/02 (2009.01)
H04L 29/06 (2006.01)
H04W 12/04 (2009.01)
H04W 76/40 (2018.01)
H04W 88/02 (2009.01)
H04W 48/20 (2009.01)

(52) U.S. Cl.
CPC .............. *H04L 63/06* (2013.01); *H04W 4/06* (2013.01); *H04W 12/04* (2013.01); *H04W 76/40* (2018.02); *H04W 48/20* (2013.01); *H04W 88/02* (2013.01)

(56) References Cited

FOREIGN PATENT DOCUMENTS

EP 2326110 A1 5/2011
WO 2014017789 A1 1/2014

OTHER PUBLICATIONS

"GCSE requirements fulfilment for eMBMS" 3GPP TSG-RAN WG2 #83bis, Ljubljana, Slovenia, R2-133396, 3rd Generation Partnership Project, Valbonne, France (Oct. 7-11, 2013).

"3rd Generation Partnership Project; Technical Specification Group Services and System Aspects; Multimedia Broadcast/Multicast Service (MBMS); Architecture and functional description (Release 12)," 3GPP TS 23.246 V12.4.0, 3rd Generation Partnership Project, Valbonne, France (Dec. 2014).

"3rd Generation Partnership Project; Technical Specification Group Services and System Aspects; Group Communication System Enablers for LTE (GCSE_LTE); Stage 2 (Release 12)," 3GPP TS 23.468 V12.3.0, 3rd Generation Partnership Project, Valbonne, France (Dec. 2014).

"3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.4.0, 3rd Generation Partnership Project, Valbonne, France (Dec. 2014).

* cited by examiner

GROUP COMMUNICATION METHOD, APPARATUS, AND SYSTEM

CROSS-REFERENCE TO RELATED APPLICATIONS

This application is a continuation of International Application No. PCT/CN2015/071431, filed on Jan. 23, 2015, the disclosure of which is hereby incorporated by reference in its entirety.

TECHNICAL FIELD

The present invention relates to the communications field, and in particular, to a group communication method, apparatus, and system.

BACKGROUND

A group communication system (GCS) is a communications system with a scheduling capability. In the group communication system, data transmission may be performed in a unicast transmission manner or a multicast transmission manner. When data transmission is performed in a multicast transmission manner in group communication in Long Term Evolution (LTE), data transmission is usually performed by using a multimedia broadcast/multicast service (MBMS).

A GCS in LTE usually includes an evolved NodeB (eNB), a group communication service application server (GCS AS), and a broadcast/multicast service center (BM-SC). An eNB at a transmit end sends received data to the GCS AS. The GCS AS determines to send the received data to an eNB at a receive end in a unicast transmission manner or a multicast transmission manner. There is usually one eNB at the receive end in the unicast transmission manner, and there are usually multiple eNBs at the receive end in the multicast transmission manner. When the GCS AS determines to send the received data to the eNB at the receive end in the multicast transmission manner, the GCS AS sends the data to the BM-SC, and the BM-SC sends the data to multiple eNBs at the receive end in the multicast transmission manner.

When data transmission is performed in the multicast transmission manner, to ensure that data can be simultaneously transmitted to multiple eNBs at the receive end, when sending the data, the BM-SC needs to determine a relatively long synchronization cycle according to factors such as lengths of different paths between the BM-SC and the multiple eNBs at the receive end, so as to send the data. Consequently, a data transmission delay is relatively large. The synchronization cycle is a minimum time interval by using which the multiple eNBs at the receive end can receive the data sent by the BM-SC.

SUMMARY

To resolve a problem that a data transmission delay is relatively large in the prior art, embodiments of the present invention provide a group communication method, apparatus, and system. The technical solutions are as follows:

According to a first aspect, a group communication method is provided and is applied to a system device, where the system device is located in a group communication system GCS in Long Term Evolution LTE, and the method includes:

obtaining location information of user equipment UE;

when determining that a local broadcast/multicast service center L-BM-SC is deployed at a location of an evolved NodeB eNB to which the UE belongs, determining, according to the location information of the UE, a multi-cell/multicast coordination entity MCE that manages the eNB to which the UE belongs; and sending a first bearer activation request to the MCE, where the first bearer activation request includes the location information of the UE, so that the MCE determines, according to the location information of the UE, a first L-BM-SC deployed at the location of the eNB to which the UE belongs, and establishes a bearer between the first L-BM-SC and a group communication service application server GCS AS, where the bearer between the first L-BM-SC and the GCS AS is used by the GCS AS to send a packet to the first L-BM-SC.

With reference to the first aspect, in a first possible implementation of the first aspect, the determining, according to the location information of the UE, a multi-cell/multicast coordination entity MCE that manages the eNB to which the UE belongs includes:

querying a locally configured correspondence between location information and an MCE according to the location information of the UE; and using, as the MCE that manages the eNB to which the UE belongs, an MCE that is obtained by means of query and is corresponding to the location information of the UE.

With reference to the first aspect or the first possible implementation of the first aspect, in a second possible implementation of the first aspect, after the sending a first bearer activation request to the MCE, the method further includes:

receiving a first bearer response message sent by the MCE, where the first bearer response message includes an address of the first L-BM-SC; and determining, according to the first bearer response message, that the bearer between the first L-BM-SC and the GCS AS is successfully established.

With reference to the second possible implementation of the first aspect, in a third possible implementation of the first aspect, when the system device is the GCS AS, before the determining that a local broadcast/multicast service center L-BM-SC is deployed at a location of an evolved NodeB eNB to which the UE belongs, the method further includes:

receiving indication information reported by the UE, where the indication information includes capability indication information, and the capability indication information is used to indicate that the UE is capable of performing multicast transmission; and determining, according to the capability indication information, that the UE is capable of performing multicast transmission.

With reference to the third possible implementation of the first aspect, in a fourth possible implementation of the first aspect, the obtaining location information of UE includes:

receiving the indication information reported by the UE, where the indication information further includes the location information of the UE; or when the capability indication information indicates that the UE is capable of performing multicast transmission, obtaining the location information of the UE from a policy and charging rules function PCRF unit.

With reference to the third possible implementation of the first aspect or the fourth possible implementation of the first aspect, in a fifth possible implementation of the first aspect, the first bearer activation request further includes a first security key, and the first security key is generated by the GCS AS when the GCS AS determines that the GCS AS generates a security key; or the first bearer activation request does not include a security key, the first bearer response message further includes a second security key, the second security key is generated by the first L-BM-SC when the first L-BM-SC determines that a second bearer activation request does not include a security key, and is sent by the first L-BM-SC to the MCE, and the first bearer activation request does not include a security key when the GCS AS determines that the first L-BM-SC generates the security key.

With reference to the third possible implementation of the first aspect, or the fourth possible implementation of the first aspect, or the fifth possible implementation of the first aspect, in a sixth possible implementation of the first aspect, the first bearer activation request further includes a first group identity, the first group identity is used to identify a group of the UE, the first group identity is preallocated by an original broadcast/multicast service center BM-SC to the group of the UE and is stored by the GCS AS, and the original BM-SC is used to perform data transmission between the GCS AS and each eNB; or the first bearer response message further includes a second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

With reference to the second possible implementation of the first aspect, in a seventh possible implementation of the first aspect, when the first L-BM-SC is obtained by establishing a new broadcast/multicast service center BM-SC at the location of the eNB to which the UE belongs, the system device is an original BM-SC, and the original BM-SC is used to perform data transmission between the GCS AS and each eNB, the obtaining location information of user equipment UE includes:

receiving a third bearer activation request sent by the GCS AS, where the third bearer activation request includes the location information of the UE, and the third bearer activation request is sent by the GCS AS when the GCS AS determines that the UE is capable of performing multicast transmission; and extracting the location information of the UE from the third bearer activation request.

With reference to the seventh possible implementation of the first aspect, in an eighth possible implementation of the first aspect, after the receiving a first bearer response message sent by the MCE, the method further includes:

sending a third bearer response message to the GCS AS, where the third bearer response message includes the address of the first L-BM-SC, so that the GCS AS sends a packet to the first L-BM-SC by using the bearer between the first L-BM-SC and the GCS AS.

With reference to the eighth possible implementation of the first aspect, in a ninth possible implementation of the first aspect, when the first L-BM-SC is obtained by establishing a new BM-SC at the location of the eNB to which the UE belongs, and the system device is a mobility management entity MME, the obtaining location information of user equipment UE includes:

receiving a third bearer activation request sent by an original BM-SC by using an original multimedia broadcast/multicast service gateway MBMS GW, where the third bearer activation request includes the location information of the UE, the third bearer activation request is sent by the GCS AS to the original MBMS GW when the GCS AS determines that the UE is capable of being switched between unicast transmission and multicast transmission, and is forwarded by the original MBMS GW to the original BM-SC, and the original BM-SC and the original MBMS GW are used to perform data transmission between the GCS AS and each eNB; and extracting the location information of the UE from the third bearer activation request.

With reference to the ninth possible implementation of the first aspect, in a tenth possible implementation of the first aspect, after the receiving a first bearer response message sent by the MCE, the method further includes:

sending a third bearer response message to the original BM-SC by using the original MBMS GW, where the third bearer response message includes the address of the first L-BM-SC, so that the original BM-SC sends the third bearer response message to the GCS AS, and triggers the GCS AS to send a packet to the first L-BM-SC by using the bearer between the first L-BM-SC and the GCS AS.

With reference to the seventh possible implementation of the first aspect or the ninth possible implementation of the first aspect, in an eleventh possible implementation of the first aspect, the third bearer activation request further includes a first security key, the first bearer activation request further includes the first security key, and the first security key is generated by the GCS AS when the GCS AS determines that the GCS AS generates a security key.

With reference to the eighth possible implementation of the first aspect or the tenth possible implementation of the first aspect, in a twelfth possible implementation of the first aspect, the first bearer response message further includes a second security key, the third bearer response message further includes the second security key, the second security key is generated by the first L-BM-SC when the first L-BM-SC determines that a second bearer activation request does not include a security key, and is sent by the first L-BM-SC to the MCE, and the second bearer activation request does not include a security key when the GCS AS determines that the first L-BM-SC generates a security key.

With reference to the seventh possible implementation of the first aspect, or the ninth possible implementation of the first aspect, or the eleventh possible implementation of the first aspect, in a thirteenth possible implementation of the first aspect, the third bearer activation request further includes a first group identity, the first bearer activation request further includes the first group identity, the first group identity is used to identify a group of the UE, and the first group identity is preallocated by the original BM-SC to the group of the UE and is stored by the GCS AS.

With reference to the eighth possible implementation of the first aspect, or the tenth possible implementation of the first aspect, or the twelfth possible implementation of the first aspect, in a fourteenth possible implementation of the first aspect, the first bearer response message further includes a second group identity, the third bearer response message further includes the second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

With reference to the third possible implementation of the first aspect, or the fourth possible implementation of the first aspect, or the fifth possible implementation of the first aspect, or the sixth possible implementation of the first aspect, in a fifteenth possible implementation of the first aspect, the first L-BM-SC is obtained by moving the original broadcast/multicast service center BM-SC to the location of the eNB to which the UE belongs; or the first L-BM-SC is obtained by establishing a new broadcast/multicast service center BM-SC at the location of the eNB to which the UE belongs.

According to a second aspect, a group communication method is provided and is applied to a multi-cell/multicast coordination entity MCE, where the MCE is located in a group communication system GCS in Long Term Evolution LTE, and the method includes:

receiving a first bearer activation request sent by a system device, where the first bearer activation request includes location information of user equipment UE, and the first bearer activation request is sent by the system device after the system device performs a step that when the system device determines that a local broadcast/multicast service center L-BM-SC is deployed at a location of an evolved NodeB eNB to which the UE belongs, the system device determines, according to the location information of the UE, an MCE that manages the eNB to which the UE belongs;

determining, according to the location information of the UE, a first local broadcast/multicast service center L-BM-SC deployed at the location of the eNB to which the UE belongs; and establishing a bearer between the first L-BM-SC and a group communication service application server GCS AS, where the bearer between the first L-BM-SC and the GCS AS is used by the GCS AS to send a packet to the first L-BM-SC.

With reference to the second aspect, in a first possible implementation of the second aspect, the determining, according to the location information of the UE, a first local broadcast/multicast service center L-BM-SC deployed at the location of the eNB to which the UE belongs includes:

querying a locally configured correspondence between location information and an L-BM-SC according to the location information of the UE; and using, as the first L-BM-SC deployed at the location of the eNB to which the UE belongs, an L-BM-SC that is obtained by means of query and is corresponding to the location information of the UE.

With reference to the second aspect, in a second possible implementation of the second aspect, when the system device is a management mobility entity MME, before the determining, according to the location information of the UE, a first local broadcast/multicast service center L-BM-SC deployed at the location of the eNB to which the UE belongs, the method further includes:

detecting whether an L-BM-SC is deployed at the location of the eNB to which the UE belongs.

With reference to the second aspect, or the first possible implementation of the second aspect, or the second possible implementation of the second aspect, in a third possible implementation of the second aspect, the establishing a bearer between the first L-BM-SC and a group communication service application server GCS AS includes:

sending a second bearer activation request to the first L-BM-SC, so that the first L-BM-SC sends a second bearer response message to the MCE according to an address of the first L-BM-SC, where the second bearer response message includes the address of the first L-BM-SC; and sending the first bearer response message to the system device, so that the system device determines, according to the first bearer response message, that the bearer between the first L-BM-SC and the GCS AS is successfully established, where the first bearer response message is sent by the MCE after the MCE receives the second bearer response message sent by the first L-BM-SC, and the first bearer response message includes the address of the first L-BM-SC.

With reference to the third possible implementation of the second aspect, in a fourth possible implementation of the second aspect, when the system device is the GCS AS, an original broadcast/multicast service center BM-SC, or a mobility management entity MME, and the original BM-SC is used to perform data transmission between the GCS AS and each eNB, the first bearer activation request further includes a first security key, the second bearer activation request further includes the first security key, and the first security key is generated by the GCS AS when the GCS AS determines that the GCS AS generates a security key; or the second bearer response message further includes a second security key, the first bearer response message further includes the second security key, the second security key is generated by the first L-BM-SC when the first L-BM-SC determines that the second bearer activation request does not include a security key, and the second bearer activation request does not include a security key when the GCS AS determines that the first L-BM-SC generates a security key.

With reference to the third possible implementation of the second aspect or the fourth possible implementation of the second aspect, in a fifth possible implementation of the second aspect, when the system device is the GCS AS, an original broadcast/multicast service center BM-SC, or a mobility management entity MME, and the original BM-SC is used to perform data transmission between the GCS AS and each eNB, the first bearer activation request further includes a first group identity, the second bearer activation request further includes the first group identity, the first group identity is used to identify a group of the UE, and the first group identity is preallocated by the original BM-SC to the group of the UE and is stored by the GCS AS; or the second bearer response message further includes a second group identity, the first bearer response message further includes the second group identity, the second group identity is used to identify a group of the UE, and the second group identity is allocated by the first L-BM-SC to the group of the UE when the first L-BM-SC determines that the second bearer activation request does not include a group identity.

According to a third aspect, a group communication apparatus is provided and is applied to a system device, where the system device is located in a group communication system GCS in Long Term Evolution LTE, and the group communication apparatus includes:

an obtaining module, configured to obtain location information of user equipment UE;

a first determining module, configured to: when determining that a local broadcast/multicast service center L-BM-SC is deployed at a location of an evolved NodeB eNB to which the UE belongs, determine, according to the location information of the UE, a multi-cell/multicast coordination entity MCE that manages the eNB to which the UE belongs; and a first sending module, configured to send a first bearer activation request to the MCE, where the first bearer activation request includes the location information of the UE, so that the MCE determines, according to the location information of the UE, a first L-BM-SC deployed at the location of the eNB to which the UE belongs, and establishes a bearer between the first L-BM-SC and a group communication service application server GCS AS, where the bearer between the first L-BM-SC and the GCS AS is used by the GCS AS to send a packet to the first L-BM-SC.

With reference to the third aspect, in a first possible implementation of the third aspect, the first determining module includes:

a querying unit, configured to query a locally configured correspondence between location information and an MCE according to the location information of the UE; and a determining unit, configured to use, as the MCE that manages the eNB to which the UE belongs, an MCE that is obtained by means of query and is corresponding to the location information of the UE.

With reference to the third aspect or the first possible implementation of the third aspect, in a second possible implementation of the third aspect, the group communication apparatus further includes:

a first receiving module, configured to receive a first bearer response message sent by the MCE, where the first bearer response message includes an address of the first L-BM-SC; and a second determining module, configured to determine, according to the first bearer response message, that the bearer between the first L-BM-SC and the GCS AS is successfully established.

With reference to the second possible implementation of the third aspect, in a third possible implementation of the third aspect, when the system device is the GCS AS, the group communication apparatus further includes:

a second receiving module, configured to receive indication information reported by the UE, where the indication information includes capability indication information, and the capability indication information is used to indicate that the UE is capable of performing multicast transmission; and a third determining module, configured to determine, according to the capability indication information, that the UE is capable of performing multicast transmission.

With reference to the third possible implementation of the third aspect, in a fourth possible implementation of the third aspect, the obtaining module includes:

a first receiving unit, configured to receive the indication information reported by the UE, where the indication information further includes the location information of the UE; or an obtaining unit, configured to: when the capability indication information indicates that the UE is capable of performing multicast transmission, obtain the location information of the UE from a policy and charging rules function PCRF unit.

With reference to the third possible implementation of the third aspect or the fourth possible implementation of the third aspect, in a fifth possible implementation of the third aspect, the first bearer activation request further includes a first security key, and the first security key is generated by the GCS AS when the GCS AS determines that the GCS AS generates a security key; or the first bearer activation request does not include a security key, the first bearer response message further includes a second security key, the second security key is generated by the first L-BM-SC when the first L-BM-SC determines that a second bearer activation request does not include a security key, and is sent by the first L-BM-SC to the MCE, and the first bearer activation request does not include a security key when the GCS AS determines that the first L-BM-SC generates the security key.

With reference to the third possible implementation of the third aspect, or the fourth possible implementation of the third aspect, or the fifth possible implementation of the third aspect, in a sixth possible implementation of the third aspect, the first bearer activation request further includes a first group identity, the first group identity is used to identify a group of the UE, the first group identity is preallocated by an original broadcast/multicast service center BM-SC to the group of the UE and is stored by the GCS AS, and the original BM-SC is used to perform data transmission between the GCS AS and each eNB; or the first bearer response message further includes a second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

With reference to the second possible implementation of the third aspect, in a seventh possible implementation of the third aspect, when the first L-BM-SC is obtained by establishing a new broadcast/multicast service center BM-SC at the location of the eNB to which the UE belongs, the system device is an original BM-SC, and the original BM-SC is used to perform data transmission between the GCS AS and each eNB, the obtaining module includes:

a second receiving unit, configured to receive a third bearer activation request sent by the GCS AS, where the third bearer activation request includes the location information of the UE, and the third bearer activation request is sent by the GCS AS when the GCS AS determines that the UE is capable of performing multicast transmission; and a first extraction unit, configured to extract the location information of the UE from the third bearer activation request.

With reference to the seventh possible implementation of the third aspect, in an eighth possible implementation of the third aspect, the group communication apparatus further includes:

a second sending module, configured to send a third bearer response message to the GCS AS, where the third bearer response message includes the address of the first L-BM-SC, so that the GCS AS sends a packet to the first L-BM-SC by using the bearer between the first L-BM-SC and the GCS AS.

With reference to the eighth possible implementation of the third aspect, in a ninth possible implementation of the third aspect, when the first L-BM-SC is obtained by establishing a new BM-SC at the location of the eNB to which the UE belongs, and the system device is a mobility management entity MME, the obtaining module includes:

a third receiving unit, configured to receive a third bearer activation request sent by an original BM-SC by using an original multimedia broadcast/multicast service gateway MBMS GW, where the third bearer activation request includes the location information of the UE, the third bearer activation request is sent by the GCS AS to the original MBMS GW when the GCS AS determines that the UE is capable of being switched between unicast transmission and multicast transmission, and is forwarded by the original MBMS GW to the original BM-SC, and the original BM-SC and the original MBMS GW are used to perform data transmission between the GCS AS and each eNB; and a second extraction unit, configured to extract the location information of the UE from the third bearer activation request.

With reference to the ninth possible implementation of the third aspect, in a tenth possible implementation of the third aspect, the group communication apparatus further includes:

a third sending module, configured to send a third bearer response message to the original BM-SC by using the original MBMS GW, where the third bearer response message includes the address of the first L-BM-SC, so that the original BM-SC sends the third bearer response message to the GCS AS, and triggers the GCS AS to send a packet to the first L-BM-SC by using the bearer between the first L-BM-SC and the GCS AS.

With reference to the seventh possible implementation of the third aspect or the ninth possible implementation of the third aspect, in an eleventh possible implementation of the third aspect, the third bearer activation request further includes a first security key, the first bearer activation request further includes the first security key, and the first security key is generated by the GCS AS when the GCS AS determines that the GCS AS generates a security key.

With reference to the eighth possible implementation of the third aspect or the tenth possible implementation of the third aspect, in a twelfth possible implementation of the third aspect, the first bearer response message further includes a second security key, the third bearer response message further includes the second security key, the second security key is generated by the first L-BM-SC when the first L-BM-SC determines that a second bearer activation request does not include a security key, and is sent by the first L-BM-SC to the MCE, and the second bearer activation request does not include a security key when the GCS AS determines that the first L-BM-SC generates a security key.

With reference to the seventh possible implementation of the third aspect, or the ninth possible implementation of the third aspect, or the eleventh possible implementation of the third aspect, in a thirteenth possible implementation of the third aspect, the third bearer activation request further includes a first group identity, the first bearer activation request further includes the first group identity, the first group identity is used to identify a group of the UE, and the first group identity is preallocated by the original BM-SC to the group of the UE and is stored by the GCS AS.

With reference to the eighth possible implementation of the third aspect, or the tenth possible implementation of the third aspect, or the twelfth possible implementation of the third aspect, in a fourteenth possible implementation of the third aspect, the first bearer response message further includes a second group identity, the third bearer response message further includes the second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

With reference to the third possible implementation of the third aspect, or the fourth possible implementation of the third aspect, or the fifth possible implementation of the third aspect, or the sixth possible implementation of the third aspect, in a fifteenth possible implementation of the third aspect, the first L-BM-SC is obtained by moving the original broadcast/multicast service center BM-SC to the location of the eNB to which the UE belongs; or the first L-BM-SC is obtained by establishing a new broadcast/multicast service center BM-SC at the location of the eNB to which the UE belongs.

According to a fourth aspect, a group communication apparatus is provided and is applied to a multi-cell/multicast coordination entity MCE, where the MCE is located in a group communication system GCS in Long Term Evolution LTE, and the group communication apparatus includes:

a receiving module, configured to receive a first bearer activation request sent by a system device, where the first bearer activation request includes location information of user equipment UE, and the first bearer activation request is sent by the system device after the system device performs a step that when the system device determines that a local broadcast/multicast service center L-BM-SC is deployed at a location of an evolved NodeB eNB to which the UE belongs, the system device determines, according to the location information of the UE, an MCE that manages the eNB to which the UE belongs;

a determining module, configured to determine, according to the location information of the UE, a first local broadcast/multicast service center L-BM-SC deployed at the location of the eNB to which the UE belongs; and an establishment module, configured to establish a bearer between the first L-BM-SC and a group communication service application server GCS AS, where the bearer between the first L-BM-SC and the GCS AS is used by the GCS AS to send a packet to the first L-BM-SC.

With reference to the fourth aspect, in a first possible implementation of the fourth aspect, the determining module includes: a querying unit, configured to query a locally configured correspondence between location information and an L-BM-SC according to the location information of the UE; and a determining unit, configured to use, as the first L-BM-SC deployed at the location of the eNB to which the UE belongs, an L-BM-SC that is obtained by means of query and is corresponding to the location information of the UE.

With reference to the fourth aspect, in a second possible implementation of the fourth aspect, when the system device is a management mobility entity MME, the group communication apparatus further includes:

a detection module, configured to detect whether an L-BM-SC is deployed at the location of the eNB to which the UE belongs.

With reference to the fourth aspect, or the first possible implementation of the fourth aspect, or the second possible implementation of the fourth aspect, in a third possible implementation of the fourth aspect, the establishment module includes: a first sending unit, configured to send a second bearer activation request to the first L-BM-SC, so that the first L-BM-SC sends a second bearer response message to the MCE according to an address of the first L-BM-SC, where the second bearer response message includes the address of the first L-BM-SC; and a second sending unit, configured to send the first bearer response message to the system device, so that the system device determines, according to the first bearer response message, that the bearer between the first L-BM-SC and the GCS AS is successfully established, where the first bearer response message is sent by the MCE after the MCE receives the second bearer response message sent by the first L-BM-SC, and the first bearer response message includes the address of the first L-BM-SC.

With reference to the third possible implementation of the fourth aspect, in a fourth possible implementation of the fourth aspect, when the system device is the GCS AS, an original broadcast/multicast service center BM-SC, or a mobility management entity MME, and the original BM-SC is used to perform data transmission between the GCS AS and each eNB, the first bearer activation request further includes a first security key, the second bearer activation request further includes the first security key, and the first security key is generated by the GCS AS when the GCS AS determines that the GCS AS generates a security key; or the second bearer response message further includes a second security key, the first bearer response message further includes the second security key, the second security key is generated by the first L-BM-SC when the first L-BM-SC determines that the second bearer activation request does not include a security key, and the second bearer activation request does not include a security key when the GCS AS determines that the first L-BM-SC generates a security key.

With reference to the third possible implementation of the fourth aspect or the fourth possible implementation of the fourth aspect, in a fifth possible implementation of the fourth aspect, when the system device is the GCS AS, an original broadcast/multicast service center BM-SC, or a mobility management entity MME, and the original BM-SC is used to perform data transmission between the GCS AS and each eNB, the first bearer activation request further includes a first group identity, the second bearer activation request further includes the first group identity, the first group identity is used to identify a group of the UE, and the first group identity is preallocated by the original BM-SC to the group of the UE and is stored by the GCS AS; or the second bearer response message further includes a second group identity, the first bearer response message further includes the second group identity, the second group identity is used to identify a group of the UE, and the second group identity is allocated by the first L-BM-SC to the group of the UE when the first L-BM-SC determines that the second bearer activation request does not include a group identity.

According to a fifth aspect, a group communication apparatus is provided and is applied to a system device, where the system device is located in a group communication system GCS in Long Term Evolution LTE, and the group communication apparatus includes a processor and a transmitter, where the processor is configured to obtain location information of user equipment UE;

the processor is further configured to: when determining that a local broadcast/multicast service center L-BM-SC is deployed at a location of an evolved NodeB eNB to which the UE belongs, determine, according to the location information of the UE, a multi-cell/multicast coordination entity MCE that manages the eNB to which the UE belongs; and the transmitter is configured to send a first bearer activation request to the MCE, where the first bearer activation request includes the location information of the UE, so that the MCE determines, according to the location information of the UE, a first L-BM-SC deployed at the location of the eNB to which the UE belongs, and establishes a bearer between the first L-BM-SC and a group communication service application server GCS AS, where the bearer between the first L-BM-SC and the GCS AS is used by the GCS AS to send a packet to the first L-BM-SC.

With reference to the fifth aspect, in a first possible implementation of the fifth aspect, the processor is further configured to query a locally configured correspondence between location information and an MCE according to the location information of the UE; and the processor is further configured to use, as the MCE that manages the eNB to which the UE belongs, an MCE that is obtained by means of query and is corresponding to the location information of the UE.

With reference to the fifth aspect or the first possible implementation of the fifth aspect, in a second possible implementation of the fifth aspect, the group communication apparatus further includes a receiver;

the receiver is configured to receive a first bearer response message sent by the MCE, where the first bearer response message includes an address of the first L-BM-SC; and the processor is further configured to determine, according to the first bearer response message, that the bearer between the first L-BM-SC and the GCS AS is successfully established.

With reference to the second possible implementation of the fifth aspect, in a third possible implementation of the fifth aspect, when the system device is the GCS AS, the receiver is further configured to receive indication information reported by the UE, where the indication information includes capability indication information, and the capability indication information is used to indicate that the UE is capable of performing multicast transmission; and the processor is further configured to determine, according to the capability indication information, that the UE is capable of performing multicast transmission.

With reference to the third possible implementation of the fifth aspect, in a fourth possible implementation of the fifth aspect, the processor is further configured to receive the indication information reported by the UE, where the indication information further includes the location information of the UE; or the processor is further configured to: when the capability indication information indicates that the UE is capable of performing multicast transmission, obtain the location information of the UE from a policy and charging rules function PCRF unit.

With reference to the third possible implementation of the fifth aspect or the fourth possible implementation of the fifth aspect, in a fifth possible implementation of the fifth aspect, the first bearer activation request further includes a first security key, and the first security key is generated by the GCS AS when the GCS AS determines that the GCS AS generates a security key; or the first bearer activation request does not include a security key, the first bearer response message further includes a second security key, the second security key is generated by the first L-BM-SC when the first L-BM-SC determines that a second bearer activation request does not include a security key, and is sent by the first L-BM-SC to the MCE, and the first bearer activation request does not include a security key when the GCS AS determines that the first L-BM-SC generates the security key.

With reference to the third possible implementation of the fifth aspect, or the fourth possible implementation of the fifth aspect, or the fifth possible implementation of the fifth aspect, in a sixth possible implementation of the fifth aspect, the first bearer activation request further includes a first group identity, the first group identity is used to identify a group of the UE, the first group identity is preallocated by a broadcast/multicast service center BM-SC to the group of the UE and is stored by the GCS AS, and the original BM-SC is used to perform data transmission between the GCS AS and each eNB; or the first bearer response message further includes a second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

With reference to the second possible implementation of the fifth aspect, in a seventh possible implementation of the fifth aspect, when the first L-BM-SC is obtained by establishing a new broadcast/multicast service center BM-SC at the location of the eNB to which the UE belongs, the system device is an original BM-SC, and the original BM-SC is used to perform data transmission between the GCS AS and each eNB, the processor is further configured to receive a third bearer activation request sent by the GCS AS, where the third bearer activation request includes the location information of the UE, and the third bearer activation request is sent by the GCS AS when the GCS AS determines that the UE is capable of performing multicast transmission; and the processor is further configured to extract the location information of the UE from the third bearer activation request.

With reference to the seventh possible implementation of the fifth aspect, in an eighth possible implementation of the fifth aspect, the transmitter is further configured to send a third bearer response message to the GCS AS, where the third bearer response message includes the address of the first L-BM-SC, so that the GCS AS sends a packet to the first L-BM-SC by using the bearer between the first L-BM-SC and the GCS AS.

With reference to the eighth possible implementation of the fifth aspect, in a ninth possible implementation of the fifth aspect, when the first L-BM-SC is obtained by establishing a new BM-SC at the location of the eNB to which the UE belongs, and the system device is a mobility management entity MME, the processor is further configured to receive a third bearer activation request sent by an original BM-SC by using an original multimedia broadcast/multicast service gateway MBMS GW, where the third bearer activation request includes the location information of the UE, the third bearer activation request is sent by the GCS AS to the original MBMS GW when the GCS AS determines that the UE is capable of being switched between unicast transmission and multicast transmission, and is forwarded by the original MBMS GW to the original BM-SC, and the original BM-SC and the original MBMS GW are used to perform data transmission between the GCS AS and each eNB; and the processor is further configured to extract the location information of the UE from the third bearer activation request.

With reference to the ninth possible implementation of the fifth aspect, in a tenth possible implementation of the fifth aspect, the transmitter is further configured to send a third bearer response message to the original BM-SC by using the original MBMS GW, where the third bearer response message includes the address of the first L-BM-SC, so that the original BM-SC sends the third bearer response message to the GCS AS, and triggers the GCS AS to send a packet to the first L-BM-SC by using the bearer between the first L-BM-SC and the GCS AS.

With reference to the seventh possible implementation of the fifth aspect or the ninth possible implementation of the fifth aspect, in an eleventh possible implementation of the fifth aspect, the third bearer activation request further includes a first security key, the first bearer activation request further includes the first security key, and the first security key is generated by the GCS AS when the GCS AS determines that the GCS AS generates a security key.

With reference to the eighth possible implementation of the fifth aspect or the tenth possible implementation of the fifth aspect, in a twelfth possible implementation of the fifth aspect, the first bearer response message further includes a second security key, the third bearer response message further includes the second security key, the second security key is generated by the first L-BM-SC when the first L-BM-SC determines that a second bearer activation request does not include a security key, and is sent by the first L-BM-SC to the MCE, and the second bearer activation request does not include a security key when the GCS AS determines that the first L-BM-SC generates a security key.

With reference to the seventh possible implementation of the fifth aspect, or the ninth possible implementation of the fifth aspect, or the eleventh possible implementation of the fifth aspect, in a thirteenth possible implementation of the fifth aspect, the third bearer activation request further includes a first group identity, the first bearer activation request further includes the first group identity, the first group identity is used to identify a group of the UE, and the first group identity is preallocated by the original BM-SC to the group of the UE and is stored by the GCS AS.

With reference to the eighth possible implementation of the fifth aspect, or the tenth possible implementation of the fifth aspect, or the twelfth possible implementation of the fifth aspect, in a fourteenth possible implementation of the fifth aspect, the first bearer response message further includes a second group identity, the third bearer response message further includes the second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

With reference to the third possible implementation of the fifth aspect, or the fourth possible implementation of the fifth aspect, or the fifth possible implementation of the fifth aspect, or the sixth possible implementation of the fifth aspect, in a fifteenth possible implementation of the fifth aspect, the first L-BM-SC is obtained by moving the original broadcast/multicast service center BM-SC to the location of the eNB to which the UE belongs; or the first L-BM-SC is obtained by establishing a new broadcast/multicast service center BM-SC at the location of the eNB to which the UE belongs.

According to a sixth aspect, a group communication apparatus is provided and is applied to a multi-cell/multicast coordination entity MCE, where the MCE is located in a group communication system GCS in Long Term Evolution LTE, and the group communication apparatus includes a receiver and a processor, where the receiver is configured to receive a first bearer activation request sent by a system device, where the first bearer activation request includes location information of user equipment UE, and the first bearer activation request is sent by the system device after the system device performs a step that when the system device determines that a local broadcast/multicast service center L-BM-SC is deployed at a location of an evolved NodeB eNB to which the UE belongs, the system device determines, according to the location information of the UE, an MCE that manages the eNB to which the UE belongs;

the processor is configured to determine, according to the location information of the UE, a first local broadcast/multicast service center L-BM-SC deployed at the location of the eNB to which the UE belongs; and the processor is further configured to establish a bearer between the first L-BM-SC and a group communication service application server GCS AS, where the bearer between the first L-BM-SC and the GCS AS is used by the GCS AS to send a packet to the first L-BM-SC.

With reference to the sixth aspect, in a first possible implementation of the sixth aspect, the processor is further configured to query a locally configured correspondence between location information and an L-BM-SC according to the location information of the UE; and the processor is further configured to use, as the first L-BM-SC deployed at the location of the eNB to which the UE belongs, an L-BM-SC that is obtained by means of query and is corresponding to the location information of the UE.

With reference to the sixth aspect, in a second possible implementation of the sixth aspect, when the system device is a management mobility entity MME, the processor is further configured to detect whether an L-BM-SC is deployed at the location of the eNB to which the UE belongs.

With reference to the sixth aspect, or the first possible implementation of the sixth aspect, or the second possible implementation of the sixth aspect, in a third possible implementation of the sixth aspect, the group communication apparatus further includes a transmitter;

the transmitter is configured to send a second bearer activation request to the first L-BM-SC, so that the first L-BM-SC sends a second bearer response message to the MCE according to an address of the first L-BM-SC, where the second bearer response message includes the address of the first L-BM-SC; and the transmitter is further configured to send the first bearer response message to the system device, so that the system device determines, according to the first bearer response message, that the bearer between the first L-BM-SC and the GCS AS is successfully established, where the first bearer response message is sent by the MCE after the MCE receives the second bearer response message sent by the first L-BM-SC, and the first bearer response message includes the address of the first L-BM-SC.

With reference to the third possible implementation of the sixth aspect, in a fourth possible implementation of the sixth aspect, when the system device is the GCS AS, an original broadcast/multicast service center BM-SC, or a mobility management entity MME, and the original BM-SC is used to perform data transmission between the GCS AS and each eNB, the first bearer activation request further includes a first security key, the second bearer activation request further includes the first security key, and the first security key is generated by the GCS AS when the GCS AS determines that the GCS AS generates a security key; or the second bearer response message further includes a second security key, the first bearer response message further includes the second security key, the second security key is generated by the first L-BM-SC when the first L-BM-SC determines that the second bearer activation request does not include a security key, and the second bearer activation request does not include a security key when the GCS AS determines that the first L-BM-SC generates a security key.

With reference to the third possible implementation of the sixth aspect or the fourth possible implementation of the sixth aspect, in a fifth possible implementation of the sixth aspect, when the system device is the GCS AS, an original broadcast/multicast service center BM-SC, or a mobility management entity MME, and the original BM-SC is used to perform data transmission between the GCS AS and each eNB, the first bearer activation request further includes a first group identity, the second bearer activation request further includes the first group identity, the first group identity is used to identify a group of the UE, and the first group identity is preallocated by the original BM-SC to the group of the UE and is stored by the GCS AS; or the second bearer response message further includes a second group identity, the first bearer response message further includes the second group identity, the second group identity is used to identify a group of the UE, and the second group identity is allocated by the first L-BM-SC to the group of the UE when the first L-BM-SC determines that the second bearer activation request does not include a group identity.

According to a seventh aspect, a group communication system is provided, where the group communication system includes a system device and a multi-cell/multicast coordination entity MCE;

the system device includes the group communication apparatus according to any one of possible implementations of the third aspect; and the MCE includes the group communication apparatus according to any one of possible implementations of the fourth aspect.

According to an eighth aspect, a group communication system is provided, where the group communication system includes a system device and a multi-cell/multicast coordination entity MCE;

the system device includes the group communication apparatus according to any one of possible implementations of the fifth aspect; and the MCE includes the group communication apparatus according to any one of possible implementations of the sixth aspect.

According to a ninth aspect, a group communication method is provided and is applied to user equipment UE, where the UE is located in a group communication system GCS in Long Term Evolution LTE, and the method includes:

providing location information of the UE to a system device, so that when the system device determines that a local broadcast/multicast service center L-BM-SC is deployed at a location of an evolved NodeB eNB to which the UE belongs, the system device determines, according to the location information of the UE, a multi-cell/multicast coordination entity MCE that manages the eNB to which the UE belongs, and sends a first bearer activation request to the MCE, where the first bearer activation request includes the location information of the UE, and the first bearer activation request is used to trigger the MCE to determine, according to the location information of the UE, a first L-BM-SC deployed at the location of the eNB to which the UE belongs, and establish a bearer between the first L-BM-SC and a group communication service application server GCS AS, where the bearer between the first L-BM-SC and the GCS AS is used by the GCS AS to send a packet to the first L-BM-SC.

With reference to the ninth aspect, in a first possible implementation of the ninth aspect, when the system device is the GCS AS, the providing location information of the UE to a system device includes:

reporting indication information to the GCS AS, where the indication information includes capability indication information and the location information of the UE, and the capability indication information is used to indicate that the UE is capable of performing multicast transmission; or reporting indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit.

With reference to the ninth aspect, in a second possible implementation of the ninth aspect, when the system device is an original broadcast/multicast service center BM-SC, and the original BM-SC is used to perform data transmission between the GCS AS and each eNB, the providing location information of the UE to a system device includes:

reporting indication information to the GCS AS, where the indication information includes capability indication information and the location information of the UE, and the capability indication information is used to indicate that the UE is capable of performing multicast transmission, so that the GCS AS sends a third bearer activation request to the original BM-SC when the GCS AS determines that the UE is capable of performing multicast transmission, where the third bearer activation request includes the location information of the UE; or reporting indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit, and sends a third bearer activation request to the original BM-SC, where the third bearer activation request includes the location information of the UE.

With reference to the ninth aspect, in a third possible implementation of the ninth aspect, when the system device is a mobility management entity MME, the providing location information of the UE to a system device includes:

reporting indication information to the GCS AS, where the indication information includes capability indication information and the location information of the UE, and the capability indication information is used to indicate that the UE is capable of performing multicast transmission, so that when the GCS AS determines that the UE is capable of performing multicast transmission, the GCS AS sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB; or reporting indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit, sends a third bearer activation request to the original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB.

With reference to the first possible implementation of the ninth aspect, or the second possible implementation of the ninth aspect, or the third possible implementation of the ninth aspect, in a fourth possible implementation of the ninth aspect, the reporting indication information to the GCS AS includes:

reporting the indication information to the GCS AS by using a GC1 interface between the UE and the GCS AS.

According to a tenth aspect, a group communication apparatus is provided and is applied to user equipment UE, where the UE is located in a group communication system GCS in Long Term Evolution LTE, and the group communication apparatus includes:

a providing module, configured to provide location information of the UE to a system device, so that when the system device determines that a local broadcast/multicast service center L-BM-SC is deployed at a location of an evolved NodeB eNB to which the UE belongs, the system device determines, according to the location information of the UE, a multi-cell/multicast coordination entity MCE that manages the eNB to which the UE belongs, and sends a first bearer activation request to the MCE, where the first bearer activation request includes the location information of the UE, and the first bearer activation request is used to trigger the MCE to determine, according to the location information of the UE, a first L-BM-SC deployed at the location of the eNB to which the UE belongs, and establish a bearer between the first L-BM-SC and a group communication service application server GCS AS, where the bearer between the first L-BM-SC and the GCS AS is used by the GCS AS to send a packet to the first L-BM-SC.

With reference to the tenth aspect, in a first possible implementation of the tenth aspect, when the system device is the GCS AS, the providing module includes:

a reporting unit, configured to report indication information to the GCS AS, where the indication information includes capability indication information and the location information of the UE, and the capability indication information is used to indicate that the UE is capable of performing multicast transmission; or the reporting unit, configured to report indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit.

With reference to the tenth aspect, in a second possible implementation of the tenth aspect, when the system device is an original broadcast/multicast service center BM-SC, and the original BM-SC is used to perform data transmission between the GCS AS and each eNB, the reporting unit is configured to report indication information to the GCS AS, where the indication information includes capability indication information and the location information of the UE, and the capability indication information is used to indicate that the UE is capable of performing multicast transmission, so that the GCS AS sends a third bearer activation request to the original BM-SC when the GCS AS determines that the UE is capable of performing multicast transmission, where the third bearer activation request includes the location information of the UE; or the reporting unit is configured to report indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit, and sends a third bearer activation request to the original BM-SC, where the third bearer activation request includes the location information of the UE.

With reference to the tenth aspect, in a third possible implementation of the tenth aspect, when the system device is a mobility management entity MME, the reporting unit is configured to report indication information to the GCS AS, where the indication information includes capability indication information and the location information of the UE, and the capability indication information is used to indicate that the UE is capable of performing multicast transmission, so that when the GCS AS determines that the UE is capable of performing multicast transmission, the GCS AS sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB; or the reporting unit is configured to report indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit, sends a third bearer activation request to the original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB.

With reference to the first possible implementation of the tenth aspect, or the second possible implementation of the tenth aspect, or the third possible implementation of the tenth aspect, in a fourth possible implementation of the tenth aspect, the reporting unit is configured to report the indication information to the GCS AS by using a GC1 interface between the UE and the GCS AS.

According to an eleventh aspect, a group communication apparatus is provided and is applied to user equipment UE, where the UE is located in a group communication system GCS in Long Term Evolution LTE, and the group communication apparatus includes a processor, where the processor is configured to provide location information of the UE to a system device, so that when the system device determines that a local broadcast/multicast service center L-BM-SC is deployed at a location of an evolved NodeB eNB to which the UE belongs, the system device determines, according to the location information of the UE, a multi-cell/multicast coordination entity MCE that manages the eNB to which the UE belongs, and sends a first bearer activation request to the MCE, where the first bearer activation request includes the location information of the UE, and the first bearer activation request is used to trigger the MCE to determine, according to the location information of the UE, a first L-BM-SC deployed at the location of the eNB to which the UE belongs, and establish a bearer between the first L-BM-SC and a group communication service application server GCS AS, where the bearer between the first L-BM-SC and the GCS AS is used by the GCS AS to send a packet to the first L-BM-SC.

With reference to the eleventh aspect, in a first possible implementation of the eleventh aspect, when the system device is the GCS AS, the processor is further configured to report indication information to the GCS AS, where the indication information includes capability indication information and the location information of the UE, and the capability indication information is used to indicate that the UE is capable of performing multicast transmission; or the processor is further configured to report indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit.

With reference to the eleventh aspect, in a second possible implementation of the eleventh aspect, when the system device is an original broadcast/multicast service center BM-SC, and the original BM-SC is used to perform data transmission between the GCS AS and each eNB, the processor is further configured to report indication information to the GCS AS, where the indication information includes capability indication information and the location information of the UE, and the capability indication information is used to indicate that the UE is capable of performing multicast transmission, so that when the GCS AS determines that the UE is capable of performing multicast transmission, the GCS AS sends a third bearer activation request to the original BM-SC, where the third bearer activation request includes the location information of the UE; or the processor is further configured to report indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit, and sends a third bearer activation request to the original BM-SC, where the third bearer activation request includes the location information of the UE.

With reference to the eleventh aspect, in a third possible implementation of the eleventh aspect, when the system device is a mobility management entity MME, the processor is further configured to report indication information to the GCS AS, where the indication information includes capability indication information and the location information of the UE, and the capability indication information is used to indicate that the UE is capable of performing multicast transmission, so that when the GCS AS determines that the UE is capable of performing multicast transmission, the GCS AS sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB; or the processor is further configured to report indication information to the GCS AS, where the indication information includes capability indication information, and the capability indication information is used to indicate that the UE is capable of performing multicast transmission, so that when the capability indication information indicates that the UE is capable of performing multicast transmission, the GCS AS obtains the location information of the UE from a policy and charging rules function PCRF unit, sends a third bearer activation request to the original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB.

With reference to the first possible implementation of the eleventh aspect, or the second possible implementation of the eleventh aspect, or the third possible implementation of the eleventh aspect, in a fourth possible implementation of the eleventh aspect, the processor is further configured to report the indication information to the GCS AS by using a GC1 interface between the UE and the GCS AS.

Beneficial effects of the technical solutions provided in the embodiments of the present invention are as follows:

A system device obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. The MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the implementations of the present invention in detail with reference to the accompanying drawings.

Figure 1:
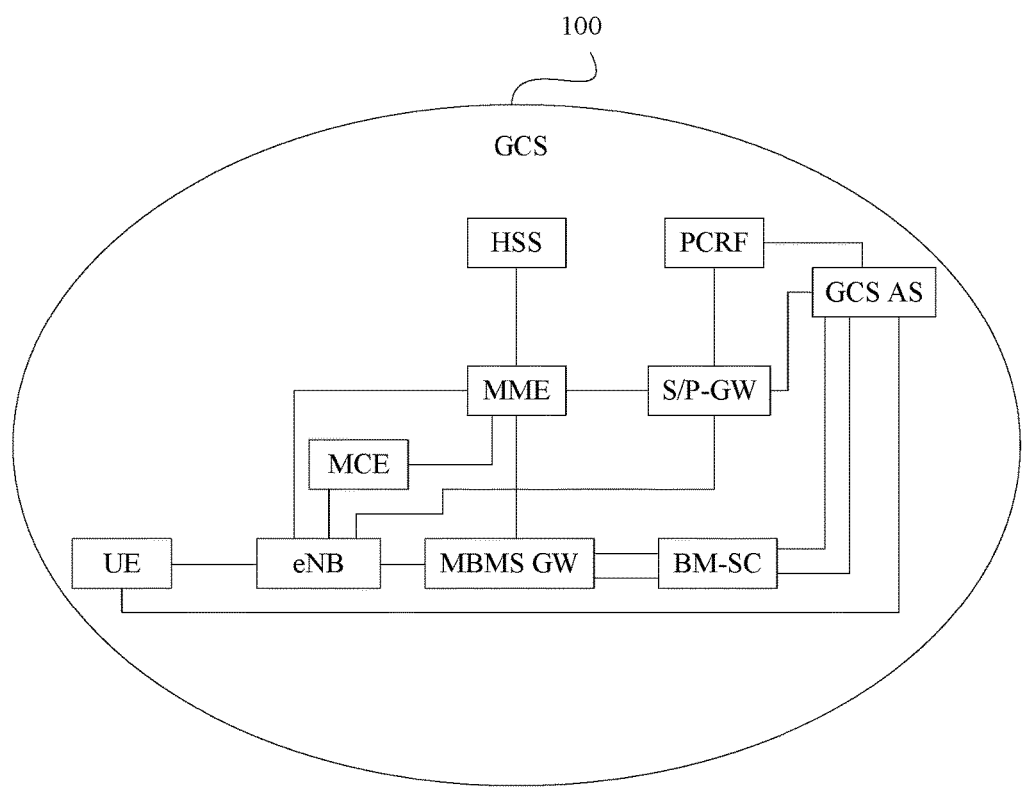
FIG. 1 is a schematic structural diagram of a GCS in LTE in the prior art.

Referring to FIG. 1, FIG. 1 shows a schematic structural diagram of a GCS 100 in LTE in the prior art. Referring to FIG. 1, the GCS 100 may include user equipment (UE), an eNB, a multi-cell/multicast coordination entity (MCE), a mobility management entity (MME), a service/packet data network gateway (S/P-GW), a GCS AS, a BM-SC, a multimedia broadcast/multicast service gateway (MBMS GW), a home subscriber server (HSS), and a policy and charging rules function (PCRF) unit.

The BM-SC belongs to a service-layer network element, and can provide service convergence and sending, user authorization (key generation and sending), bearer establishment and initiation, session control initiation, and data synchronization between the BM-SC and the eNB. The MBMS GW is a node between the BM-SC and the eNB, is a network access gateway, and is responsible for processing a packet and session signaling. The MCE is mainly used for radio resource scheduling management, that is, the MCE selects a suitable resource (including parameters such as a frequency and time) for data transmission, so as to properly and efficiently use a resource. The GCS AS is a third-party server, and is mainly responsible for group member management, service initiation activation, and the like.

The UE may be connected to the eNB by using a wired network or a wireless network. The UE may communicate with the eNB by using a Uu interface, for example, the eNB may send a packet to the UE by using the Uu interface. The eNB may be connected to each of the MME, the MCE, the S/P-GW, and the MBMS GW by using a wired network or a wireless network. The eNB may respectively communicate with the MME, the MCE, the S/P-GW, and the MBMS GW by using an S1-MME interface, an M2 interface, an S1-U interface, and an M1 interface. For example, the eNB receives, by using the M1 interface, a packet sent by the MBMS GW. The MCE may be connected to the MME by using a wired network or a wireless network. The MCE may communicate with the MME by using an M3 interface. For example, the MCE receives, by using the M3 interface, a bearer activation request sent by the MME. The MME may be connected to each of the HSS, the MBMS GW, and the S/P-GW by using a wired network or a wireless network. The MME may respectively communicate with the HSS, the MBMS GW, and the S/P-GW by using an Sha interface, an Sm interface, and an S11 interface. For example, the MME receives a bearer activation request sent by the MBMS GW by using the Sm interface. The BM-SC may be connected to the MBMS GW by using a wired network or a wireless network. The BM-SC may communicate with the MBMS GW by using an SGmb interface and an SGimb interface. For example, the BM-SC sends a packet to the MBMS GW by using the SGmb interface. The BM-SC may be connected to the GCS AS by using a wired network or a wireless network. The BM-SC may communicate with the GCS AS by using an MB2-C interface and an MB2-U interface. For example, the GCS AS sends control-plane signaling to the BM-SC by using the MB2-C interface, and sends user-plane data to the BM-SC by using the MB2-U interface. The GCS AS may be connected to each of the S/P-GW, the PCRF, and the UE by using a wired network or a wireless network. The GCS AS may respectively communicate with the S/P-GW, the PCRF, and the UE by using an SGi interface, an Rx interface, and a GC1 interface. For example, the GCS AS receives, by using the SGi interface, a packet sent by the S/P-GW, the GCS AS obtains location information of the UE from the PCRF by using the Rx interface, and the GCS AS receives, by using the GC1 interface, indication information reported by the UE. The S/P-GW may be connected to the PCRF by using a wired network or a wireless network. The S/P-GW may communicate with the PCRF by using a Gx interface.

In the GCS 100, when UE at a transmit end needs to communicate with UE at a receive end, the UE at the transmit end sends data to the GCS AS by using an eNB at the transmit end and the S/P-GW. When the GCS AS receives the data, the GCS AS determines a data transmission manner according to a quantity of UEs at the receive end. The data transmission manner includes either a unicast transmission manner or a multicast transmission manner. When the quantity of UEs at the receive end is greater than a preset value, the GCS AS determines to transmit the data in the multicast transmission manner, and sends the data to the BM-SC. The BM-SC determines a relatively long synchronization cycle according to lengths of different paths between the BM-SC and all eNBs at the receive end, to send the data.

In the present invention, an operator may deploy a local broadcast/multicast service center (L-BM-SC) at a location of the eNB in advance, and the L-BM-SC may be deployed at a same location as the eNB. The GCS AS may send a packet to the L-BM-SC, and the L-BM-SC forwards the packet to the eNB at the receive end, so as to shorten a data transmission delay. Herein, that an L-BM-SC is deployed at the location of the eNB means deploying both an L-BM-SC and an MBMS GW at the location of the eNB.

There are two manners in which the operator deploys an L-BM-SC at the location of the eNB in advance.

In a first manner, an L-BM-SC is obtained by establishing a new BM-SC at the location of the eNB.

In a second manner, an L-BM-SC is obtained by moving an original BM-SC to the location of the eNB.

Therefore, for the two deployment manners, two implementation environments may exist in the present invention, and are specifically as follows.

Figure 2:
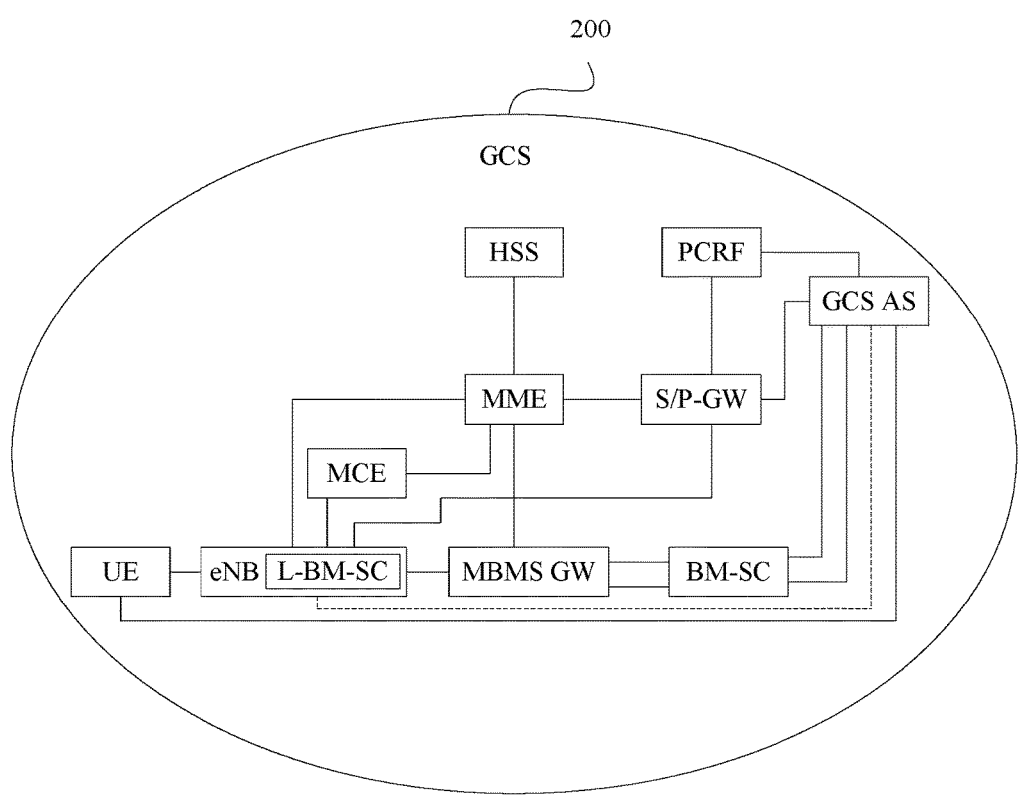
FIG. 2 is a schematic structural diagram of an implementation environment used in each embodiment of the present invention.

Referring to FIG. 2, FIG. 2 shows a schematic structural diagram of an implementation environment used in each embodiment of the present invention. The implementation environment provides a GCS 200 in LTE. The GCS 200 includes all devices in the implementation environment shown in FIG. 1, and the GCS 200 further includes an L-BM-SC. The L-BM-SC is obtained by establishing a new BM-SC at a location of an eNB by an operator in advance. A new MBMS GW (not shown in FIG. 2) is further established at a location of the L-BM-SC.

The L-BM-SC may be connected to a GCS AS by using a wired network or a wireless network. An interface between the L-BM-SC and the GCS AS may be an MB2 interface, that is, the GCS AS may directly send a packet to the L-BM-SC by using the MB2 interface between the GCS AS and the L-BM-SC.

Figure 3:
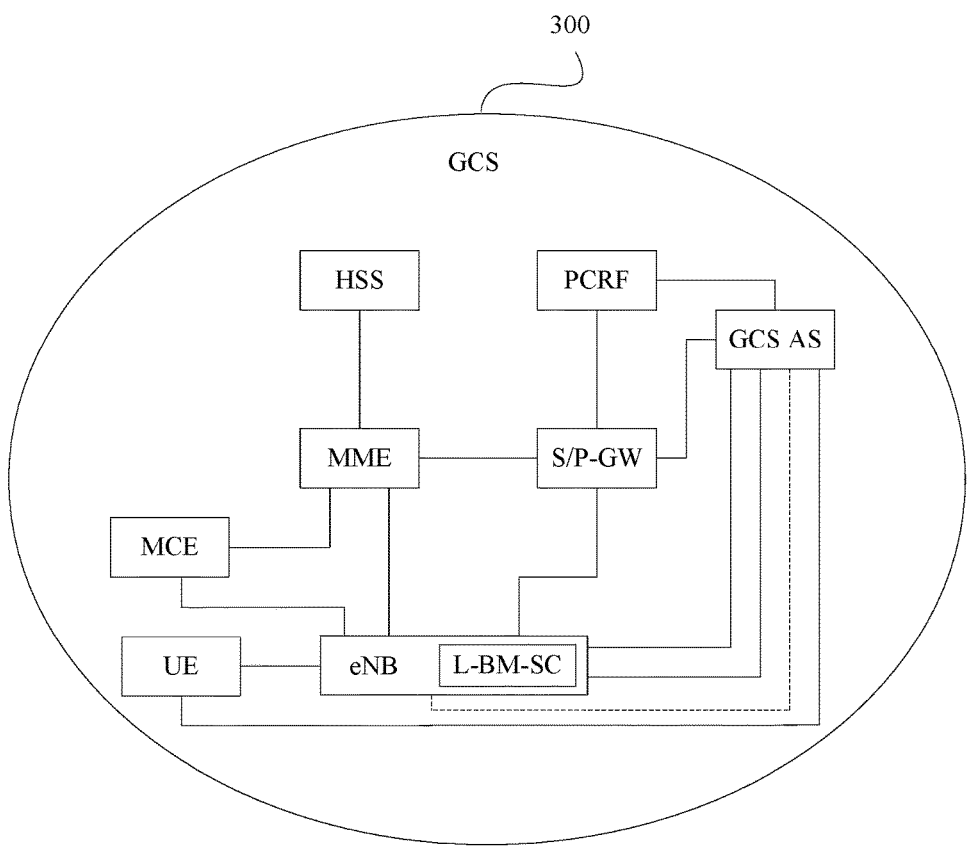
FIG. 3 is a schematic structural diagram of another implementation environment used in each embodiment of the present invention.

Referring to FIG. 3, FIG. 3 shows a schematic structural diagram of another implementation environment used in each embodiment of the present invention. The implementation environment provides a GCS 300 in LTE. The GCS 300 further includes an L-BM-SC. The L-BM-SC is obtained by moving an original BM-SC to a location of an eNB by an operator in advance. When moving the original BM-SC, the operator uses an original MBMS GW and the original BM-SC as a whole, and moves the original MBMS GW and the original BM-SC to the location of the eNB.

The L-BM-SC may be connected to a GCS AS by using a wired network or a wireless network. An interface between the L-BM-SC and the GCS AS may be an MB2 interface, that is, the GCS AS may directly send a packet to the L-BM-SC by using the MB2 interface between the GCS AS and the L-BM-SC.

Figure 4:
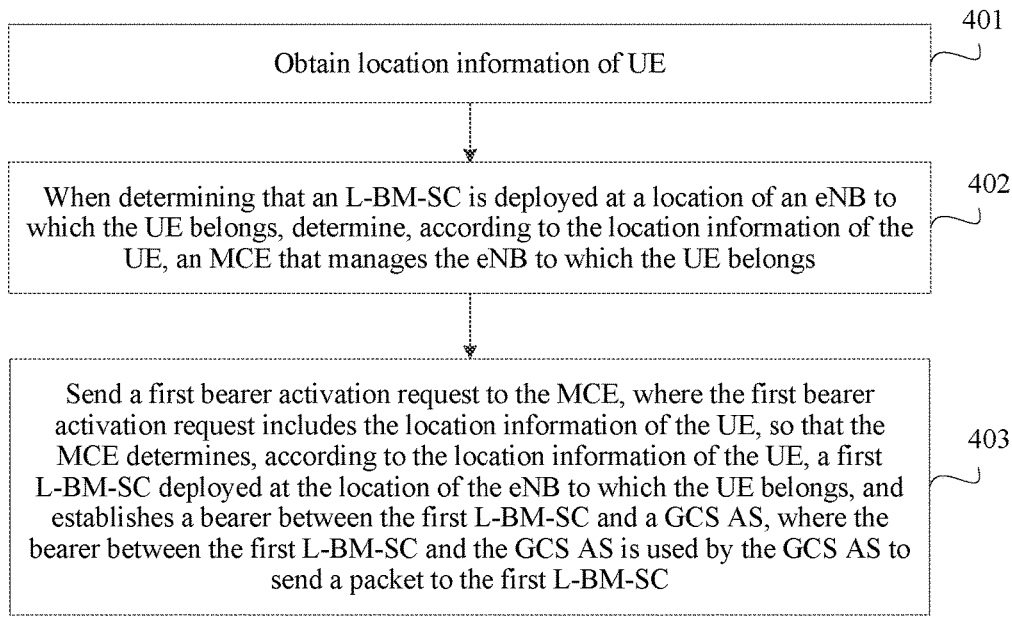
FIG. 4 is a method flowchart of a group communication method according to an embodiment of the present invention.

Referring to FIG. 4, FIG. 4 shows a method flowchart of a group communication method according to an embodiment of the present invention. In this embodiment, an example that the group communication method is applied to a system device in the implementation environment shown in FIG. 2 or FIG. 3 is used for description. The system device may be a GCS AS, a BM-SC, or an MME in the implementation environment shown in FIG. 2, or may be a GCS AS in the implementation environment shown in FIG. 3. Referring to FIG. 4, the method procedure may include the following several steps.

Step 401: Obtain location information of UE.

Step 402: When determining that an L-BM-SC is deployed at a location of an eNB to which the UE belongs, determine, according to the location information of the UE, an MCE that manages the eNB to which the UE belongs.

Step 403: Send a first bearer activation request to the MCE, where the first bearer activation request includes the location information of the UE, so that the MCE determines, according to the location information of the UE, a first L-BM-SC deployed at the location of the eNB to which the UE belongs, and establishes a bearer between the first L-BM-SC and a GCS AS, where the bearer between the first L-BM-SC and the GCS AS is used by the GCS AS to send a packet to the first L-BM-SC.

In conclusion, according to the group communication method provided in this embodiment of the present invention, a system device obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Optionally, the determining, according to the location information of the UE, a multi-cell/multicast coordination entity MCE that manages the eNB to which the UE belongs includes:

querying a locally configured correspondence between location information and an MCE according to the location information of the UE; and using, as the MCE that manages the eNB to which the UE belongs, an MCE that is obtained by means of query and is corresponding to the location information of the UE.

Optionally, after the sending a first bearer activation request to the MCE, the method further includes:

receiving a first bearer response message sent by the MCE, where the first bearer response message includes an address of the first L-BM-SC; and determining, according to the first bearer response message, that the bearer between the first L-BM-SC and the GCS AS is successfully established.

Optionally, when the system device is the GCS AS, before the determining that a local broadcast/multicast service center L-BM-SC is deployed at a location of an evolved NodeB eNB to which the UE belongs, the method further includes:

receiving indication information reported by the UE, where the indication information includes capability indication information, and the capability indication information is used to indicate that the UE is capable of performing multicast transmission; and determining, according to the capability indication information, that the UE is capable of performing multicast transmission.

Optionally, the obtaining location information of UE includes:

receiving the indication information reported by the UE, where the indication information further includes the location information of the UE; or when the capability indication information indicates that the UE is capable of performing multicast transmission, obtaining the location information of the UE from a policy and charging rules function PCRF unit.

Optionally, the first bearer activation request further includes a first security key, and the first security key is generated by the GCS AS when the GCS AS determines that the GCS AS generates a security key; or the first bearer activation request does not include a security key, the first bearer response message further includes a second security key, the second security key is generated by the first L-BM-SC when the first L-BM-SC determines that a second bearer activation request does not include a security key, and is sent by the first L-BM-SC to the MCE, and the first bearer activation request does not include a security key when the GCS AS determines that the first L-BM-SC generates a security key.

Optionally, the first bearer activation request further includes a first group identity, the first group identity is used to identify a group of the UE, the first group identity is preallocated by an original broadcast/multicast service center BM-SC to the group of the UE and is stored by the GCS AS, and the original BM-SC is used to perform data transmission between the GCS AS and each eNB; or the first bearer response message further includes a second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

Optionally, when the first L-BM-SC is obtained by establishing a new broadcast/multicast service center BM-SC at the location of the eNB to which the UE belongs, the system device is an original BM-SC, and the original BM-SC is used to perform data transmission between the GCS AS and each eNB, the obtaining location information of user equipment UE includes:

receiving a third bearer activation request sent by the GCS AS, where the third bearer activation request includes the location information of the UE, and the third bearer activation request is sent by the GCS AS when the GCS AS determines that the UE is capable of performing multicast transmission; and extracting the location information of the UE from the third bearer activation request.

Optionally, after the receiving a first bearer response message sent by the MCE, the method further includes:

sending a third bearer response message to the GCS AS, where the third bearer response message includes the address of the first L-BM-SC, so that the GCS AS sends a packet to the first L-BM-SC by using the bearer between the first L-BM-SC and the GCS AS.

Optionally, when the first L-BM-SC is obtained by establishing a new BM-SC at the location of the eNB to which the UE belongs, and the system device is a mobility management entity MME, the obtaining location information of user equipment UE includes:

receiving a third bearer activation request sent by an original BM-SC by using an original multimedia broadcast/multicast service gateway MBMS GW, where the third bearer activation request includes the location information of the UE, the third bearer activation request is sent by the GCS AS to the original MBMS GW when the GCS AS determines that the UE is capable of being switched between unicast transmission and multicast transmission, and is forwarded by the original MBMS GW to the original BM-SC, and the original BM-SC and the original MBMS GW are used to perform data transmission between the GCS AS and each eNB; and extracting the location information of the UE from the third bearer activation request.

Optionally, after the receiving a first bearer response message sent by the MCE, the method further includes:

sending a third bearer response message to the original BM-SC by using the original MBMS GW, where the third bearer response message includes the address of the first L-BM-SC, so that the original BM-SC sends the third bearer response message to the GCS AS, and triggers the GCS AS to send a packet to the first L-BM-SC by using the bearer between the first L-BM-SC and the GCS AS.

Optionally, the third bearer activation request further includes a first security key. The first bearer activation request further includes the first security key. The first security key is generated by the GCS AS when the GCS AS determines that the GCS AS generates a security key.

Optionally, the first bearer response message further includes a second security key. The third bearer response message further includes the second security key. The second security key is generated by the first L-BM-SC when the first L-BM-SC determines that a second bearer activation request does not include a security key, and is sent by the first L-BM-SC to the MCE. The second bearer activation request does not include a security key when the GCS AS determines that the first L-BM-SC generates a security key.

Optionally, the third bearer activation request further includes a first group identity. The first bearer activation request further includes the first group identity. The first group identity is used to identify a group of the UE. The first group identity is preallocated by the original BM-SC to the group of the UE and is stored by the GCS AS.

Optionally, the first bearer response message further includes a second group identity. The third bearer response message further includes the second group identity. The second group identity is used to identify a group of the UE. The second group identity is allocated by the first L-BM-SC to the group of the UE when the first L-BM-SC determines that the second bearer activation request does not include a group identity, and is sent by the first L-BM-SC to the MCE.

Optionally, the first L-BM-SC is obtained by moving the original broadcast/multicast service center BM-SC to the location of the eNB to which the UE belongs; or the first L-BM-SC is obtained by establishing a new broadcast/multicast service center BM-SC at the location of the eNB to which the UE belongs.

All the optional technical solutions may be combined in any manner to form an optional embodiment of the present invention. Details are not further described one by one herein.

Figure 5:
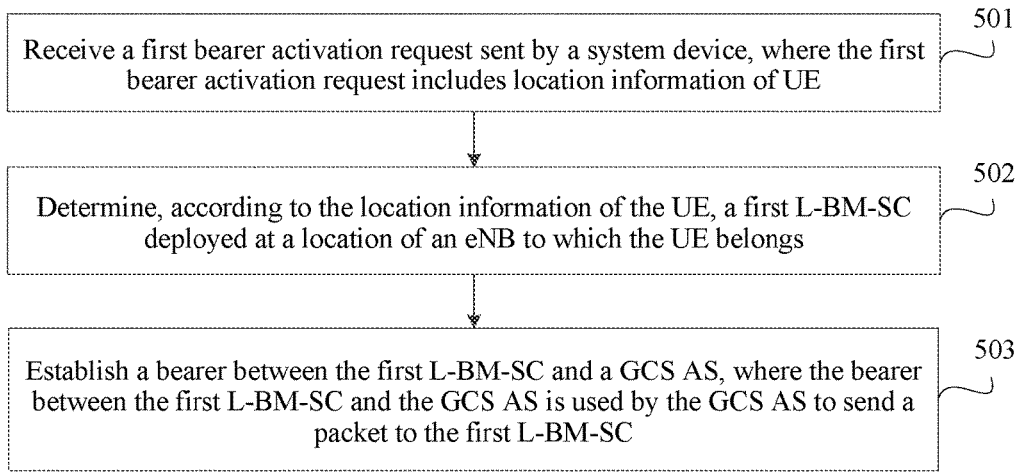
FIG. 5 is a method flowchart of a group communication method according to another embodiment of the present invention.

Referring to FIG. 5, FIG. 5 shows a method flowchart of a group communication method according to another embodiment of the present invention. In this embodiment, an example that the group communication method is applied to an MCE in the implementation environment shown in FIG. 2 or FIG. 3 is used for description. Referring to FIG. 5, the method procedure may include the following several steps.

Step 501: Receive a first bearer activation request sent by a system device, where the first bearer activation request includes location information of UE.

The first bearer activation request is sent by the system device after the system device performs a step that when the system device determines that an L-BM-SC is deployed at a location of an eNB to which the UE belongs, the system device determines, according to the location information of the UE, an MCE that manages the eNB to which the UE belongs.

Step 502: Determine, according to the location information of the UE, a first L-BM-SC deployed at a location of an eNB to which the UE belongs.

Step 503: Establish a bearer between the first L-BM-SC and a GCS AS, where the bearer between the first L-BM-SC and the GCS AS is used by the GCS AS to send a packet to the first L-BM-SC.

In conclusion, according to the group communication method provided in this embodiment of the present invention, an MCE receives a first bearer activation request, where the first bearer activation request includes location information of UE; determines, according to the location information of the UE, a first L-BM-SC deployed at a location of an eNB to which the UE belongs; and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. ABM-SC does not need to determine a synchronization cycle. In this way, a problem that a data transmission delay is relatively large in existing group communication is resolved, and the data transmission delay is shortened.

Optionally, the determining, according to the location information of the UE, a first local broadcast/multicast service center L-BM-SC deployed at a location of an eNB to which the UE belongs includes:

querying a locally configured correspondence between location information and an L-BM-SC according to the location information of the UE; and using, as the first L-BM-SC deployed at the location of the eNB to which the UE belongs, an L-BM-SC that is obtained by means of query and is corresponding to the location information of the UE.

Optionally, when the system device is a management mobility entity MME, before the determining, according to the location information of the UE, a first local broadcast/multicast service center L-BM-SC deployed at a location of an eNB to which the UE belongs, the method further includes:

detecting whether an L-BM-SC is deployed at the location of the eNB to which the UE belongs.

Optionally, the establishing a bearer between the first L-BM-SC and a group communication service application server GCS AS includes:

sending a second bearer activation request to the first L-BM-SC, so that the first L-BM-SC sends a second bearer response message to the MCE according to an address of the first L-BM-SC, where the second bearer response message includes the address of the first L-BM-SC; and sending a first bearer response message to the system device, so that the system device determines, according to the first bearer response message, that the bearer between the first L-BM-SC and the GCS AS is successfully established, where the first bearer response message is sent by the MCE after the MCE receives the second bearer response message sent by the first L-BM-SC, and the first bearer response message includes the address of the first L-BM-SC.

Optionally, when the system device is the GCS AS, an original broadcast/multicast service center BM-SC, or a mobility management entity MME, and the original BM-SC is used to perform data transmission between the GCS AS and each eNB, the first bearer activation request further includes a first security key, the second bearer activation request further includes the first security key, and the first security key is generated by the GCS AS when the GCS AS determines that the GCS AS generates a security key; or the second bearer response message further includes a second security key, the first bearer response message further includes the second security key, the second security key is generated by the first L-BM-SC when the first L-BM-SC determines that the second bearer activation request does not include a security key, and the second bearer activation request does not include a security key when the GCS AS determines that the first L-BM-SC generates a security key.

Optionally, when the system device is the GCS AS, an original broadcast/multicast service center BM-SC, or a mobility management entity MME, and the original BM-SC is used to perform data transmission between the GCS AS and each eNB, the first bearer activation request further includes a first group identity, the second bearer activation request further includes the first group identity, the first group identity is used to identify a group of the UE, and the first group identity is preallocated by the original BM-SC to the group of the UE and is stored by the GCS AS; or the second bearer response message further includes a second group identity, the first bearer response message further includes the second group identity, the second group identity is used to identify a group of the UE, and the second group identity is allocated by the first L-BM-SC to the group of the UE when the first L-BM-SC determines that the second bearer activation request does not include a group identity.

All the optional technical solutions may be combined in any manner to form an optional embodiment of the present invention. Details are not further described one by one herein.

Figures 6, 7:
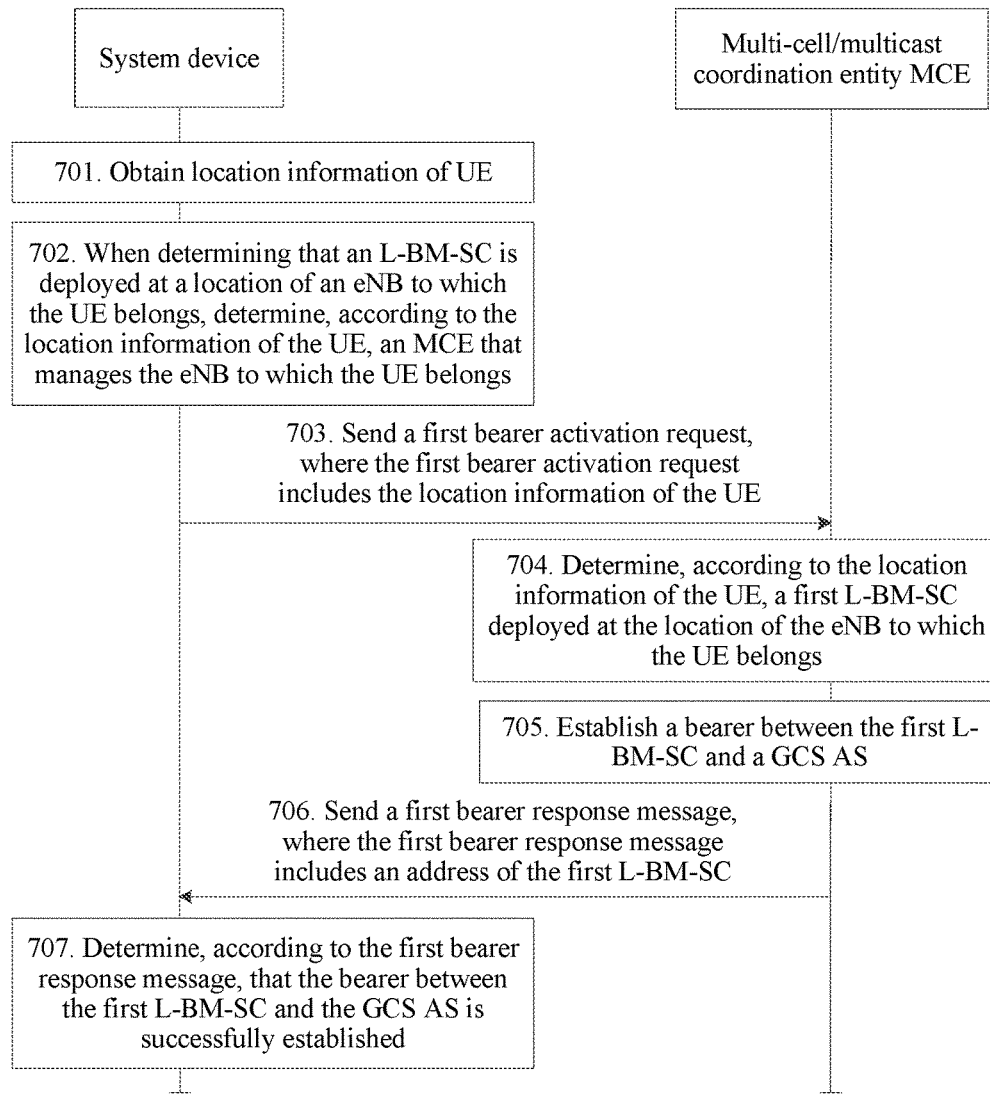
FIG. 6 is a method flowchart of a group communication method according to still another embodiment of the present invention.
FIG. 7 is a method flowchart of a group communication method according to yet another embodiment of the present invention.

Referring to FIG. 6, FIG. 6 shows a method flowchart of a group communication method according to still another embodiment of the present invention. In this embodiment, an example that the group communication method is applied to UE in the implementation environment shown in FIG. 2 or FIG. 3 is used for description. Referring to FIG. 6, the method procedure may include the following several steps:

Step 601: Provide location information of UE to a system device, so that when the system device determines that an L-BM-SC is deployed at a location of an eNB to which the UE belongs, the system device determines, according to the location information of the UE, an MCE that manages the eNB to which the UE belongs, and sends a first bearer activation request to the MCE.

The first bearer activation request includes the location information of the UE. The first bearer activation request is used to trigger the MCE to determine, according to the location information of the UE, a first L-BM-SC deployed at the location of the eNB to which the UE belongs, and establish a bearer between the first L-BM-SC and a GCS AS. The bearer between the first L-BM-SC and the GCS AS is used by the GCS AS to send a packet to the first L-BM-SC.

In conclusion, according to the group communication method provided in this embodiment of the present invention, UE reports indication information to a system device, so that when the system device determines that an L-BM-SC is deployed at a location of an eNB to which the UE belongs, the system device determines, according to the location information of the UE, an MCE that manages the eNB to which the UE belongs, and sends a first bearer activation request to the MCE. The first bearer activation request includes the location information of the UE. The MCE is used to determine, according to the location information of the UE, a first L-BM-SC deployed at the location of the eNB to which the UE belongs, and establish a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Optionally, when the system device is the GCS AS, the providing location information of UE to a system device includes:

reporting indication information to the GCS AS, where the indication information includes capability indication information and the location information of the UE, and the capability indication information is used to indicate that the UE is capable of performing multicast transmission; or reporting indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit.

Optionally, when the system device is an original broadcast/multicast service center BM-SC, and the original BM-SC is used to perform data transmission between the GCS AS and each eNB, the providing location information of UE to a system device includes:

reporting indication information to the GCS AS, where the indication information includes capability indication information and the location information of the UE, and the capability indication information is used to indicate whether the UE is capable of performing multicast transmission, so that the GCS AS sends a third bearer activation request to the original BM-SC when the GCS AS determines that the UE is capable of performing multicast transmission, where the third bearer activation request includes the location information of the UE; or reporting indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit, and sends a third bearer activation request to the original BM-SC, where the third bearer activation request includes the location information of the UE.

Optionally, when the system device is a mobility management entity MME, the providing location information of UE to a system device includes:

reporting indication information to the GCS AS, where the indication information includes capability indication information and the location information of the UE, and the capability indication information is used to indicate whether the UE is capable of performing multicast transmission, so that when the GCS AS determines that the UE is capable of performing multicast transmission, the GCS AS sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB; or reporting indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit, sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB.

Optionally, the reporting indication information to the GCS AS includes:

reporting the indication information to the GCS AS by using a GC1 interface between the UE and the GCS AS.

All the optional technical solutions may be combined in any manner to form an optional embodiment of the present invention. Details are not further described one by one herein.

Referring to FIG. 7, FIG. 7 shows a method flowchart of a group communication method according to yet another embodiment of the present invention. In this embodiment, an example that the group communication method is applied to the implementation environment shown in FIG. 2 or FIG. 3 is used for description. Referring to FIG. 7, the method procedure may include the following several steps.

Step 701: A system device obtains location information of UE.

The location information of the UE may be a cell identity of an area in which an eNB to which the UE belongs is located. For example, the location information of the UE may be an evolved universal terrestrial radio access network cell global identifier (ECGI).

The system device may be a GCS AS, a BM-SC, or an MME in the implementation environment shown in FIG. 2, or may be a GCS AS in the implementation environment shown in FIG. 3. This is not specifically limited in this embodiment.

Step 702: When the system device determines that an L-BM-SC is deployed at a location of an eNB to which the UE belongs, the system device determines, according to the location information of the UE, an MCE that manages the eNB to which the UE belongs.

In this embodiment of the present invention, when the system device obtains the location information of the UE, the system device determines, according to the location information of the UE, whether an L-BM-SC is deployed at the location of the eNB to which the UE belongs. If an L-BM-SC is deployed at the location of the eNB to which the UE belongs, the system device performs a subsequent step.

Specifically, an L-BM-SC is deployed by an operator in advance at the location of the eNB to which the UE belongs. When deploying an L-BM-SC at the location of the eNB, the operator configures L-BM-SC-related information in the system device. For example, the operator configures a correspondence between location information and an address of an L-BM-SC. When the system device obtains the location information of the UE, the system device queries the correspondence between location information and an address of an L-BM-SC according to the location information of the UE. If the system device can obtain, by means of query, an address that is of an L-BM-SC and is corresponding to the location information of the UE, the system device determines that an L-BM-SC is deployed at the location of the eNB to which the UE belongs. The correspondence between location information and an address of an L-BM-SC may be a correspondence between an ECGI and an address of an L-BM-SC.

When the system device determines that an L-BM-SC is deployed at the location of the eNB to which the UE belongs, the system device determines, according to the location information of the UE, the MCE that manages the eNB to which the UE belongs.

Figure 8:
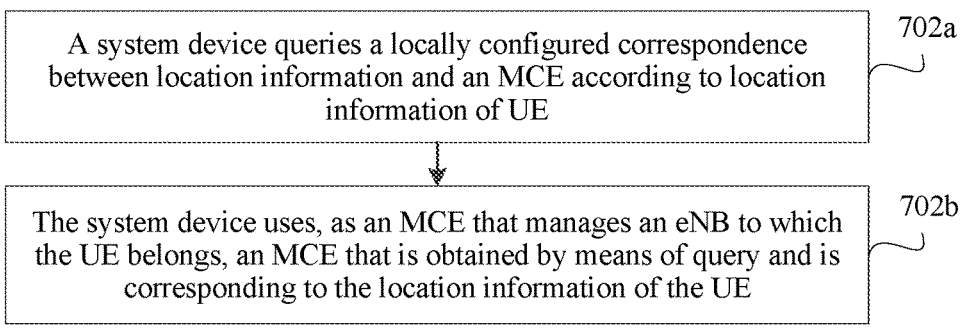
FIG. 8 is a method flowchart in which a system device provided in the embodiment shown in FIG. 7 determines, according to location information of UE, an MCE that manages an eNB to which the UE belongs.

Specifically, a correspondence between location information and an MCE is further configured in the system device. The system device may determine, according to the location information of the UE and the correspondence between location information and an MCE, the MCE that manages the eNB to which the UE belongs. Referring to FIG. 8, that the system device determines, according to the location information of the UE, an MCE that manages the eNB to which the UE belongs may include the following two steps.

Step 702*a*: The system device queries a locally configured correspondence between location information and an MCE according to the location information of the UE.

The correspondence between location information and an MCE may also be a correspondence between an ECGI and an identifier of an MCE, and the correspondence that is between location information and an MCE and is locally configured in the system device may be shown in the following Table 1:

TABLE 1

| ECGI | Identifier of an MCE |
|---|---|
| ID-1 | ID-MCE-A |
| ID-2 | ID-MCE-B |
| ID-3 | ID-MCE-C |
| ... | ... |

It is assumed that the location information (the ECGI) of the UE obtained by the system device is ID-2. The system device queries, according to ID-2, the correspondence that is between an ECGI and an identifier of an MCE and is shown in Table 1, and may learn that an identifier that is of an MCE and is corresponding to the location information ID-2 of the UE is ID-MCE-B.

Step 702*b*: The system device uses, as the MCE that manages the eNB to which the UE belongs, an MCE that is obtained by means of query and is corresponding to the location information of the UE.

The system device may use, as the MCE that manages the eNB to which the UE belongs, an MCE whose identifier is ID-MCE-B.

Step 703: The system device sends a first bearer activation request to the MCE, where the first bearer activation request includes the location information of the UE.

When the system device determines the MCE that manages the eNB to which the UE belongs, the system device sends the first bearer activation request to the MCE. The first bearer activation request includes the location information of the UE.

Specifically, the system device may first generate, according to the location information of the UE, a first bearer activation request that includes the location information of the UE, and then send the first bearer activation request to the MCE.

Step 704: The MCE determines, according to the location information of the UE, a first L-BM-SC deployed at the location of the eNB to which the UE belongs.

When the MCE receives the first bearer activation request sent by the system device, the MCE determines, according to the location information of the UE that is included in the first bearer activation request, the first L-BM-SC deployed at the location of the eNB to which the UE belongs.

Figure 9:
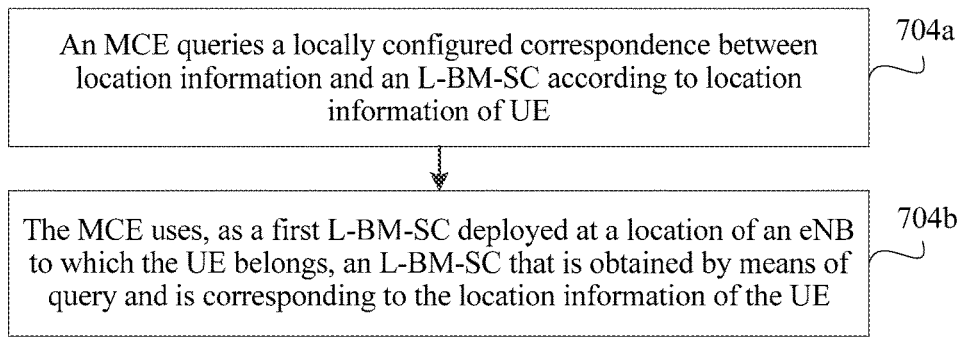
FIG. 9 is a method flowchart in which an MCE provided in the embodiment shown in FIG. 7 determines, according to location information of UE, a first L-BM-SC deployed at a location of an eNB to which the UE belongs.

Specifically, a correspondence between location information and an L-BM-SC is locally configured in the MCE. The MCE may determine, according to the location information of the UE and the correspondence between location information and an L-BM-SC, the first L-BM-SC deployed at the location of the eNB to which the UE belongs. Referring to FIG. 9, that the MCE determines, according to the location information of the UE, a first L-BM-SC deployed at the location of the eNB to which the UE belongs may include the following two steps.

Step 704*a*: The MCE queries a locally configured correspondence between location information and an L-BM-SC according to the location information of the UE.

The correspondence between location information and an L-BM-SC may also be a correspondence between an ECGI and an identifier of an L-BM-SC. The correspondence that is between location information and an L-BM-SC and is locally configured in the MCE may be shown in the following table 2:

TABLE 2

| ECGI | Identifier of an L-BM-SC |
|------|--------------------------|
| ID-1 | ID-L-BM-SC-A |
| ID-2 | ID-L-BM-SC-C |
| ID-3 | ID-L-BM-SC-B |
| ... | ... |

It is assumed that the location information (the ECGI) of the UE is ID-2. The MCE queries, according to the location information ID-2 of the UE, the correspondence that is between an ECGI and an identifier of an L-BM-SC and is shown in Table 2, and may learn that an identifier that is of an L-BM-SC and is corresponding to the location information ID-2 of the UE is ID-L-BM-SC-C.

Step 704*b*: The MCE uses, as the first L-BM-SC deployed at the location of the eNB to which the UE belongs, an L-BM-SC that is obtained by means of query and is corresponding to the location information of the UE.

The MCE uses, as the first L-BM-SC deployed at the location of the eNB to which the UE belongs, an L-BM-SC whose identifier is ID-L-BM-SC-C.

Step 705: The MCE establishes a bearer between the first L-BM-SC and a GCS AS.

When the MCE determines the first L-BM-SC deployed at the location of the eNB to which the UE belongs, the MCE establishes the bearer between the first L-BM-SC and the GCS AS, so that the GCS AS can send a packet to the first L-BM-SC by using the bearer between the first L-BM-SC and the GCS AS.

In this embodiment of the present invention, that the MCE establishes a bearer between the first L-BM-SC and a GCS AS may include: The MCE generates a second bearer activation request, and sends the second bearer activation request to the first L-BM-SC; when the first L-BM-SC receives the second bearer activation request, if the first L-BM-SC agrees to establish a bearer, the first L-BM-SC generates a second bearer response message that includes an address of the first L-BM-SC, and sends the second bearer response message to the MCE; the MCE may determine, according to whether the second bearer response message includes the address of the first L-BM-SC, whether the first L-BM-SC agrees to establish a bearer. If the second bearer response message includes the address of the first L-BM-SC, the MCE establishes the bearer between the first L-BM-SC and the GCS AS.

Step 706: The MCE sends a first bearer response message to the system device, where the first bearer response message includes an address of the first L-BM-SC.

After the MCE establishes the bearer between the first L-BM-SC and the GCS AS, the MCE generates a first bearer response message that includes the address of the first L-BM-SC, and sends the first bearer response message to the system device.

Step 707: The system device determines, according to the first bearer response message, that the bearer between the first L-BM-SC and the GCS AS is successfully established.

Specifically, the system device may determine, according to whether the first bearer response message includes the address of the first L-BM-SC, whether the bearer between the first L-BM-SC and the GCS AS is successfully established. When the first bearer response message includes the address of the first L-BM-SC, the system device determines that the bearer between the first L-BM-SC and the GCS AS is successfully established. In this embodiment of the present invention, because the first bearer response message includes the address of the first L-BM-SC, the system device determines that the bearer between the first L-BM-SC and the GCS AS is successfully established.

It should be noted that, a sequence of steps in the group communication method provided in this embodiment of the present invention may be adjusted properly, and a step may also be added or removed according to a condition. Any variation method readily figured out by persons skilled in the art within the technical scope disclosed in the present invention shall fall within the protection scope of the present invention. Therefore, details are not further described.

In conclusion, according to the group communication method provided in this embodiment of the present invention, when a system device determines that an L-BM-SC is deployed at a location of an eNB to which UE belongs, the system device determines, according to location information of the UE, an MCE that manages the eNB to which the UE belongs; and sends a first bearer activation request to the MCE. The first bearer activation request includes the location information of the UE. The MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

In the embodiments of the present invention, a system device may include any one of a GCS AS, an original BM-SC (that is, a BM-SC in the implementation environment shown in FIG. 2), or an MME. The following separately describes the present invention in more detail by using the system device as the GCS AS, the original BM-SC, and the MME.

Figure 10A:
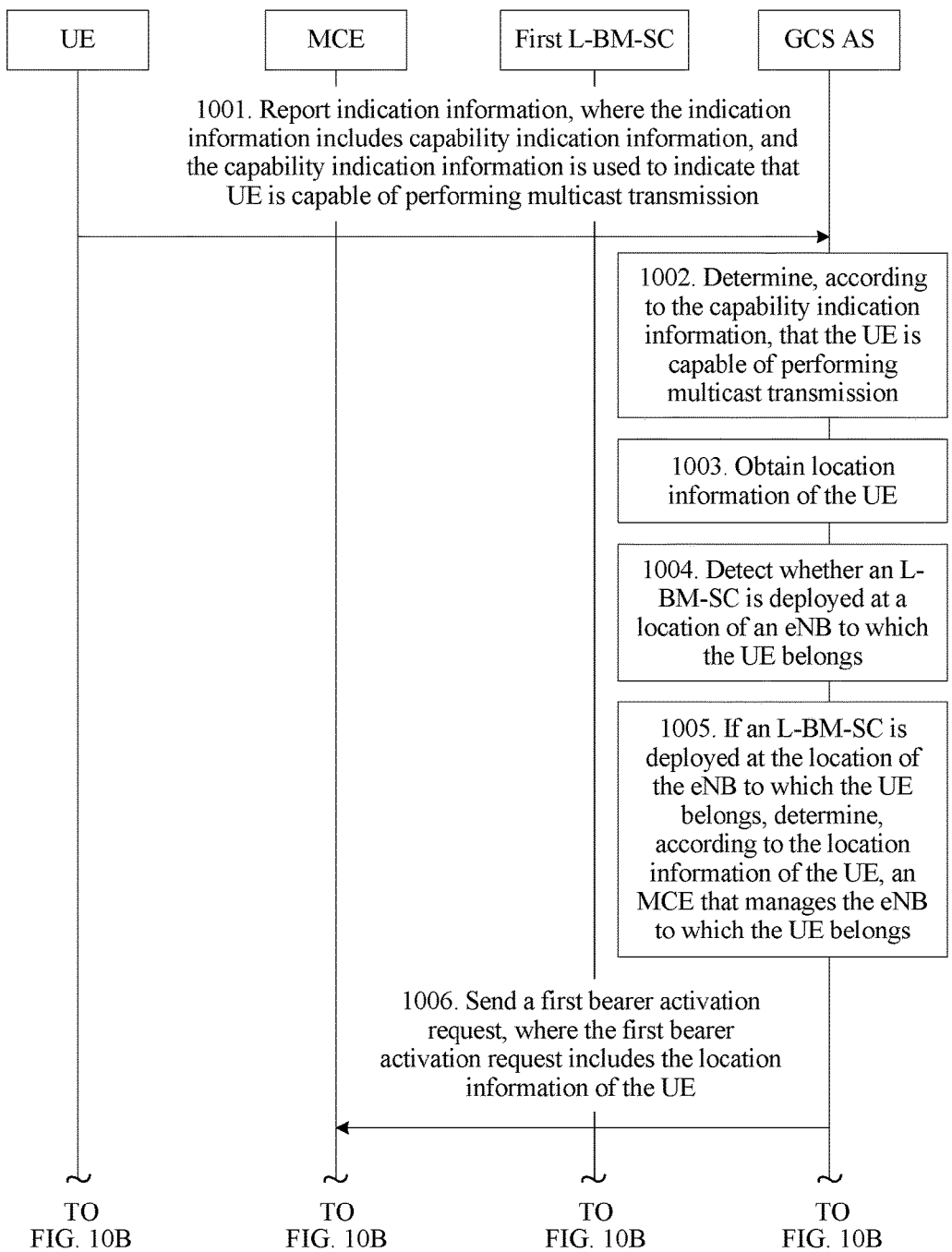
FIG. 10A and FIG. 10B are a method flowchart of a group communication method according to yet another embodiment of the present invention.
Figure 10B:
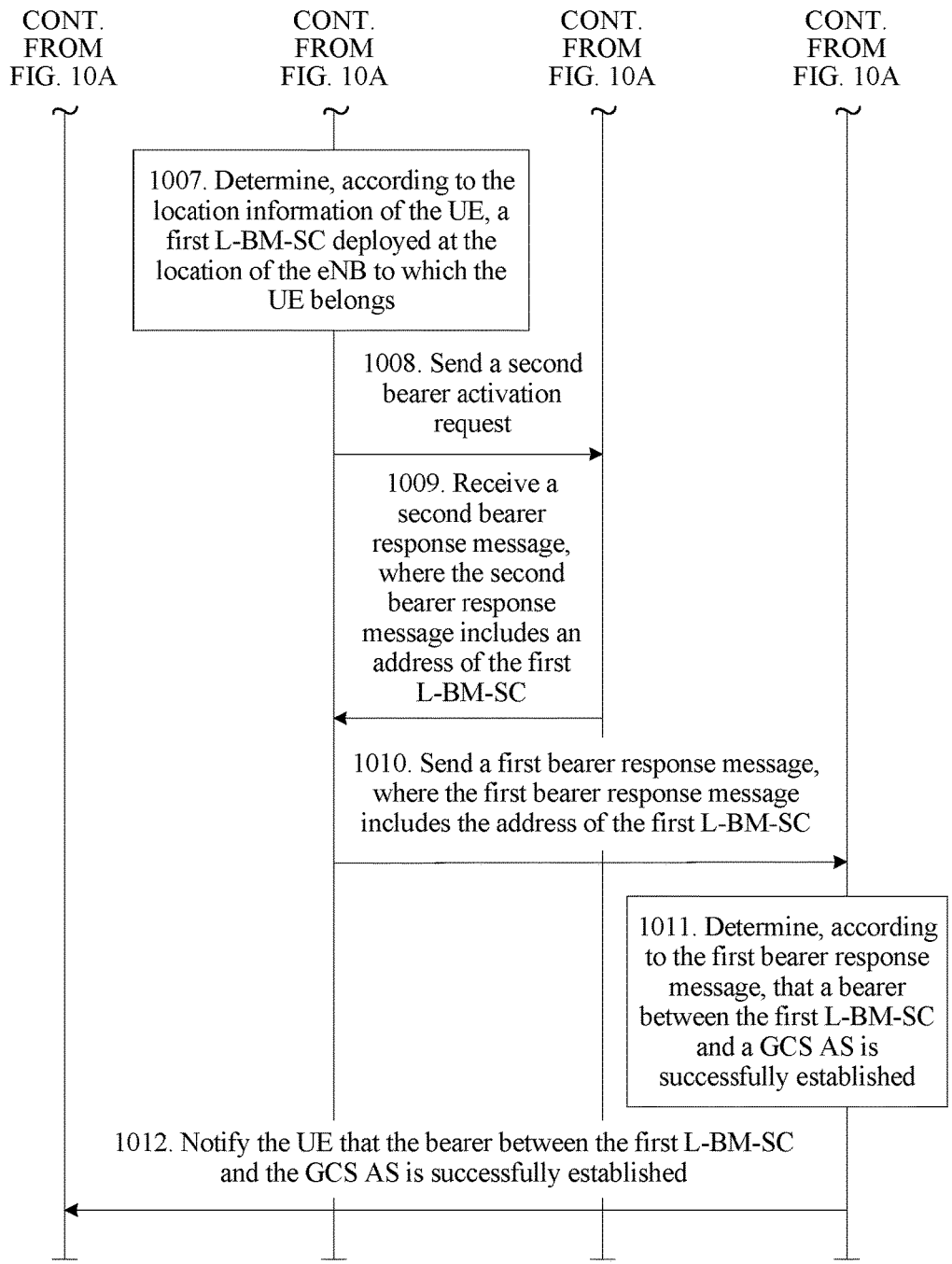

Referring to FIG. 10A and FIG. 10B, FIG. 10A and FIG. 10B show a method flowchart of a group communication method according to yet another embodiment of the present invention. In this embodiment, an example that the group communication method is applied to the implementation environment shown in FIG. 2 or FIG. 3 and a system device is a GCS AS is used for description. Referring to FIG. 10A and FIG. 10B, the method procedure may include the following several steps.

Step 1001: UE reports indication information to a GCS AS, where the indication information includes capability indication information, and the capability indication information is used to indicate that the UE is capable of performing multicast transmission.

In this embodiment of the present invention, the UE may report the indication information to the GCS AS by using a GC1 interface between the UE and the GCS AS; or the UE may report the indication information to the GCS AS by using a Session Initiation Protocol (SIP) used when the UE registers a group with the GCS AS.

The indication information includes the capability indication information. The capability indication information is used to indicate that the UE is capable of performing multicast transmission. For example, the capability indication information may be "Y", and "Y" is used to indicate that the UE is capable of performing multicast transmission. For another example, the capability indication information may be "1", and "1" is used to indicate that the UE is capable of performing multicast transmission. A form of the capability indication information is not specifically limited in the present invention.

The indication information may further include location information of the UE. The location information of the UE may be a cell identity of an area in which an eNB to which the UE belongs is located. For example, the location information of the UE may be an ECGI.

Step 1002: The GCS AS determines, according to the capability indication information, that the UE is capable of performing multicast transmission.

When the GCS AS receives the indication information reported by the UE, the GCS AS determines, according to the capability indication information in the indication information, that the UE is capable of performing multicast transmission.

Specifically, the GCS AS may parse the indication information, and determine, according to whether the indication information includes the capability indication information, whether the UE is capable of performing multicast transmission. If the indication information includes the capability indication information, the GCS AS determines that the UE is capable of performing multicast transmission. In this embodiment of the present invention, it is assumed that the UE is capable of performing multicast transmission, and step 1003 is performed.

Step 1003: The GCS AS obtains location information of the UE.

If the GCS AS determines that the UE is capable of performing multicast transmission, the GCS AS obtains the location information of the UE.

In this embodiment of the present invention, that the GCS AS obtains location information of the UE may include the following two cases:

In a first case, when the indication information reported by the UE includes the location information of the UE, the GCS AS may directly obtain the location information of the UE according to the indication information reported by the UE.

In a second case, when the indication information reported by the UE does not include the location information of the UE, the GCS AS obtains the location information of the UE from a PCRF. Specifically, the PCRF may maintain a correspondence between an identifier of the UE and location information of UE. The GCS AS may obtain the location information of the UE from the PCRF according to the identifier of the UE. The GCS AS learns of the identifier of the UE in advance.

Step 1004: The GCS AS detects whether an L-BM-SC is deployed at a location of an eNB to which the UE belongs.

The GCS AS may detect, according to the location information of the UE, whether an L-BM-SC is deployed at the location of the eNB to which the UE belongs.

Specifically, L-BM-SC-related information is configured in the GCS AS. For example, a correspondence between location information and an address of an L-BM-SC is configured in the GCS AS. The GCS AS may query, according to the location information of the UE, the correspondence that is between location information and an address of an L-BM-SC and is locally configured in the GCS AS, and detect whether an L-BM-SC is deployed at the location of the eNB to which the UE belongs. If an address that is of an L-BM-SC and is corresponding to the location information of the UE exists in the correspondence that is between location information and an address of an L-BM-SC and is locally configured in the GCS AS, the GCS AS determines that an L-BM-SC is deployed at the location of the eNB to which the UE belongs.

Step 1005: If an L-BM-SC is deployed at the location of the eNB to which the UE belongs, the GCS AS determines, according to the location information of the UE, an MCE that manages the eNB to which the UE belongs.

Step 1005 is the same as or similar to step 702 in the embodiment shown in FIG. 7. In this embodiment, details are not described herein again.

Step 1006: The GCS AS sends a first bearer activation request to the MCE, where the first bearer activation request includes the location information of the UE.

When the GCS AS determines the MCE that manages the eNB to which the UE belongs, the GCS AS sends the first bearer activation request to the MCE. The first bearer activation request includes the location information of the UE.

Specifically, before the GCS AS sends the first bearer activation request to the MCE, the GCS AS determines a security key generation entity. The security key generation entity may be the GCS AS or a first L-BM-SC. If the GCS AS determines that the GCS AS generates a security key, the GCS AS generates a first security key. The security key is used to encrypt or decrypt a packet exchanged between the GCS AS and the first L-BM-SC, between the first L-BM-SC and the eNB, and between the eNB and the UE.

In addition, the GCS AS may further request an original BM-SC to preallocate a group identity to a group of the UE, and store the group identity. The group identity may be a temporary mobile group identity (TMGI), and is used to identify the group of the UE. When the GCS AS sends the first bearer activation request to the MCE, if the GCS AS stores the group identity, the first bearer activation request further includes a first group identity. The first group identity is preallocated by the original BM-SC to the UE and is stored by the GCS AS.

The GCS AS may generate a first bearer activation request that includes the location information of the UE, and send the first bearer activation request to the MCE. The first bearer activation request may further include the first security key and/or the first group identity.

Step 1007: The MCE determines, according to the location information of the UE, a first L-BM-SC deployed at the location of the eNB to which the UE belongs.

Step 1007 is the same as or similar to step 704 in the embodiment shown in FIG. 7. In this embodiment, details are not described herein again. However, it should be noted that, when the system device is the GCS AS, the first L-BM-SC may be obtained by moving the original BM-SC to the location of the eNB to which the UE belongs, or may be obtained by establishing a new BM-SC at the location of the eNB to which the UE belongs. The original BM-SC is used to perform data transmission between the GCS AS and each eNB.

Step 1008: The MCE sends a second bearer activation request to the first L-BM-SC.

When the first bearer activation request includes the first security key and/or the first group identity, the second bearer activation request also includes the first security key and/or the first group identity, so that the first L-BM-SC learns of the security key for the packet exchanged between the GCS AS and the first L-BM-SC and/or the group identity of the group of the UE.

Step 1009: The MCE receives a second bearer response message sent by the first L-BM-SC, where the second bearer response message includes an address of the first L-BM-SC.

When the first L-BM-SC receives the second bearer activation request, if the first L-BM-SC agrees to establish a bearer, the first L-BM-SC generates a second bearer response message that includes the address of the first L-BM-SC, and sends the second bearer response message to the MCE.

When the second bearer activation request does not include the first security key and/or the first group identity, the first L-BM-SC generates a security key and/or the first L-BM-SC allocates a group identity to the group of the UE, and sends the security key and/or the group identity to the MCE by using the second bearer response message.

That is, when the second bearer activation request does not include the first security key and/or the first group identity, the second bearer response message further includes a second security key and/or a second group identity.

Step 1010: The MCE sends a first bearer response message to the GCS AS, where the first bearer response message includes the address of the first L-BM-SC.

Step 1010 is the same as or similar to step 706 in the embodiment shown in FIG. 7. In this embodiment, details are not described herein again. However, it should be noted that, when the second bearer response message further includes the second security key and/or the second group identity, the first bearer response message also includes the second security key and/or the second group identity, so that the GCS AS learns of the security key for the packet exchanged between the GCS AS and the first L-BM-SC and/or the group identity allocated by the first L-BM-SC to the group of the UE.

Step 1011: The GCS AS determines, according to the first bearer response message, that a bearer between the first L-BM-SC and the GCS AS is successfully established.

Step 1011 is the same as or similar to step 707 in the embodiment shown in FIG. 7. In this embodiment, details are not described herein again.

Step 1012: The GCS AS notifies the UE that the bearer between the first L-BM-SC and the GCS AS is successfully established.

When the GCS AS determines that the bearer between the first L-BM-SC and the GCS AS is successfully established, the GCS AS notifies the UE that the bearer between the first L-BM-SC and the GCS AS is successfully established.

Specifically, the GCS AS may send notification information to the UE, and the notification information may include a security key and a group identity, so that the UE learns of the security key and the group identity of the group of the UE.

The notification information may further include a uniform resource locator (URL) of a user service description (USD), so that the UE obtains USD information according to the URL of the USD, and sends or receives a packet according to the USD information.

The notification information may further include a service type identifier and related parameter information, and the service type identifier and the related parameter information are the same as those in the prior art. In this embodiment, details are not further described herein.

It should be noted that, a sequence of steps in the group communication method provided in this embodiment of the present invention may be adjusted properly, and a step may also be added or removed according to a condition. Any variation method readily figured out by persons skilled in the art within the technical scope disclosed in the present invention shall fall within the protection scope of the present invention. Therefore, details are not further described.

In conclusion, according to the group communication method provided in this embodiment of the present invention, when a GCS AS determines that an L-BM-SC is deployed at a location of an eNB to which UE belongs, the GCS AS determines, according to location information of the UE, an MCE that manages the eNB to which the UE belongs; and sends a first bearer activation request to the MCE. The first bearer activation request includes the location information of the UE. The MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 11A:
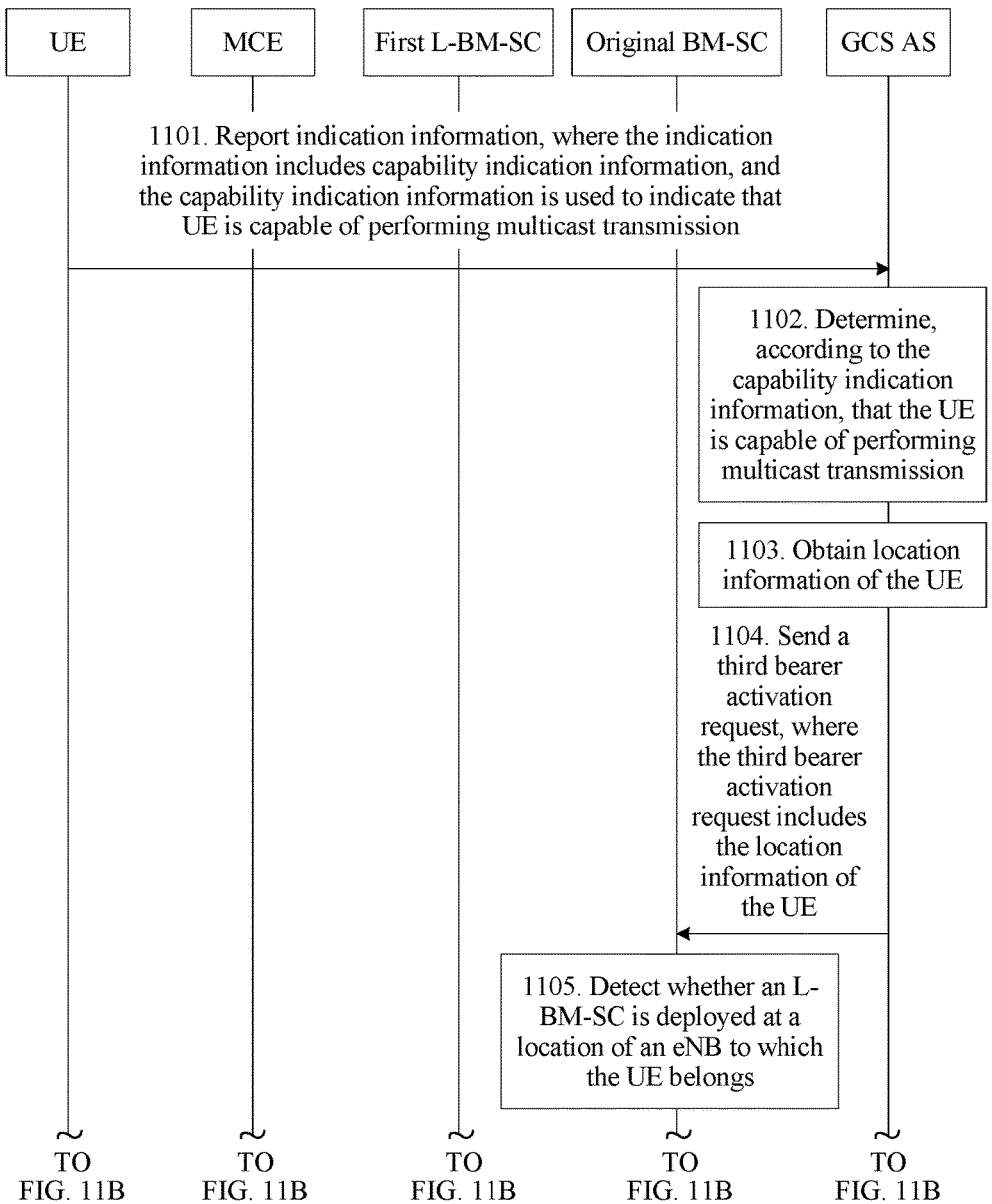
FIG. 11A and FIG. 11B are a method flowchart of a group communication method according to yet another embodiment of the present invention.
Figure 11B:
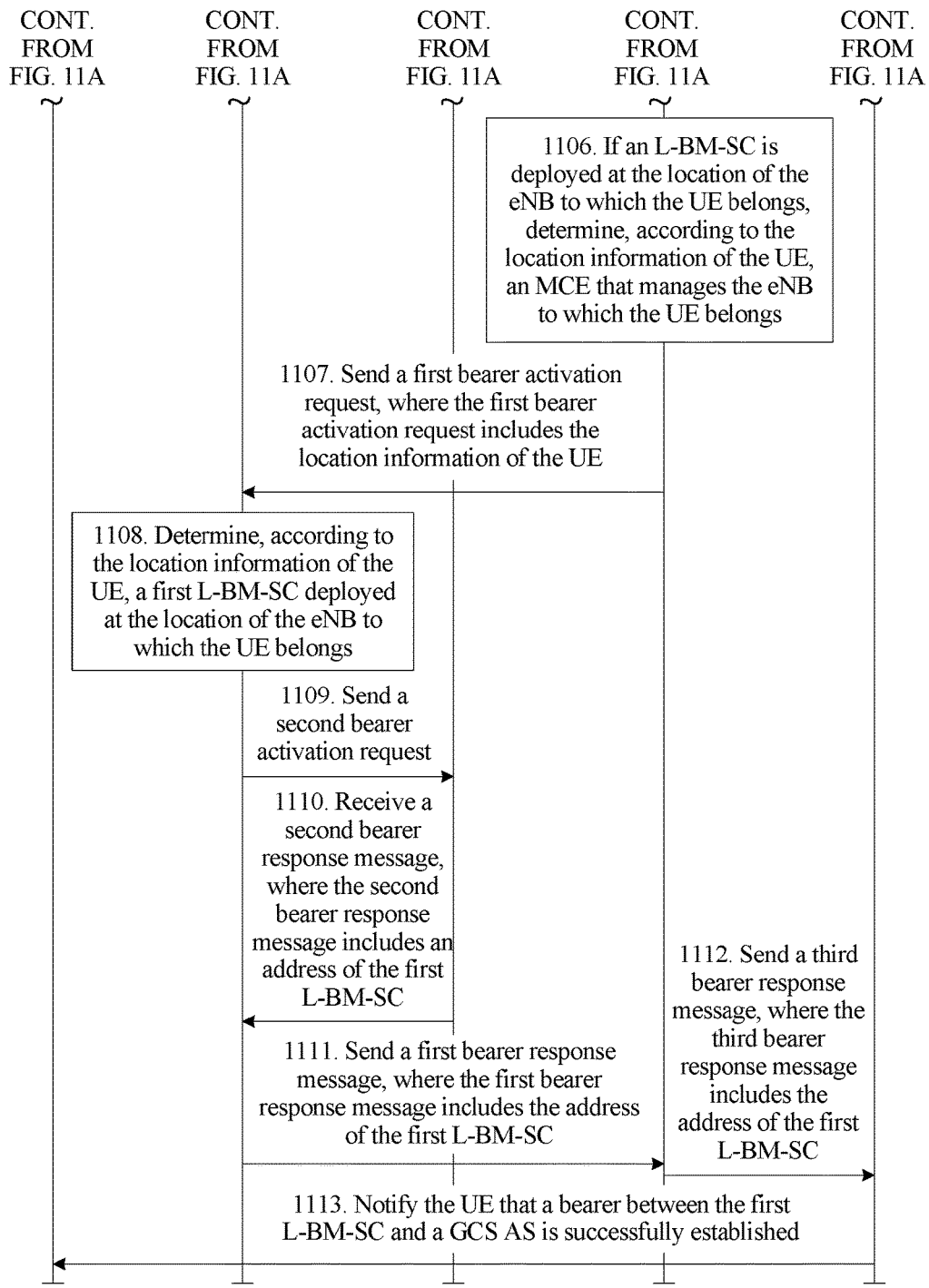

Referring to FIG. 11A and FIG. 11B, FIG. 11A and FIG. 11B show a method flowchart of a group communication method according to yet another embodiment of the present invention. In this embodiment, an example that the group communication method is applied to the implementation environment shown in FIG. 2 and a system device is an original BM-SC (the BM-SC shown in FIG. 2) is used for description. Referring to FIG. 11A and FIG. 11B, the method procedure may include the following several steps.

Step 1101: UE reports indication information to a GCS AS, where the indication information includes capability indication information, and the capability indication information is used to indicate that the UE is capable of performing multicast transmission.

Step 1102: The GCS AS determines, according to the capability indication information, that the UE is capable of performing multicast transmission.

Step 1103: The GCS AS obtains location information of the UE.

Steps 1101 to 1103 are the same as or similar to steps 1001 to 1003 in the embodiment shown in FIG. 10A and FIG. 10B. In this embodiment, details are not described herein again.

Step 1104: The GCS AS sends a third bearer activation request to an original BM-SC, where the third bearer activation request includes the location information of the UE.

When the GCS AS obtains the location information of the UE, the GCS AS sends the third bearer activation request to the original BM-SC. The third bearer activation request includes the location information of the UE.

Specifically, before the GCS AS sends the third bearer activation request to the original BM-SC, the GCS AS determines a security key generation entity. The security key generation entity may be the GCS AS or a first L-BM-SC. If the GCS AS determines that the GCS AS generates a security key, the GCS AS generates a first security key. The security key is used to encrypt or decrypt a packet exchanged between the GCS AS and the first L-BM-SC, between the first L-BM-SC and an eNB, and between the eNB and the UE. The first L-BM-SC is obtained by establishing a new BM-SC at a location of the eNB to which the UE belongs.

In addition, the GCS AS may further request the original BM-SC to preallocate a group identity to a group of the UE, and store the group identity. The group identity may be a TMGI, and is used to identify the group of the UE. When the GCS AS sends a first bearer activation request to an MCE, if the GCS AS stores the group identity, the first bearer activation request further includes a first group identity. The first group identity is preallocated by the original BM-SC to the UE and is stored by the GCS AS.

The GCS AS may generate a third bearer activation request that includes the location information of the UE, and send the third bearer activation request to the original BM-SC. The third bearer activation request may further include the first security key and/or the first group identity.

Step 1105: The original BM-SC detects whether an L-BM-SC is deployed at a location of an eNB to which the UE belongs.

Specifically, the original BM-SC extracts the location information of the UE from the third bearer activation request, and detects, according to the location information of the UE, whether an L-BM-SC is deployed at the location of the eNB to which the UE belongs. A specific implementation process in which the original BM-SC detects whether an L-BM-SC is deployed at the location of the eNB to which the UE belongs is the same as or similar to step 1004 in the embodiment shown in FIG. 10A and FIG. 10B. In this embodiment, details are not described herein again. However, it should be noted that, in this embodiment, an L-BM-SC is obtained by establishing a new BM-SC at the location of the eNB to which the UE belongs.

Step 1106: If an L-BM-SC is deployed at the location of the eNB to which the UE belongs, the original BM-SC determines, according to the location information of the UE, an MCE that manages the eNB to which the UE belongs.

Step 1106 is the same as or similar to step 1005 in the embodiment shown in FIG. 10A and FIG. 10B. In this embodiment, details are not described herein again.

Step 1107: The original BM-SC sends a first bearer activation request to the MCE, where the first bearer activation request includes the location information of the UE.

After the original BM-SC determines the MCE that manages the eNB to which the UE belongs, the original BM-SC generates a first bearer activation request that includes the location information of the UE, and sends the first bearer activation request to the MCE.

It should be noted that, when the third bearer activation request includes the first security key and/or the first group identity, the first bearer activation request also includes the first security key and/or the first group identity. That is, when the third bearer activation request includes the first security key, the first bearer activation request includes the first security key; when the third bearer activation request includes the first group identity, the first bearer activation request includes the first group identity; when the third bearer activation request includes the first security key and/or the first group identity, the first bearer activation request includes the first security key and/or the first group identity.

Step 1108: The MCE determines, according to the location information of the UE, a first L-BM-SC deployed at the location of the eNB to which the UE belongs.

Step 1109: The MCE sends a second bearer activation request to the first L-BM-SC.

Step 1110: The MCE receives a second bearer response message sent by the first L-BM-SC, where the second bearer response message includes an address of the first L-BM-SC.

Steps 1108 to 1110 are the same as or similar to steps 1007 to 1009 in the embodiment shown in FIG. 10A and FIG. 10B. In this embodiment, details are not described herein again.

Step 1111: The MCE sends a first bearer response message to the original BM-SC, where the first bearer response message includes the address of the first L-BM-SC.

When the second bearer response message includes a second security key and/or a second group identity, the first bearer response message also includes the second security key and/or the second group identity, so that the original BM-SC sends a third bearer response message to the GCS AS. The third bearer response message includes the second security key and/or the second group identity. The GCS AS learns of the security key for the packet exchanged between the GCS AS and the first L-BM-SC and/or the group identity allocated by the first L-BM-SC to the group of the UE.

Step 1112: The original BM-SC sends a third bearer response message to the GCS AS, where the third bearer response message includes the address of the first L-BM-SC.

When the first bearer response message includes the second security key and/or the second group identity, the third bearer response message also includes the second security key and/or the second group identity, so that the GCS AS learns of the security key for the packet exchanged between the GCS AS and the first L-BM-SC and/or the group identity allocated by the first L-BM-SC to the group of the UE.

Step 1113: The GCS AS notifies the UE that a bearer between the first L-BM-SC and the GCS AS is successfully established.

After the GCS AS receives the third bearer response message sent by the original BM-SC, if the third bearer response message includes the address of the first L-BM-SC, the GCS AS determines that the bearer between the first L-BM-SC and the GCS AS is successfully established, and notifies the UE that the bearer between the first L-BM-SC and the GCS AS is successfully established. A process in which the GCS AS notifies the UE that the bearer between the first L-BM-SC and the GCS AS is successfully established is the same as or similar to step 1012 in the embodiment shown in FIG. 10A and FIG. 10B. In this embodiment, details are not described herein again.

It should be noted that, a sequence of steps in the group communication method provided in this embodiment of the present invention may be adjusted properly, and a step may also be added or removed according to a condition. Any variation method readily figured out by persons skilled in the art within the technical scope disclosed in the present invention shall fall within the protection scope of the present invention. Therefore, details are not further described.

In conclusion, according to the group communication method provided in this embodiment of the present invention, when an original BM-SC determines that an L-BM-SC is deployed at a location of an eNB to which UE belongs, the original BM-SC determines, according to location information of the UE, an MCE that manages the eNB to which the UE belongs; and sends a first bearer activation request to the MCE. The first bearer activation request includes the location information of the UE. The MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 12A:
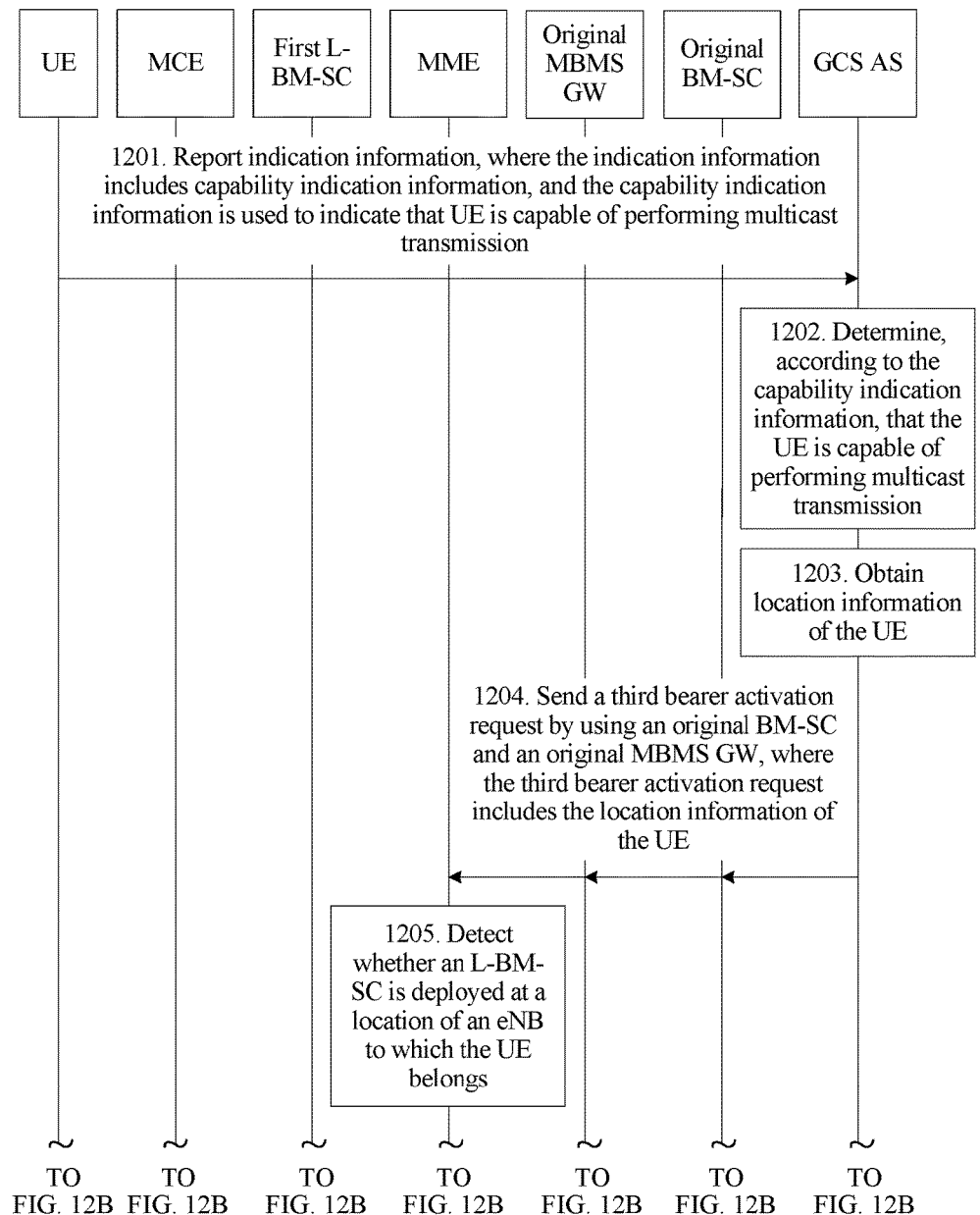
FIG. 12A, FIG. 12B, and FIG. 12C are a method flowchart of a group communication method according to yet another embodiment of the present invention.
Figure 12B:
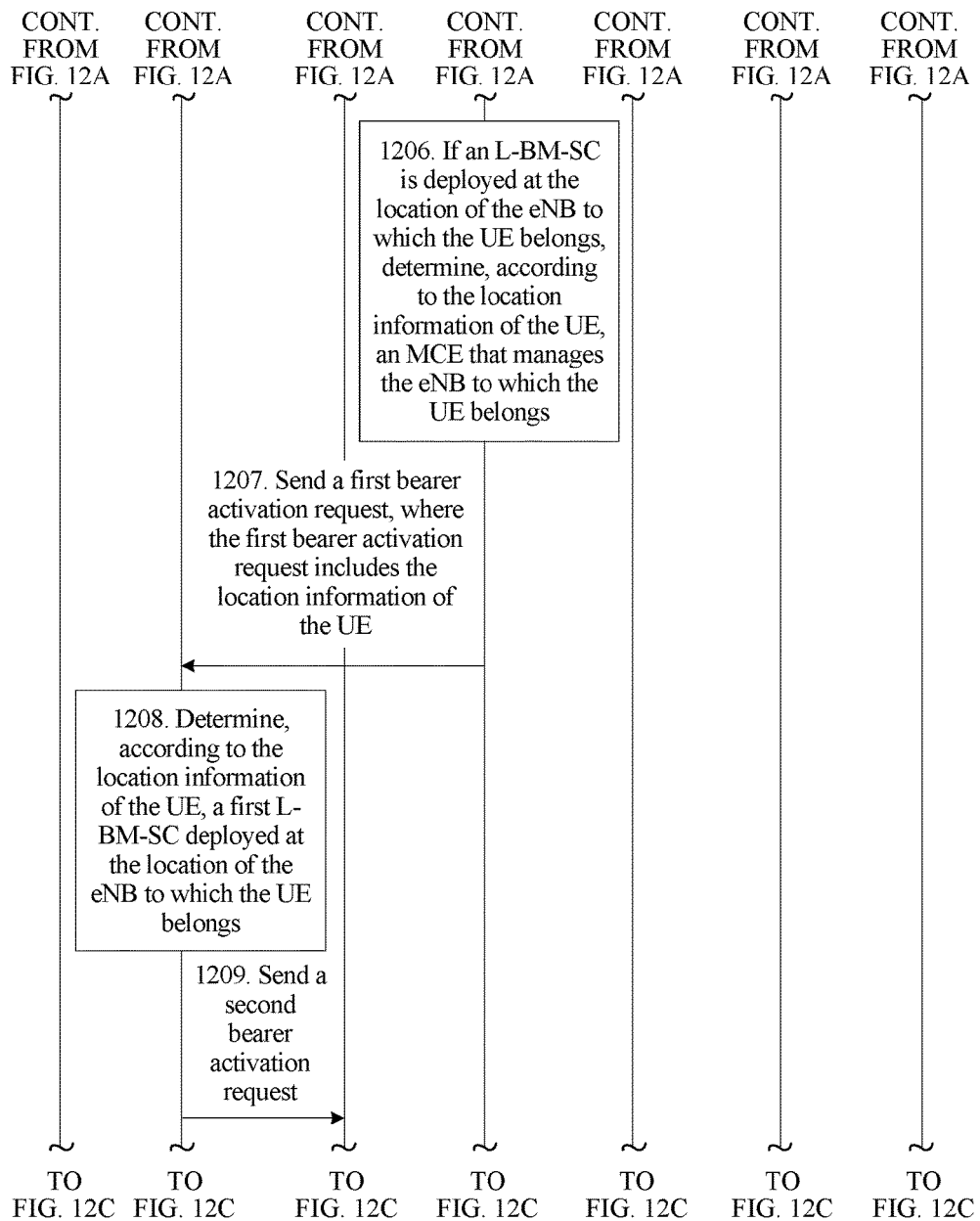
Figure 12C:
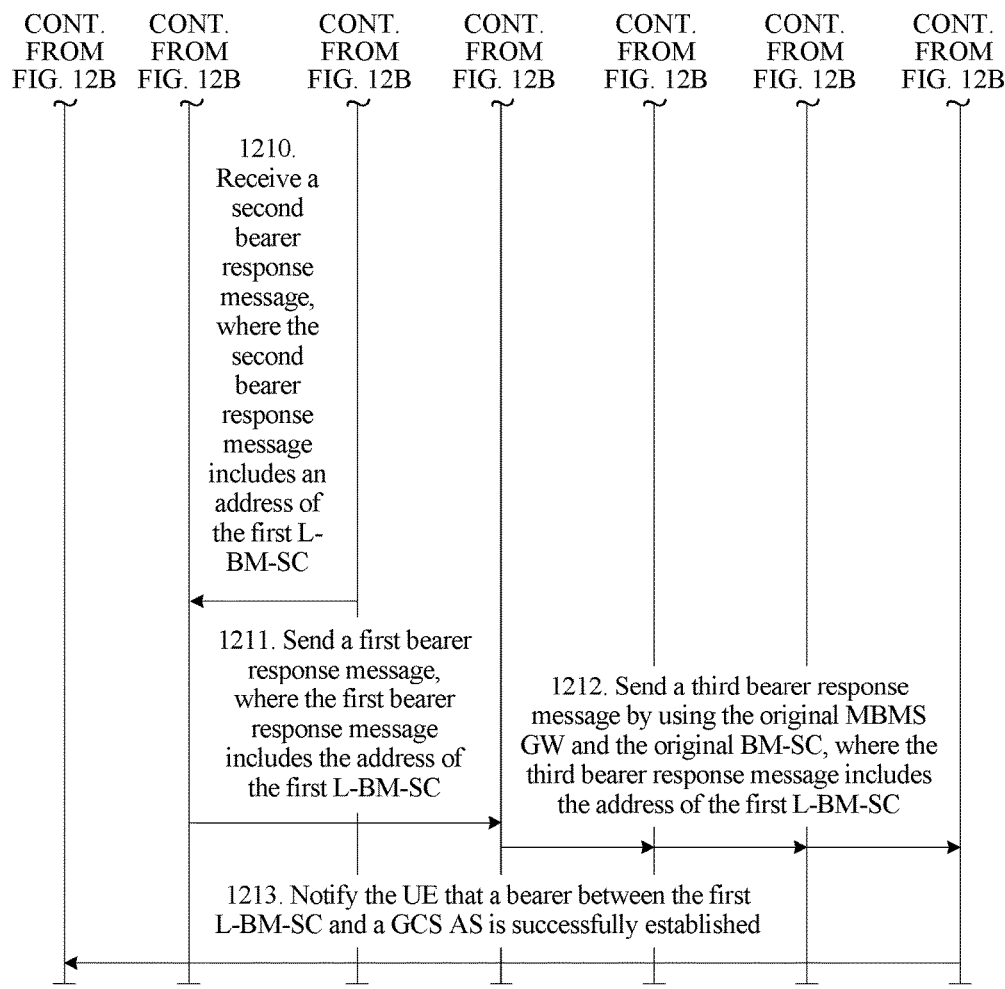

Referring to FIG. 12A, FIG. 12B, and FIG. 12C, FIG. 12A, FIG. 12B, and FIG. 12C show a method flowchart of a group communication method according to yet another embodiment of the present invention. In this embodiment, an example that the group communication method is applied to the implementation environment shown in FIG. 2 and a system device is an MME is used for description. Referring to FIG. 12A, FIG. 12B, and FIG. 12C, the method procedure may include the following several steps.

Step 1201: UE reports indication information to a GCS AS, where the indication information includes capability indication information, and the capability indication information is used to indicate that the UE is capable of performing multicast transmission.

Step 1202: The GCS AS determines, according to the capability indication information, that the UE is capable of performing multicast transmission.

Step 1203: The GCS AS obtains location information of the UE.

Steps 1201 to 1203 are the same as or similar to steps 1001 to 1003 in the embodiment shown in FIG. 10A and FIG. 10B. In this embodiment, details are not described herein again.

Step 1204: The GCS AS sends a third bearer activation request to an MME by using an original BM-SC and an original MBMS GW, where the third bearer activation request includes the location information of the UE.

When the GCS AS obtains the location information of the UE, the GCS AS sends the third bearer activation request to the MME by using the original BM-SC and the original MBMS GW. The third bearer activation request includes the location information of the UE. That is, the GCS AS first sends the third bearer activation request to the original BM-SC, the original BM-SC sends the third bearer activation request to the original MBMS GW, and the MBMS GW sends the third bearer activation request to the MME.

Specifically, before the GCS AS sends the third bearer activation request to the MME by using the original BM-SC and the original MBMS GW, the GCS AS determines a security key generation entity. The security key generation entity may be the GCS AS or a first L-BM-SC. If the GCS AS determines that the GCS AS generates a security key, the GCS AS generates a first security key. The security key is used to encrypt or decrypt a packet exchanged between the GCS AS and the first L-BM-SC, between the first L-BM-SC and an eNB, and between the eNB and the UE. The first L-BM-SC is obtained by establishing a new BM-SC at a location of the eNB to which the UE belongs.

In addition, the GCS AS may further request the original BM-SC to preallocate a group identity to a group of the UE, and store the group identity. The group identity may be a TMGI, and is used to identify the group of the UE. When the GCS AS sends a first bearer activation request to an MCE, if the GCS AS stores the group identity, the first bearer activation request further includes a first group identity. The first group identity is preallocated by the original BM-SC to the UE and is stored by the GCS AS.

The GCS AS may generate a third bearer activation request that includes the location information of the UE, and send the third bearer activation request to the MME by using the original BM-SC and the original MBMS GW. The third bearer activation request may further include the first security key and/or the first group identity.

Step 1205: The MME detects whether an L-BM-SC is deployed at a location of an eNB to which the UE belongs.

Specifically, the MME extracts the location information of the UE from the third bearer activation request, and detects, according to the location information of the UE, whether an L-BM-SC is deployed at the location of the eNB to which the UE belongs. A specific implementation process in which the MME detects whether an L-BM-SC is deployed at the location of the eNB to which the UE belongs is the same as or similar to step 1004 in the embodiment shown in FIG. 10A and FIG. 10B. In this embodiment, details are not described herein again. However, it should be noted that, in this embodiment, an L-BM-SC is obtained by establishing a new BM-SC at the location of the eNB to which the UE belongs.

Step 1206: If an L-BM-SC is deployed at the location of the eNB to which the UE belongs, the MME determines, according to the location information of the UE, an MCE that manages the eNB to which the UE belongs.

Step 1206 is the same as or similar to step 1005 in the embodiment shown in FIG. 10A and FIG. 10B. In this embodiment, details are not described herein again.

Step 1207: The MME sends a first bearer activation request to the MCE, where the first bearer activation request includes the location information of the UE.

After the MME determines the MCE that manages the eNB to which the UE belongs, the MME generates a first bearer activation request that includes the location information of the UE, and sends the first bearer activation request to the MCE.

It should be noted that, when the third bearer activation request includes the first security key and/or the first group identity, the first bearer activation request also includes the first security key and/or the first group identity.

Step 1208: The MCE determines, according to the location information of the UE, a first L-BM-SC deployed at the location of the eNB to which the UE belongs.

Step 1209: The MCE sends a second bearer activation request to the first L-BM-SC.

Step 1210: The MCE receives a second bearer response message sent by the first L-BM-SC, where the second bearer response message includes an address of the first L-BM-SC.

Steps 1208 to 1210 are the same as or similar to steps 1007 to 1009 in the embodiment shown in FIG. 10A and FIG. 10B. In this embodiment, details are not described herein again.

Step 1211: The MCE sends a first bearer response message to the MME, where the first bearer response message includes the address of the first L-BM-SC.

When the second bearer response message includes a second security key and/or a second group identity, the first bearer response message also includes the second security key and/or the second group identity, so that the MME sends a third bearer response message to the GCS AS by using the original MBMS GW and the original BM-SC. The third bearer response message includes the second security key and/or the second group identity. The GCS AS learns of the security key for the packet exchanged between the GCS AS and the first L-BM-SC and/or the group identity allocated by the first L-BM-SC to the group of the UE.

Step 1212: The MME sends a third bearer response message to the GCS AS by using the original MBMS GW and the original BM-SC, where the third bearer response message includes the address of the first L-BM-SC.

Specifically, the MME generates a third bearer response message that includes the address of the first L-BM-SC, and sends the third bearer response message to the original MBMS GW and the original BM-SC, and the original BM-SC sends the third bearer response message to the GCS AS.

When the first bearer response message includes the second security key and/or the second group identity, the third bearer response message also includes the second security key and/or the second group identity, so that the GCS AS learns of the security key for the packet exchanged between the GCS AS and the first L-BM-SC and/or the group identity allocated by the first L-BM-SC to the group of the UE.

Step 1213: The GCS AS notifies the UE that a bearer between the first L-BM-SC and the GCS AS is successfully established.

After the GCS AS receives the third bearer response message sent by the MME by using the original BM-SC, if the third bearer response message includes the address of the first L-BM-SC, the GCS AS determines that the bearer between the first L-BM-SC and the GCS AS is successfully established, and notifies the UE that the bearer between the first L-BM-SC and the GCS AS is successfully established. A process in which the GCS AS notifies the UE that the bearer between the first L-BM-SC and the GCS AS is successfully established is the same as or similar to step 1012 in the embodiment shown in FIG. 10A and FIG. 10B. In this embodiment, details are not described herein again.

It should be noted that, a sequence of steps in the group communication method provided in this embodiment of the present invention may be adjusted properly, and a step may also be added or removed according to a condition. Any variation method readily figured out by persons skilled in the art within the technical scope disclosed in the present invention shall fall within the protection scope of the present invention. Therefore, details are not further described.

In conclusion, according to the group communication method provided in this embodiment of the present invention, when an MME determines that an L-BM-SC is deployed at a location of an eNB to which UE belongs, the MME determines, according to location information of the UE, an MCE that manages the eNB to which the UE belongs; and sends a first bearer activation request to the MCE. The first bearer activation request includes the location information of the UE. The MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

The embodiment shown in FIG. 12A, FIG. 12B, and FIG. 12C shows an implementation method used in the present invention when a system device is an MME. When the system device is the MME, another implementation method further exists in the present invention, and is specifically as follows.

Figure 13A:
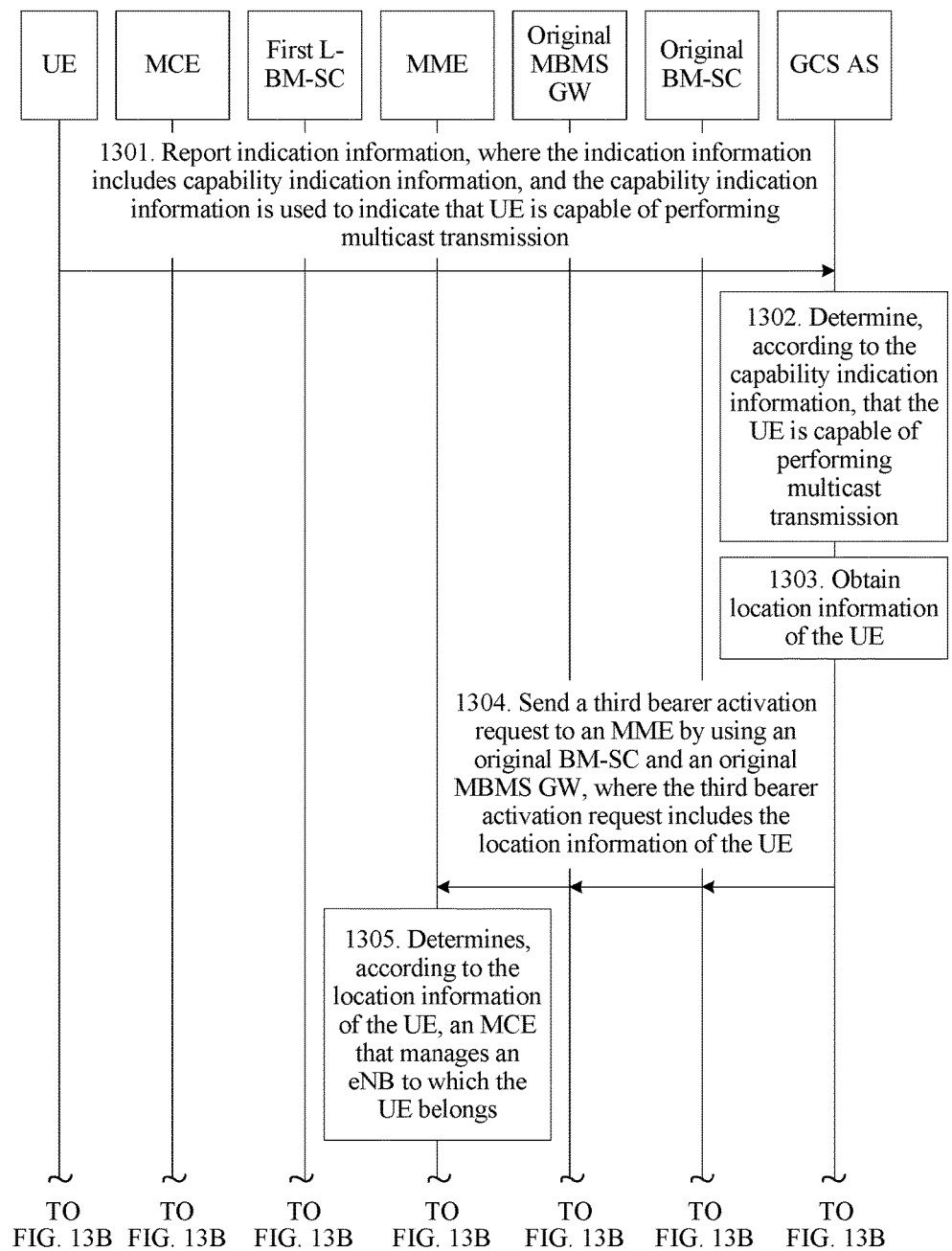
FIG. 13A, FIG. 13B, and FIG. 13C are a method flowchart of a group communication method according to yet another embodiment of the present invention.
Figure 13B:
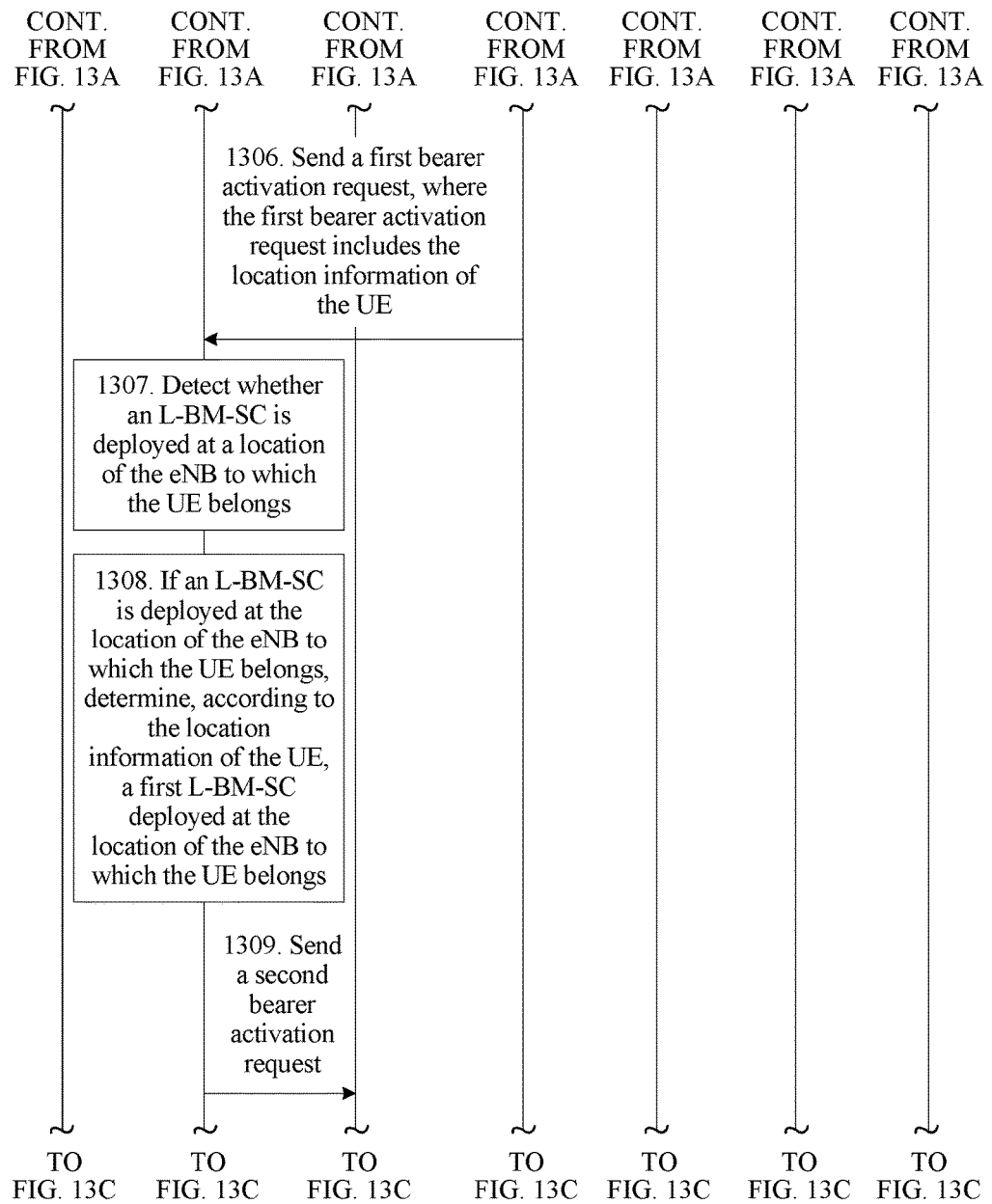
Figure 13C:
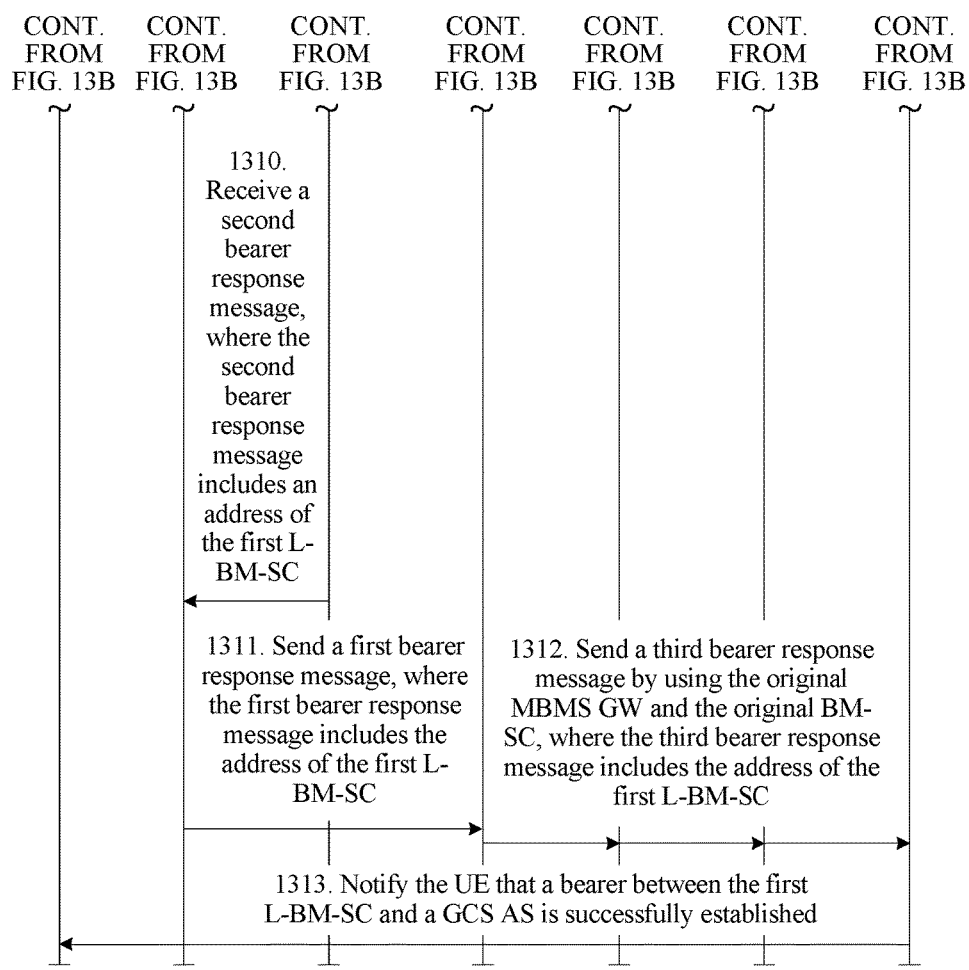

Referring to FIG. 13A, FIG. 13B, and FIG. 13C, FIG. 13A, FIG. 13B, and FIG. 13C show a method flowchart of a group communication method according to yet another embodiment of the present invention. In this embodiment, an example that the group communication method is applied to the implementation environment shown in FIG. 2 and a system device is still an MME is used for description. Referring to FIG. 13A, FIG. 13B, and FIG. 13C, the method procedure may include the following several steps.

Step 1301: UE reports indication information to a GCS AS, where the indication information includes capability indication information, and the capability indication information is used to indicate that the UE is capable of performing multicast transmission.

Step 1302: The GCS AS determines, according to the capability indication information, that the UE is capable of performing multicast transmission.

Step 1303: The GCS AS obtains location information of the UE.

Steps 1301 to 1303 are the same as or similar to steps 1001 to 1003 in the embodiment shown in FIG. 10A and FIG. 10B. In this embodiment, details are not described herein again.

Step 1304: The GCS AS sends a third bearer activation request to an MME by using an original BM-SC and an original MBMS GW, where the third bearer activation request includes the location information of the UE.

When the GCS AS obtains the location information of the UE, the GCS AS sends the third bearer activation request to the MME by using the original BM-SC and the original MBMS GW successively. The third bearer activation request includes the location information of the UE. That is, the GCS AS first sends the third bearer activation request to the original BM-SC, the original BM-SC sends the third bearer activation request to the MBMS GW, and the MBMS GW sends the third bearer activation request to the MME.

Specifically, before the GCS AS sends the third bearer activation request to the MME by using the original BM-SC and the original MBMS GW, the GCS AS determines a security key generation entity. The security key generation entity may be the GCS AS or a first L-BM-SC. If the GCS AS determines that the GCS AS generates a security key, the GCS AS generates a first security key. The security key is used to encrypt or decrypt a packet exchanged between the GCS AS and the first L-BM-SC, between the first L-BM-SC and an eNB, and between the eNB and the UE. The first L-BM-SC is obtained by establishing a new BM-SC at a location of the eNB to which the UE belongs.

In addition, the GCS AS may further request the original BM-SC to preallocate a group identity to a group of the UE, and store the group identity. The group identity may be a TMGI, and is used to identify the group of the UE. When the GCS AS sends a first bearer activation request to an MCE, if the GCS AS stores the group identity, the first bearer activation request further includes a first group identity. The first group identity is preallocated by the original BM-SC to the UE and is stored by the GCS AS.

The GCS AS may generate a third bearer activation request that includes the location information of the UE, and send the third bearer activation request to the MME by using the original BM-SC and the original MBMS GW. The third bearer activation request may further include the first security key and/or the first group identity.

Step 1305: The MME determines, according to the location information of the UE, an MCE that manages an eNB to which the UE belongs.

Step 1305 is the same as or similar to step 1005 in the embodiment shown in FIG. 10A and FIG. 10B. In this embodiment, details are not described herein again.

Step 1306: The MME sends a first bearer activation request to the MCE, where the first bearer activation request includes the location information of the UE.

After the MME determines the MCE that manages the eNB to which the UE belongs, the MME generates a first bearer activation request that includes the location information of the UE, and sends the first bearer activation request to the MCE.

It should be noted that, when the third bearer activation request includes the first security key and/or the first group identity, the first bearer activation request also includes the first security key and/or the first group identity.

Step 1307: The MCE detects whether an L-BM-SC is deployed at a location of the eNB to which the UE belongs.

Step 1307 is the same as or similar to step 1004 in the embodiment shown in FIG. 10A and FIG. 10B. In this embodiment, details are not described herein again. However, it should be noted that, in this embodiment, an L-BM-SC is obtained by establishing a new BM-SC at the location of the eNB to which the UE belongs.

Step 1308: If an L-BM-SC is deployed at the location of the eNB to which the UE belongs, the MCE determines, according to the location information of the UE, a first L-BM-SC deployed at the location of the eNB to which the UE belongs.

Step 1309: The MCE sends a second bearer activation request to the first L-BM-SC.

Step 1310: The MCE receives a second bearer response message sent by the first L-BM-SC, where the second bearer response message includes an address of the first L-BM-SC.

Steps 1308 to 1310 are the same as or similar to steps 1007 to 1009 in the embodiment shown in FIG. 10A and FIG. 10B. In this embodiment, details are not described herein again.

Step 1311: The MCE sends a first bearer response message to the MME, where the first bearer response message includes the address of the first L-BM-SC.

When the second bearer response message includes a second security key and/or a second group identity, the first bearer response message also includes the second security key and/or the second group identity, so that the MME sends a third bearer response message to the GCS AS by using the original MBMS GW and the original BM-SC successively. The third bearer response message includes the second security key and/or the second group identity. The GCS AS learns of the security key for the packet exchanged between the GCS AS and the first L-BM-SC and/or the group identity allocated by the first L-BM-SC to the group of the UE.

Step 1312: The MME sends a third bearer response message to the GCS AS by using the original MBMS GW and the original BM-SC, where the third bearer response message includes the address of the first L-BM-SC.

Specifically, the MME generates a third bearer response message that includes the address of the first L-BM-SC, and sends the third bearer response message to the original MBMS GW. Then, the original MBMS GW sends the third bearer response message to the original BM-SC. Finally, the original BM-SC sends the third bearer response message to the GCS AS.

When the first bearer response message includes the second security key and/or the second group identity, the third bearer response message also includes the second security key and/or the second group identity, so that the GCS AS learns of the security key for the packet exchanged between the GCS AS and the first L-BM-SC and/or the group identity allocated by the first L-BM-SC to the group of the UE.

Step 1313: The GCS AS notifies the UE that a bearer between the first L-BM-SC and the GCS AS is successfully established.

After the GCS AS receives the third bearer response message sent by the MME by using the original MBMS GW and the original BM-SC successively, if the third bearer response message includes the address of the first L-BM-SC, the GCS AS determines that the bearer between the first L-BM-SC and the GCS AS is successfully established, and notifies the UE that the bearer between the first L-BM-SC and the GCS AS is successfully established. A process in which the GCS AS notifies the UE that the bearer between the first L-BM-SC and the GCS AS is successfully established is the same as or similar to step 1012 in the embodiment shown in FIG. 10A and FIG. 10B. In this embodiment, details are not described herein again.

It should be noted that, a sequence of steps in the group communication method provided in this embodiment of the present invention may be adjusted properly, and a step may also be added or removed according to a condition. Any variation method readily figured out by persons skilled in the art within the technical scope disclosed in the present invention shall fall within the protection scope of the present invention. Therefore, details are not further described.

In conclusion, according to the group communication method provided in this embodiment of the present invention, an MME determines, according to location information of UE, an MCE that manages an eNB to which the UE belongs; and sends a first bearer activation request to the MCE. The first bearer activation request includes the location information of the UE. When the MCE determines, according to the location information of the UE, an L-BM-SC is deployed at a location of the eNB to which the UE belongs, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

The following is apparatus embodiments of the present invention according to which method embodiments of the present invention can be executed. For details not disclosed in the apparatus embodiments of the present invention, refer to the method embodiments of the present invention.

Figure 14:
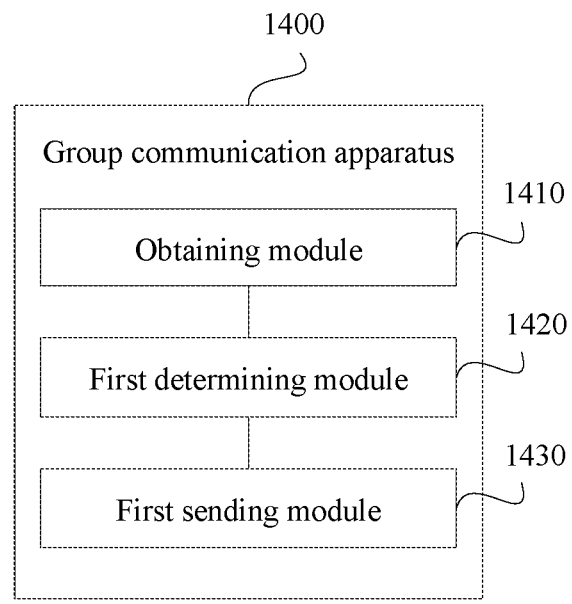
FIG. 14 is a block diagram of a group communication apparatus according to an embodiment of the present invention.

Referring to FIG. 14, FIG. 14 shows a block diagram of a group communication apparatus 1400 according to an embodiment of the present invention. The group communication apparatus 1400 may be implemented, by using software, hardware, or a combination of software and hardware, as a part or all of a system device in the implementation environment shown in FIG. 2 or FIG. 3. The system device may be a GCS AS, a BM-SC, or an MME in the implementation environment shown in FIG. 2, or may be a GCS AS in the implementation environment shown in FIG. 3. Referring to FIG. 14, the group communication apparatus 1400 may include an obtaining module 1410, a first determining module 1420, and a first sending module 1430.

The obtaining module 1410 is configured to obtain location information of user equipment UE.

The first determining module 1420 is configured to: when determining that a local broadcast/multicast service center L-BM-SC is deployed at a location of an evolved NodeB eNB to which the UE belongs, determine, according to the location information of the UE that is obtained by the obtaining module 1410, a multi-cell/multicast coordination entity MCE that manages the eNB to which the UE belongs.

The first sending module 1430 is configured to send a first bearer activation request to the MCE determined by the first determining module 1420. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a group communication service application server GCS AS. The bearer between the first L-BM-SC and the GCS AS is used by the GCS AS to send a packet to the first L-BM-SC.

In conclusion, according to the group communication apparatus provided in this embodiment of the present invention, a system device obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 15:
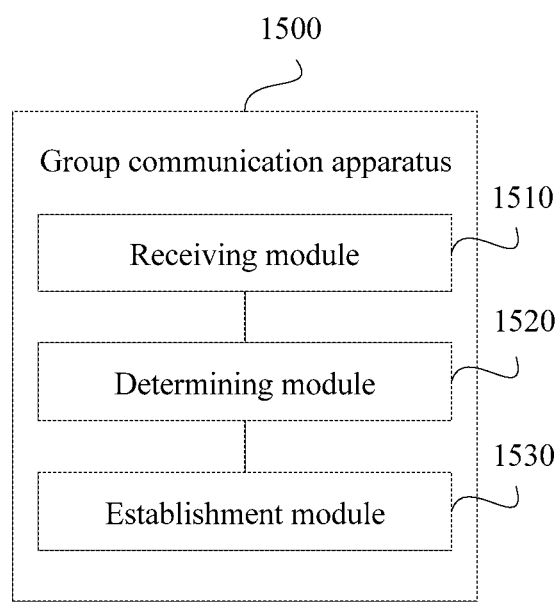
FIG. 15 is a block diagram of a group communication apparatus according to another embodiment of the present invention.

Referring to FIG. 15, FIG. 15 shows a block diagram of a group communication apparatus 1500 according to another embodiment of the present invention. The group communication apparatus 1500 may be implemented, by using software, hardware, or a combination of software and hardware, as a part or all of an MCE in the implementation environment shown in FIG. 2 or FIG. 3. Referring to FIG. 15, the group communication apparatus 1500 may include a receiving module 1510, a determining module 1520, and an establishment module 1530.

The receiving module 1510 is configured to receive a first bearer activation request sent by a system device. The first bearer activation request includes location information of user equipment UE. The first bearer activation request is sent by the system device after the system device performs a step that when the system device determines that a local broadcast/multicast service center L-BM-SC is deployed at a location of an evolved NodeB eNB to which the UE belongs, the system device determines, according to the location information of the UE, an MCE that manages the eNB to which the UE belongs.

The determining module 1520 is configured to determine, according to the location information of the UE in the first bearer activation request received by the receiving module 1510, a first local broadcast/multicast service center L-BM-SC deployed at the location of the eNB to which the UE belongs.

The establishment module 1530 is configured to establish a bearer between the first L-BM-SC determined by the determining module 1520 and a group communication service application server GCS AS. The bearer between the first L-BM-SC and the GCS AS is used by the GCS AS to send a packet to the first L-BM-SC.

In conclusion, according to the group communication apparatus provided in this embodiment of the present invention, an MCE receives a first bearer activation request, where the first bearer activation request includes location information of UE; determines, according to the location information of the UE, a first L-BM-SC deployed at a location of an eNB to which the UE belongs; and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. ABM-SC does not need to determine a synchronization cycle. In this way, a problem that a data transmission delay is relatively large in existing group communication is resolved, and the data transmission delay is shortened.

Figure 16:
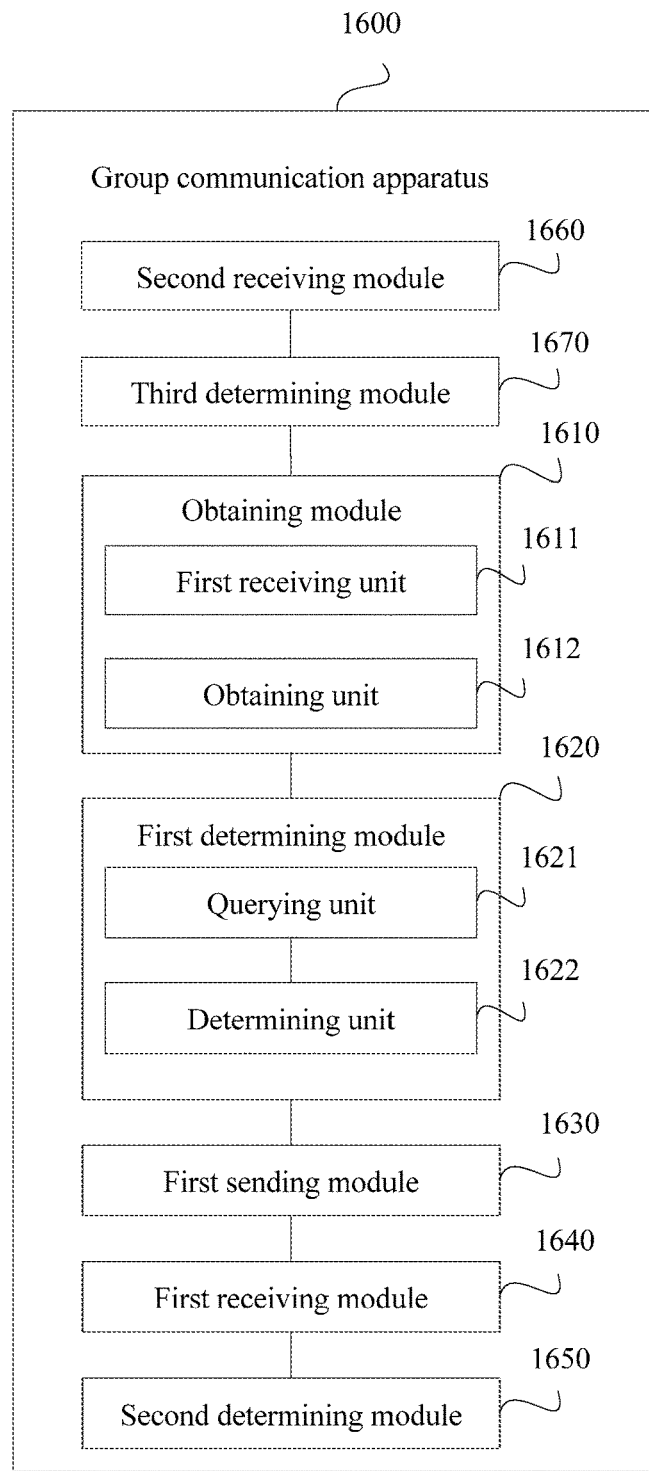
FIG. 16 is a block diagram of a group communication apparatus according to still another embodiment of the present invention.

Referring to FIG. 16, FIG. 16 shows a block diagram of a group communication apparatus 1600 according to still another embodiment of the present invention. The group communication apparatus 1600 may be implemented, by using software, hardware, or a combination of software and hardware, as a part or all of a GCS AS in the implementation environment shown in FIG. 2 or FIG. 3. Referring to FIG. 16, the group communication apparatus 1600 may include an obtaining module 1610, a first determining module 1620, and a first sending module 1630.

The obtaining module 1610 is configured to obtain location information of user equipment UE.

The first determining module 1620 is configured to: when determining that a local broadcast/multicast service center L-BM-SC is deployed at a location of an evolved NodeB eNB to which the UE belongs, determine, according to the location information of the UE that is obtained by the obtaining module 1610, a multi-cell/multicast coordination entity MCE that manages the eNB to which the UE belongs.

The first sending module 1630 is configured to send a first bearer activation request to the MCE determined by the first determining module 1620. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a group communication service application server GCS AS. The bearer between the first L-BM-SC and the GCS AS is used by the GCS AS to send a packet to the first L-BM-SC.

Optionally, the first determining module 1620 includes:

a querying unit 1621, configured to query a locally configured correspondence between location information and an MCE according to the location information of the UE that is obtained by the obtaining module 1610; and a determining unit 1622, configured to use, as the MCE that manages the eNB to which the UE belongs, an MCE that is obtained by the querying unit 1621 by means of query and is corresponding to the location information of the UE.

Optionally, the group communication apparatus 1600 further includes:

a first receiving module 1640, configured to receive a first bearer response message sent by the MCE, where the first bearer response message includes an address of the first L-BM-SC; and a second determining module 1650, configured to determine, according to the first bearer response message received by the first receiving module 1640, that the bearer between the first L-BM-SC and the GCS AS is successfully established.

Optionally, the group communication apparatus 1600 further includes:

a second receiving module 1660, configured to receive indication information reported by the UE, where the indication information includes capability indication information, and the capability indication information is used to indicate that the UE is capable of performing multicast transmission; and a third determining module 1670, configured to determine, according to the capability indication information in the indication information received by the second receiving module 1660, that the UE is capable of performing multicast transmission Optionally, the obtaining module 1610 includes:

a first receiving unit 1611, configured to receive the indication information reported by the UE, where the indication information further includes the location information of the UE; or an obtaining unit 1612, configured to: when the capability indication information indicates that the UE is capable of performing multicast transmission, obtain the location information of the UE from a policy and charging rules function PCRF unit.

Optionally, the first bearer activation request further includes a first security key, and the first security key is generated by the GCS AS when the GCS AS determines that the GCS AS generates a security key; or the first bearer activation request does not include a security key, the first bearer response message further includes a second security key, the second security key is generated by the first L-BM-SC when the first L-BM-SC determines that a second bearer activation request does not include a security key, and is sent by the first L-BM-SC to the MCE, and the first bearer activation request does not include a security key when the GCS AS determines that the first L-BM-SC generates a security key.

Optionally, the first bearer activation request further includes a first group identity, the first group identity is used to identify a group of the UE, the first group identity is preallocated by an original broadcast/multicast service center BM-SC to the group of the UE and is stored by the GCS AS, and the original BM-SC is used to perform data transmission between the GCS AS and each eNB; or the first bearer response message further includes a second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

Optionally, the first L-BM-SC is obtained by moving the original broadcast/multicast service center BM-SC to the location of the eNB to which the UE belongs; or the first L-BM-SC is obtained by establishing a new broadcast/multicast service center BM-SC at the location of the eNB to which the UE belongs.

In conclusion, according to the group communication apparatus provided in this embodiment of the present invention, a GCS AS obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and the GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 17:
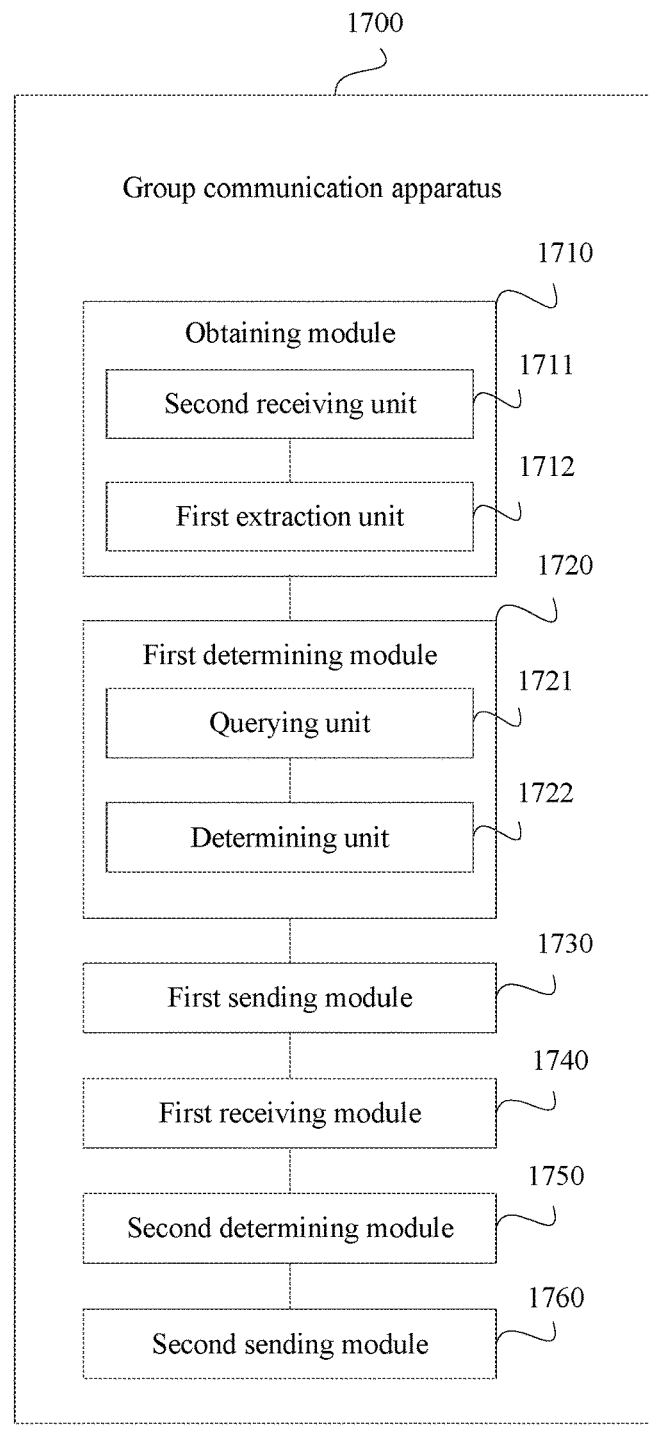
FIG. 17 is a block diagram of a group communication apparatus according to yet another embodiment of the present invention.

Referring to FIG. 17, FIG. 17 shows a block diagram of a group communication apparatus 1700 according to yet another embodiment of the present invention. The group communication apparatus 1700 may be implemented, by using software, hardware, or a combination of software and hardware, as a part or all of a BM-SC in the implementation environment shown in FIG. 2. In this embodiment, a first L-BM-SC is obtained by establishing a new broadcast/multicast service center BM-SC at a location of an eNB to which UE belongs. A system device is an original BM-SC (the BM-SC in FIG. 2). The original BM-SC is used to perform data transmission between a GCS AS and each eNB. Referring to FIG. 17, the group communication apparatus 1700 may include an obtaining module 1710, a first determining module 1720, and a first sending module 1730.

The obtaining module 1710 is configured to obtain location information of user equipment UE.

The first determining module 1720 is configured to: when determining that a local broadcast/multicast service center L-BM-SC is deployed at a location of an evolved NodeB eNB to which the UE belongs, determine, according to the location information of the UE that is obtained by the obtaining module 1710, a multi-cell/multicast coordination entity MCE that manages the eNB to which the UE belongs.

The first sending module 1730 is configured to send a first bearer activation request to the MCE determined by the first determining module 1720. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a group communication service application server GCS AS. The bearer between the first L-BM-SC and the GCS AS is used by the GCS AS to send a packet to the first L-BM-SC.

Optionally, the first determining module 1720 includes:

a querying unit 1721, configured to query a locally configured correspondence between location information and an MCE according to the location information of the UE that is obtained by the obtaining module 1710; and a determining unit 1722, configured to use, as the MCE that manages the eNB to which the UE belongs, an MCE that is obtained by the querying unit 1721 by means of query and is corresponding to the location information of the UE.

Optionally, the group communication apparatus 1700 further includes:

a first receiving module 1740, configured to receive a first bearer response message sent by the MCE, where the first bearer response message includes an address of the first L-BM-SC; and a second determining module 1750, configured to determine, according to the first bearer response message received by the first receiving module 1740, that the bearer between the first L-BM-SC and the GCS AS is successfully established.

Optionally, the obtaining module 1710 includes:

a second receiving unit 1711, configured to receive a third bearer activation request sent by the GCS AS, where the third bearer activation request includes the location information of the UE, and the third bearer activation request is sent by the GCS AS when the GCS AS determines that the UE is capable of performing multicast transmission; and a first extraction unit 1712, configured to extract the location information of the UE from the third bearer activation request received by the second receiving unit 1711.

Optionally, the group communication apparatus 1700 further includes:

a second sending module 1760, configured to send a third bearer response message to the GCS AS, where the third bearer response message includes the address of the first L-BM-SC, so that the GCS AS sends a packet to the first L-BM-SC by using the bearer between the first L-BM-SC and the GCS AS.

Optionally, the third bearer activation request further includes a first security key. The first bearer activation request further includes the first security key. The first security key is generated by the GCS AS when the GCS AS determines that the GCS AS generates a security key.

Optionally, the first bearer response message further includes a second security key. The third bearer response message further includes the second security key. The second security key is generated by the first L-BM-SC when the first L-BM-SC determines that a second bearer activation request does not include a security key, and is sent by the first L-BM-SC to the MCE. The second bearer activation request does not include a security key when the GCS AS determines that the first L-BM-SC generates a security key.

Optionally, the third bearer activation request further includes a first group identity. The first bearer activation request further includes the first group identity. The first group identity is used to identify a group of the UE. The first group identity is preallocated by the original BM-SC to the group of the UE and is stored by the GCS AS.

Optionally, the first bearer response message further includes a second group identity. The third bearer response message further includes the second group identity. The second group identity is used to identify a group of the UE. The second group identity is allocated by the first L-BM-SC to the group of the UE when the first L-BM-SC determines that the second bearer activation request does not include a group identity, and is sent by the first L-BM-SC to the MCE.

In conclusion, according to the group communication apparatus provided in this embodiment of the present invention, a BM-SC obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 18:
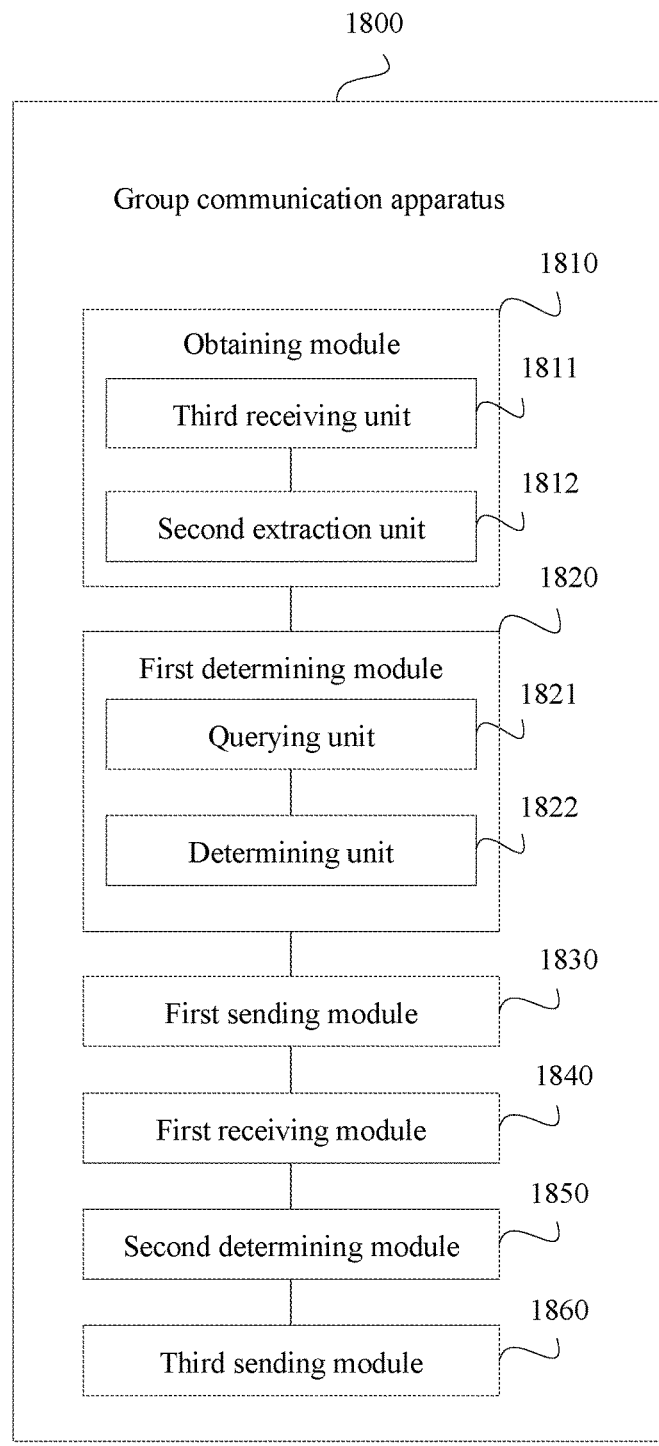
FIG. 18 is a block diagram of a group communication apparatus according to yet another embodiment of the present invention.

Referring to FIG. 18, FIG. 18 shows a block diagram of a group communication apparatus 1800 according to yet another embodiment of the present invention. The group communication apparatus 1800 may be implemented, by using software, hardware, or a combination of software and hardware, as a part or all of an MME in the implementation environment shown in FIG. 2. In this embodiment, a first L-BM-SC is obtained by establishing a new BM-SC at a location of an eNB to which UE belongs. Referring to FIG. 18, the group communication apparatus 1800 may include an obtaining module 1810, a first determining module 1820, and a first sending module 1830.

The obtaining module 1810 is configured to obtain location information of user equipment UE.

The first determining module 1820 is configured to: when determining that a local broadcast/multicast service center L-BM-SC is deployed at a location of an evolved NodeB eNB to which the UE belongs, determine, according to the location information of the UE that is obtained by the obtaining module 1810, a multi-cell/multicast coordination entity MCE that manages the eNB to which the UE belongs.

The first sending module 1830 is configured to send a first bearer activation request to the MCE determined by the first determining module 1820. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a group communication service application server GCS AS. The bearer between the first L-BM-SC and the GCS AS is used by the GCS AS to send a packet to the first L-BM-SC.

Optionally, the first determining module 1820 includes:

a querying unit 1821, configured to query a locally configured correspondence between location information and an MCE according to the location information of the UE that is obtained by the obtaining module 1810; and a determining unit 1822, configured to use, as the MCE that manages the eNB to which the UE belongs, an MCE that is obtained by the querying unit 1821 by means of query and is corresponding to the location information of the UE.

Optionally, the group communication apparatus 1800 further includes:

a first receiving module 1840, configured to receive a first bearer response message sent by the MCE, where the first bearer response message includes an address of the first L-BM-SC; and a second determining module 1850, configured to determine, according to the first bearer response message received by the first receiving module 1840, that the bearer between the first L-BM-SC and the GCS AS is successfully established.

Optionally, the obtaining module 1810 includes:

a third receiving unit 1811, configured to receive a third bearer activation request sent by an original BM-SC by using an original multimedia broadcast/multicast service gateway MBMS GW, where the third bearer activation request includes the location information of the UE, the third bearer activation request is sent by the GCS AS to the original MBMS GW when the GCS AS determines that the UE is capable of being switched between unicast transmission and multicast transmission, and is forwarded by the original MBMS GW to the original BM-SC, and the original BM-SC and the original MBMS GW are used to perform data transmission between the GCS AS and each eNB; and a second extraction unit 1812, configured to extract the location information of the UE from the third bearer activation request received by the third receiving unit 1811.

Optionally, the group communication apparatus 1800 further includes:

a third sending module 1860, configured to send a third bearer response message to the original BM-SC by using the original MBMS GW, where the third bearer response message includes the address of the first L-BM-SC, so that the original BM-SC sends the third bearer response message to the GCS AS, and triggers the GCS AS to send a packet to the first L-BM-SC by using the bearer between the first L-BM-SC and the GCS AS.

Optionally, the third bearer activation request further includes a first security key. The first bearer activation request further includes the first security key. The first security key is generated by the GCS AS when the GCS AS determines that the GCS AS generates a security key.

Optionally, the first bearer response message further includes a second security key. The third bearer response message further includes the second security key. The second security key is generated by the first L-BM-SC when the first L-BM-SC determines that a second bearer activation request does not include a security key, and is sent by the first L-BM-SC to the MCE. The second bearer activation request does not include a security key when the GCS AS determines that the first L-BM-SC generates a security key.

Optionally, the third bearer activation request further includes a first group identity. The first bearer activation request further includes the first group identity. The first group identity is used to identify a group of the UE. The first group identity is preallocated by the original BM-SC to the group of the UE and is stored by the GCS AS.

Optionally, the first bearer response message further includes a second group identity. The third bearer response message further includes the second group identity. The second group identity is used to identify a group of the UE. The second group identity is allocated by the first L-BM-SC to the group of the UE when the first L-BM-SC determines that the second bearer activation request does not include a group identity, and is sent by the first L-BM-SC to the MCE.

In conclusion, according to the group communication apparatus provided in this embodiment of the present invention, an MME obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 19:
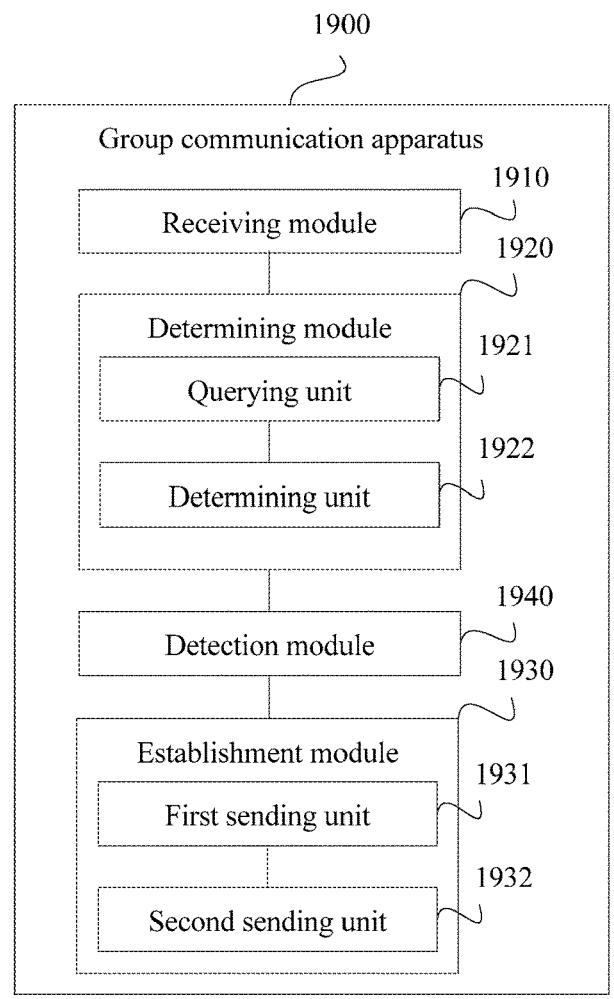
FIG. 19 is a block diagram of a group communication apparatus according to yet another embodiment of the present invention.

Referring to FIG. 19, FIG. 19 shows a block diagram of a group communication apparatus 1900 according to yet another embodiment of the present invention. The group communication apparatus 1900 may be implemented, by using software, hardware, or a combination of software and hardware, as a part or all of an MCE in the implementation environment shown in FIG. 2 or FIG. 3. Referring to FIG. 19, the group communication apparatus 1900 may include a receiving module 1910, a determining module 1920, and an establishment module 1930.

The receiving module 1910 is configured to receive a first bearer activation request sent by a system device. The first bearer activation request includes location information of user equipment UE. The first bearer activation request is sent by the system device after the system device performs a step that when the system device determines that a local broadcast/multicast service center L-BM-SC is deployed at a location of an evolved NodeB eNB to which the UE belongs, the system device determines, according to the location information of the UE, an MCE that manages the eNB to which the UE belongs.

The determining module 1920 is configured to determine, according to the location information of the UE in the first bearer activation request received by the receiving module 1910, a first local broadcast/multicast service center L-BM-SC deployed at the location of the eNB to which the UE belongs.

The establishment module 1930 is configured to establish a bearer between the first L-BM-SC determined by the determining module 1920 and a group communication service application server GCS AS. The bearer between the first L-BM-SC and the GCS AS is used by the GCS AS to send a packet to the first L-BM-SC.

Optionally, the determining module 1920 includes:

a querying unit 1921, configured to query a locally configured correspondence between location information and an L-BM-SC according to the location information of the UE in the first bearer activation request received by the receiving module 1910; and a determining unit 1922, configured to use, as the first L-BM-SC deployed at the location of the eNB to which the UE belongs, an L-BM-SC that is obtained by the querying unit 1921 by means of query and is corresponding to the location information of the UE.

Optionally, when the system device is a management mobility entity MME, the group communication apparatus 1900 further includes:

a detection module 1940, configured to detect whether an L-BM-SC is deployed at the location of the eNB to which the UE belongs.

Optionally, the establishment module 1930 includes:

a first sending unit 1931, configured to send a second bearer activation request to the first L-BM-SC, so that the first L-BM-SC sends a second bearer response message to the MCE according to an address of the first L-BM-SC, where the second bearer response message includes the address of the first L-BM-SC; and a second sending unit 1932, configured to send a first bearer response message to the system device, so that the system device determines, according to the first bearer response message, that the bearer between the first L-BM-SC and the GCS AS is successfully established, where the first bearer response message is sent by the MCE after the MCE receives the second bearer response message sent by the first L-BM-SC, and the first bearer response message includes the address of the first L-BM-SC.

Optionally, when the system device is the GCS AS, an original broadcast/multicast service center BM-SC, or a mobility management entity MME, and the original BM-SC is used to perform data transmission between the GCS AS and each eNB, the first bearer activation request further includes a first security key, the second bearer activation request further includes the first security key, and the first security key is generated by the GCS AS when the GCS AS determines that the GCS AS generates a security key; or the second bearer response message further includes a second security key, the first bearer response message further includes the second security key, the second security key is generated by the first L-BM-SC when the first L-BM-SC determines that the second bearer activation request does not include a security key, and the second bearer activation request does not include a security key when the GCS AS determines that the first L-BM-SC generates a security key.

Optionally, when the system device is the GCS AS, an original broadcast/multicast service center BM-SC, or a mobility management entity MME, and the original BM-SC is used to perform data transmission between the GCS AS and each eNB, the first bearer activation request further includes a first group identity, the second bearer activation request further includes the first group identity, the first group identity is used to identify a group of the UE, and the first group identity is preallocated by the original BM-SC to the group of the UE and is stored by the GCS AS; or the second bearer response message further includes a second group identity, the first bearer response message further includes the second group identity, the second group identity is used to identify a group of the UE, and the second group identity is allocated by the first L-BM-SC to the group of the UE when the first L-BM-SC determines that the second bearer activation request does not include a group identity.

In conclusion, according to the group communication apparatus provided in this embodiment of the present invention, an MCE receives a first bearer activation request, where the first bearer activation request includes location information of UE; determines, according to the location information of the UE, a first L-BM-SC deployed at a location of an eNB to which the UE belongs; and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. ABM-SC does not need to determine a synchronization cycle. In this way, a problem that a data transmission delay is relatively large in existing group communication is resolved, and the data transmission delay is shortened.

Figure 20:
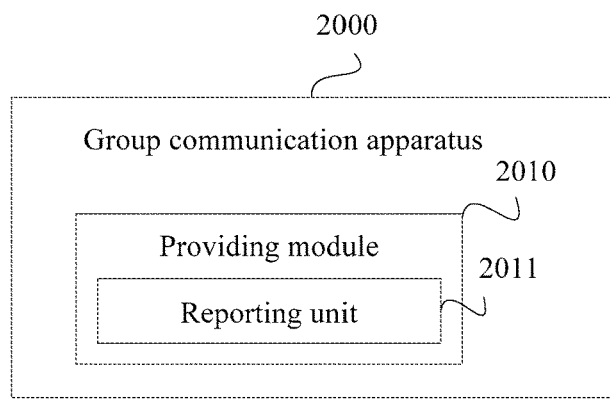
FIG. 20 is a block diagram of a group communication apparatus according to yet another embodiment of the present invention.

Referring to FIG. 20, FIG. 20 shows a block diagram of a group communication apparatus 2000 according to yet another embodiment of the present invention. The group communication apparatus 2000 may be implemented, by using software, hardware, or a combination of software and hardware, as a part or all of UE in the implementation environment shown in FIG. 2 or FIG. 3. Referring to FIG. 20, the group communication apparatus 2000 may include a providing module 2010.

The providing module 2010 is configured to provide location information of UE to a system device, so that when the system device determines that a local broadcast/multicast service center L-BM-SC is deployed at a location of an evolved NodeB eNB to which the UE belongs, the system device determines, according to the location information of the UE, a multi-cell/multicast coordination entity MCE that manages the eNB to which the UE belongs, and sends a first bearer activation request to the MCE.

The first bearer activation request includes the location information of the UE. The first bearer activation request is used to trigger the MCE to determine, according to the location information of the UE, a first L-BM-SC deployed at the location of the eNB to which the UE belongs, and establish a bearer between the first L-BM-SC and a group communication service application server GCS AS. The bearer between the first L-BM-SC and the GCS AS is used by the GCS AS to send a packet to the first L-BM-SC.

Optionally, the providing module 2010 includes:

a reporting unit 2011, configured to report indication information to the GCS AS, where the indication information includes capability indication information and the location information of the UE, and the capability indication information is used to indicate whether the UE is capable of performing multicast transmission; or a reporting unit 2011, configured to report indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit.

When the system device is an original broadcast/multicast service center BM-SC, and the original BM-SC is used to perform data transmission between the GCS AS and each eNB, a reporting unit 2011 is configured to report indication information to the GCS AS, where the indication information includes capability indication information and the location information of the UE, and the capability indication information is used to indicate whether the UE is capable of performing multicast transmission, so that the GCS AS sends a third bearer activation request to the original BM-SC when the GCS AS determines that the UE is capable of performing multicast transmission, where the third bearer activation request includes the location information of the UE; or a reporting unit 2011 is configured to report indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit, and sends a third bearer activation request to the original BM-SC, where the third bearer activation request includes the location information of the UE.

When the system device is a management mobility entity MME, a reporting unit 2011 is configured to report indication information to the GCS AS, where the indication information includes capability indication information and the location information of the UE, and the capability indication information is used to indicate whether the UE is capable of performing multicast transmission, so that when the GCS AS determines that the UE is capable of performing multicast transmission, the GCS AS sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB; or a reporting unit 2011 is configured to report indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit, sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB.

The reporting unit 2011 is configured to report the indication information to the GCS AS by using a GC1 interface between the UE and the GCS AS.

In conclusion, according to the group communication apparatus provided in this embodiment of the present invention, UE reports indication information to a system device, so that when the system device determines that an L-BM-SC is deployed at a location of an eNB to which the UE belongs, the system device determines, according to the location information of the UE, an MCE that manages the eNB to which the UE belongs, and sends a first bearer activation request to the MCE. The first bearer activation request includes the location information of the UE. The MCE is used to determine, according to the location information of the UE, a first L-BM-SC deployed at the location of the eNB to which the UE belongs, and establish a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

It should be noted that, during group communication performed by the group communication apparatus provided in the embodiments, division of the function modules is only used as an example for description. In practical application, the functions may be allocated to different function modules for implementation as required, that is, an internal structure of a device is divided into different function modules to implement all or some of the functions described above. In addition, the group communication apparatus provided in the embodiments pertains to a same concept as method embodiments. For a specific implementation process, refer to the method embodiments. Details are not described herein again.

Figure 21:
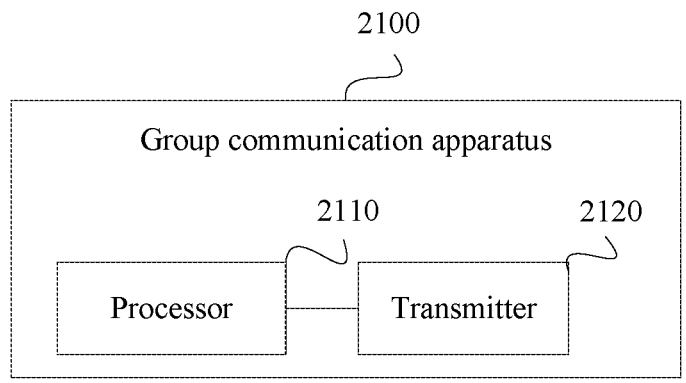
FIG. 21 is a block diagram of a group communication apparatus according to an embodiment of the present invention.

Referring to FIG. 21, FIG. 21 shows a block diagram of a group communication apparatus 2100 according to an embodiment of the present invention. The group communication apparatus 2100 may be applied to a system device in the implementation environment shown in FIG. 2 or FIG. 3. The system device may be a GCS AS, a BM-SC, or an MME in the implementation environment shown in FIG. 2, or may be a GCS AS in the implementation environment shown in FIG. 3. The group communication apparatus 2100 may include but is not limited to a processor 2110 and a transmitter 2120. The processor 2110 is coupled to the transmitter 2120.

The processor 2110 is configured to obtain location information of user equipment UE.

The processor 2110 is further configured to: when determining that a local broadcast/multicast service center L-BM-SC is deployed at a location of an evolved NodeB eNB to which the UE belongs, determine, according to the location information of the UE, a multi-cell/multicast coordination entity MCE that manages the eNB to which the UE belongs.

The transmitter 2120 is configured to send a first bearer activation request to the MCE, where the first bearer activation request includes the location information of the UE, so that the MCE determines, according to the location information of the UE, a first L-BM-SC deployed at the location of the eNB to which the UE belongs, and establishes a bearer between the first L-BM-SC and a group communication service application server GCS AS. The bearer between the first L-BM-SC and the GCS AS is used by the GCS AS to send a packet to the first L-BM-SC.

In conclusion, according to the group communication apparatus provided in this embodiment of the present invention, a system device obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Optionally, the processor 2110 is further configured to query a locally configured correspondence between location information and an MCE according to the location information of the UE.

The processor 2110 is further configured to use, as the MCE that manages the eNB to which the UE belongs, an MCE that is obtained by means of query and is corresponding to the location information of the UE.

Figure 22:
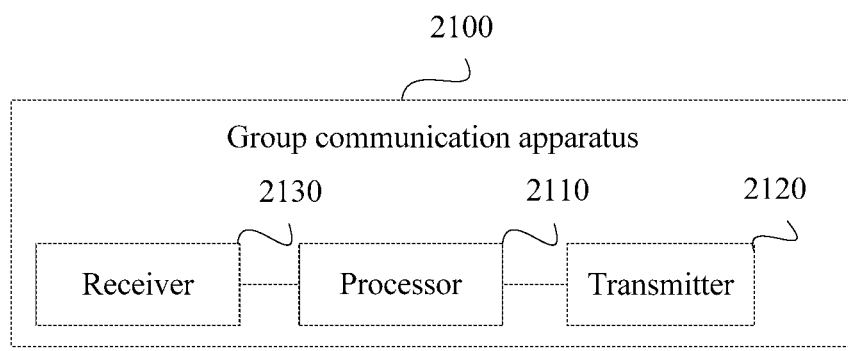
FIG. 22 is a block diagram of another group communication apparatus according to the embodiment shown in FIG. 21.

Further, referring to FIG. 22, FIG. 22 shows a block diagram of another group communication apparatus 2100 according to the embodiment shown in FIG. 21. The group communication apparatus 2100 further includes a receiver 2130. The receiver 2130 is coupled to the processor 2110.

The receiver 2130 is configured to receive a first bearer response message sent by the MCE. The first bearer response message includes an address of the first L-BM-SC.

The processor 2110 is further configured to determine, according to the first bearer response message, that the bearer between the first L-BM-SC and the GCS AS is successfully established.

Optionally, when the system device is the GCS AS, the receiver 2130 is further configured to receive indication information reported by the UE. The indication information includes capability indication information. The capability indication information is used to indicate that the UE is capable of performing multicast transmission.

The processor 2110 is further configured to determine, according to the capability indication information, whether the UE is capable of performing multicast transmission.

Optionally, the processor 2110 is further configured to receive the indication information reported by the UE, where the indication information further includes the location information of the UE; or the processor 2110 is further configured to: when the capability indication information indicates that the UE is capable of performing multicast transmission, obtain the location information of the UE from a policy and charging rules function PCRF unit.

Optionally, the first bearer activation request further includes a first security key, and the first security key is generated by the GCS AS when the GCS AS determines that the GCS AS generates a security key; or the first bearer activation request does not include a security key, the first bearer response message further includes a second security key, the second security key is generated by the first L-BM-SC when the first L-BM-SC determines that a second bearer activation request does not include a security key, and is sent by the first L-BM-SC to the MCE, and the first bearer activation request does not include a security key when the GCS AS determines that the first L-BM-SC generates a security key.

Optionally, the first bearer activation request further includes a first group identity, the first group identity is used to identify a group of the UE, the first group identity is preallocated by an original broadcast/multicast service center BM-SC to the group of the UE and is stored by the GCS AS, and the original BM-SC is used to perform data transmission between the GCS AS and each eNB; or the first bearer response message further includes a second group identity, the second group identity is used to identify a group of the UE, and the second group identity is allocated by the first L-BM-SC to the group of the UE when the first L-BM-SC determines that the second bearer activation request does not include a group identity, and is sent by the first L-BM-SC to the MCE.

Optionally, when the first L-BM-SC is obtained by establishing a new broadcast/multicast service center BM-SC at the location of the eNB to which the UE belongs, the system device is an original BM-SC, and the original BM-SC is used to perform data transmission between the GCS AS and each eNB, the processor 2110 is further configured to receive a third bearer activation request sent by the GCS AS, where the third bearer activation request includes the location information of the UE, and the third bearer activation request is sent by the GCS AS when the GCS AS determines that the UE is capable of performing multicast transmission; and the processor 2110 is further configured to extract the location information of the UE from the third bearer activation request.

Optionally, the transmitter 2120 is further configured to send a third bearer response message to the GCS AS, where the third bearer response message includes the address of the first L-BM-SC, so that the GCS AS sends a packet to the first L-BM-SC by using the bearer between the first L-BM-SC and the GCS AS.

Optionally, when the first L-BM-SC is obtained by establishing a new BM-SC at the location of the eNB to which the UE belongs, and the system device is a mobility management entity MME, the processor 2110 is further configured to receive a third bearer activation request sent by an original BM-SC by using an original multimedia broadcast/multicast service gateway MBMS GW, where the third bearer activation request includes the location information of the UE, the third bearer activation request is sent by the GCS AS to the original MBMS GW when the GCS AS determines that the UE is capable of being switched between unicast transmission and multicast transmission, and is forwarded by the original MBMS GW to the original BM-SC, and the original BM-SC and the original MBMS GW are used to perform data transmission between the GCS AS and each eNB; and the processor 2110 is further configured to extract the location information of the UE from the third bearer activation request.

Optionally, the transmitter 2120 is further configured to send a third bearer response message to the original BM-SC by using the original MBMS GW, where the third bearer response message includes the address of the first L-BM-SC, so that the original BM-SC sends the third bearer response message to the GCS AS, and triggers the GCS AS to send a packet to the first L-BM-SC by using the bearer between the first L-BM-SC and the GCS AS.

Optionally, the third bearer activation request further includes a first security key. The first bearer activation request further includes the first security key. The first security key is generated by the GCS AS when the GCS AS determines that the GCS AS generates a security key.

Optionally, the first bearer response message further includes a second security key. The third bearer response message further includes the second security key. The second security key is generated by the first L-BM-SC when the first L-BM-SC determines that a second bearer activation request does not include a security key, and is sent by the first L-BM-SC to the MCE. The second bearer activation request does not include a security key when the GCS AS determines that the first L-BM-SC generates a security key.

Optionally, the third bearer activation request further includes a first group identity. The first bearer activation request further includes the first group identity. The first group identity is used to identify a group of the UE. The first group identity is preallocated by the original BM-SC to the group of the UE and is stored by the GCS AS.

Optionally, the first bearer response message further includes a second group identity. The third bearer response message further includes the second group identity. The second group identity is used to identify a group of the UE. The second group identity is allocated by the first L-BM-SC to the group of the UE when the first L-BM-SC determines that the second bearer activation request does not include a group identity, and is sent by the first L-BM-SC to the MCE.

Optionally, when the system device is the GCS AS, the first L-BM-SC is obtained by moving the original broadcast/multicast service center BM-SC to the location of the eNB to which the UE belongs; or the first L-BM-SC is obtained by establishing a new broadcast/multicast service center BM-SC at the location of the eNB to which the UE belongs.

In conclusion, according to the group communication apparatus provided in this embodiment of the present invention, a system device obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 23:
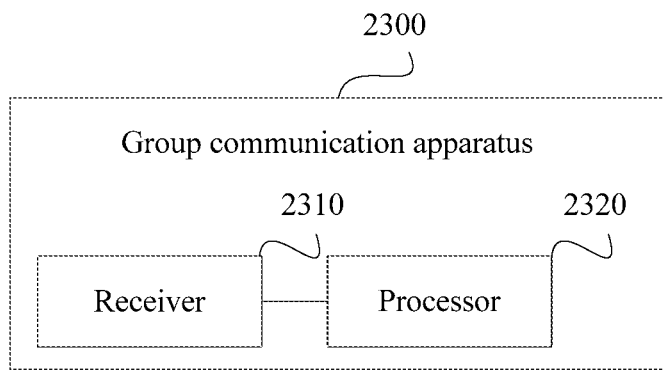
FIG. 23 is a block diagram of a group communication apparatus according to another embodiment of the present invention.

Referring to FIG. 23, FIG. 23 shows a block diagram of a group communication apparatus 2300 according to another embodiment of the present invention. The group communication apparatus 2300 may be applied to an MCE in the implementation environment shown in FIG. 2 or FIG. 3. The group communication apparatus 2300 may include but is not limited to a receiver 2310 and a processor 2320.

The receiver 2310 is configured to receive a first bearer activation request sent by a system device. The first bearer activation request includes location information of user equipment UE. The first bearer activation request is sent by the system device after the system device performs a step that when the system device determines that a local broadcast/multicast service center L-BM-SC is deployed at a location of an evolved NodeB eNB to which the UE belongs, the system device determines, according to the location information of the UE, an MCE that manages the eNB to which the UE belongs.

The processor 2320 is configured to determine, according to the location information of the UE, a first local broadcast/multicast service center L-BM-SC deployed at the location of the eNB to which the UE belongs.

The processor 2320 is further configured to establish a bearer between the first L-BM-SC and a group communication service application server GCS AS. The bearer between the first L-BM-SC and the GCS AS is used by the GCS AS to send a packet to the first L-BM-SC.

In conclusion, according to the group communication apparatus provided in this embodiment of the present invention, an MCE receives a first bearer activation request, where the first bearer activation request includes location information of UE; determines, according to the location information of the UE, a first L-BM-SC deployed at a location of an eNB to which the UE belongs; and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. ABM-SC does not need to determine a synchronization cycle. In this way, a problem that a data transmission delay is relatively large in existing group communication is resolved, and the data transmission delay is shortened.

Optionally, the processor 2320 is further configured to query a locally configured correspondence between location information and an L-BM-SC according to the location information of the UE.

The processor 2320 is further configured to use, as the first L-BM-SC deployed at the location of the eNB to which the UE belongs, an L-BM-SC that is obtained by means of query and is corresponding to the location information of the UE.

Figure 24:
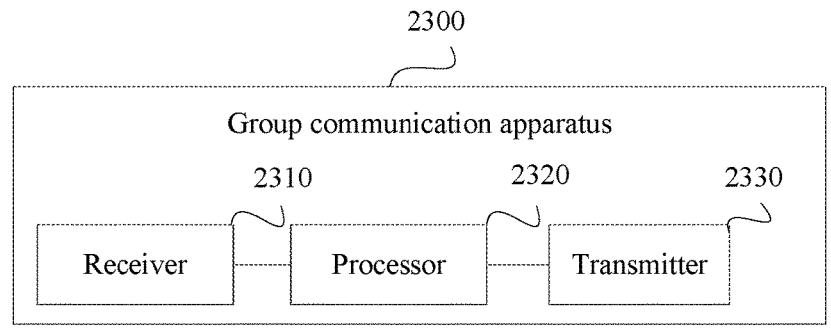
FIG. 24 is a block diagram of another group communication apparatus according to the embodiment shown in FIG. 23.

Optionally, when the system device is a management mobility entity MME, the processor 2320 is further configured to detect whether an L-BM-SC is deployed at the location of the eNB to which the UE belongs Further, referring to FIG. 24, FIG. 24 shows a block diagram of another group communication apparatus 2300 according to the embodiment shown in FIG. 23. The group communication apparatus 2300 further includes a transmitter 2330. The transmitter 2330 is coupled to the processor 2320.

The transmitter 2330 is configured to send a second bearer activation request to the first L-BM-SC, so that the first L-BM-SC sends a second bearer response message to the MCE according to an address of the first L-BM-SC. The second bearer response message includes the address of the first L-BM-SC.

The transmitter 2330 is further configured to send a first bearer response message to the system device, so that the system device determines, according to the first bearer response message, that the bearer between the first L-BM-SC and the GCS AS is successfully established. The first bearer response message is sent by the MCE after the MCE receives the second bearer response message sent by the first L-BM-SC. The first bearer response message includes the address of the first L-BM-SC.

Optionally, when the system device is the GCS AS, an original broadcast/multicast service center BM-SC, or a mobility management entity MME, and the original BM-SC is used to perform data transmission between the GCS AS and each eNB, the first bearer activation request further includes a first security key, the second bearer activation request further includes the first security key, and the first security key is generated by the GCS AS when the GCS AS determines that the GCS AS generates a security key; or the second bearer response message further includes a second security key, the first bearer response message further includes the second security key, the second security key is generated by the first L-BM-SC when the first L-BM-SC determines that the second bearer activation request does not include a security key, and the second bearer activation request does not include a security key when the GCS AS determines that the first L-BM-SC generates a security key.

Optionally, when the system device is the GCS AS, an original broadcast/multicast service center BM-SC, or a mobility management entity MME, and the original BM-SC is used to perform data transmission between the GCS AS and each eNB, the first bearer activation request further includes a first group identity, the second bearer activation request further includes the first group identity, the first group identity is used to identify a group of the UE, and the first group identity is preallocated by the original BM-SC to the group of the UE and is stored by the GCS AS; or the second bearer response message further includes a second group identity, the first bearer response message further includes the second group identity, the second group identity is used to identify a group of the UE, and the second group identity is allocated by the first L-BM-SC to the group of the UE when the first L-BM-SC determines that the second bearer activation request does not include a group identity.

In conclusion, according to the group communication apparatus provided in this embodiment of the present invention, an MCE receives a first bearer activation request, where the first bearer activation request includes location information of UE; determines, according to the location information of the UE, a first L-BM-SC deployed at a location of an eNB to which the UE belongs; and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. ABM-SC does not need to determine a synchronization cycle. In this way, a problem that a data transmission delay is relatively large in existing group communication is resolved, and the data transmission delay is shortened.

Figure 25:
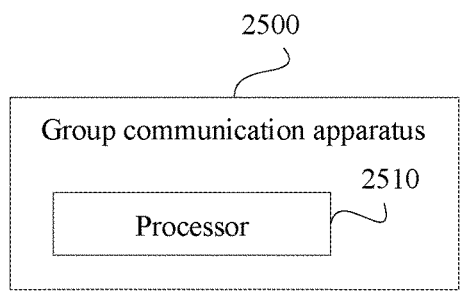
FIG. 25 is a block diagram of a group communication apparatus according to still another embodiment of the present invention.

Referring to FIG. 25, FIG. 25 shows a block diagram of a group communication apparatus 2500 according to still another embodiment of the present invention. The group communication apparatus 2500 may be applied to UE in the implementation environment shown in FIG. 2 or FIG. 3. The group communication apparatus 2500 may include but is not limited to a processor 2510.

The processor 2510 is configured to provide location information of UE to a system device, so that when the system device determines that a local broadcast/multicast service center L-BM-SC is deployed at a location of an evolved NodeB eNB to which the UE belongs, the system device determines, according to the location information of the UE, a multi-cell/multicast coordination entity MCE that manages the eNB to which the UE belongs, and sends a first bearer activation request to the MCE.

The first bearer activation request includes the location information of the UE. The first bearer activation request is used to trigger the MCE to determine, according to the location information of the UE, a first L-BM-SC deployed at the location of the eNB to which the UE belongs, and establish a bearer between the first L-BM-SC and a group communication service application server GCS AS. The bearer between the first L-BM-SC and the GCS AS is used by the GCS AS to send a packet to the first L-BM-SC.

Optionally, when the system device is the GCS AS, the processor 2510 is further configured to report indication information to the GCS AS, where the indication information includes capability indication information and the location information of the UE, and the capability indication information is used to indicate whether the UE is capable of performing multicast transmission; or the processor 2510 is further configured to report indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit.

Optionally, when the system device is an original broadcast/multicast service center BM-SC, and the original BM-SC is used to perform data transmission between the GCS AS and each eNB, the processor 2510 is further configured to report indication information to the GCS AS, where the indication information includes capability indication information and the location information of the UE, and the capability indication information is used to indicate whether the UE is capable of performing multicast transmission, so that when the GCS AS determines that the UE is capable of performing multicast transmission, the GCS AS sends a third bearer activation request to the original BM-SC, where the third bearer activation request includes the location information of the UE; or the processor 2510 is further configured to report indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit, and sends a third bearer activation request to the original BM-SC, where the third bearer activation request includes the location information of the UE.

Optionally, when the system device is a mobility management entity MME, the processor 2510 is further configured to report indication information to the GCS AS, where the indication information includes capability indication information and the location information of the UE, and the capability indication information is used to indicate whether the UE is capable of performing multicast transmission, so that when the GCS AS determines that the UE is capable of performing multicast transmission, the GCS AS sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB; or the processor 2510 is further configured to report indication information to the GCS AS, where the indication information includes capability indication information, and the capability indication information is used to indicate whether the UE is capable of performing multicast transmission, so that when the capability indication information indicates that the UE is capable of performing multicast transmission, the GCS AS obtains the location information of the UE from a policy and charging rules function PCRF unit, sends a third bearer activation request to an original BM-SC, and triggers the original BM-SC to send the third bearer activation request to the MME by using an original multimedia broadcast/multicast service gateway MBMS GW, where the third bearer activation request includes the location information of the UE, and the original BM-SC and the original MBMS GW are used to perform data transmission between the GCS AS and each eNB.

Optionally, the processor 2510 is further configured to report the indication information to the GCS AS by using a GC1 interface between the UE and the GCS AS.

In conclusion, according to the group communication apparatus provided in this embodiment of the present invention, UE reports indication information to a system device, so that when the system device determines that an L-BM-SC is deployed at a location of an eNB to which the UE belongs, the system device determines, according to the location information of the UE, an MCE that manages the eNB to which the UE belongs, and sends a first bearer activation request to the MCE. The first bearer activation request includes the location information of the UE. The MCE is used to determine, according to the location information of the UE, a first L-BM-SC deployed at the location of the eNB to which the UE belongs, and establish a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

Figure 26:
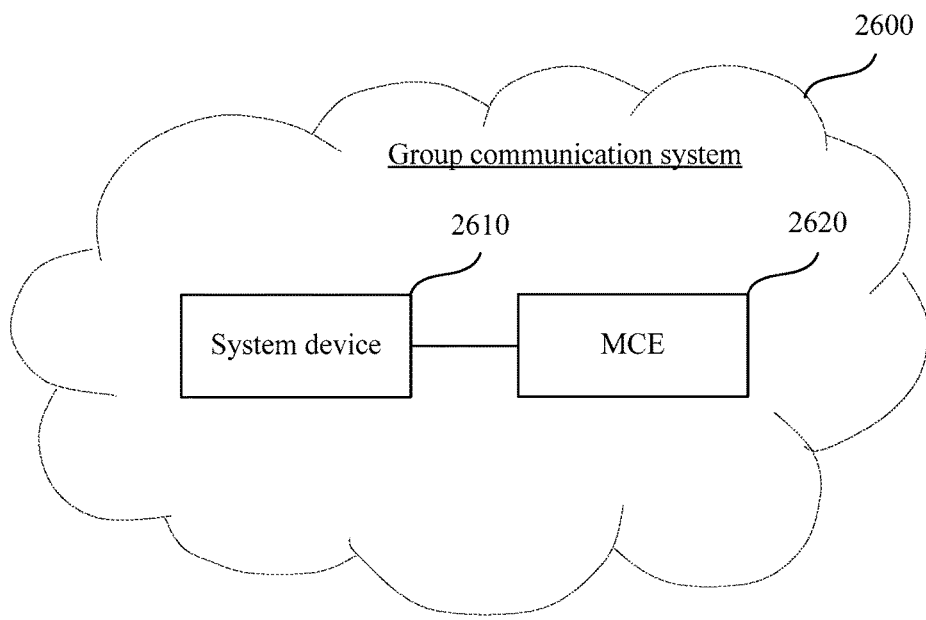
FIG. 26 is a schematic structural diagram of a group communication system according to an embodiment of the present invention.

Referring to FIG. 26, FIG. 26 shows a schematic structural diagram of a group communication system 2600 according to an embodiment of the present invention. The group communication system 2600 may include a system device 2610 and an MCE 2620. The system device may be a GCS AS, a BM-SC, or an MME.

The system device includes the apparatus described in any one of FIG. 14, FIG. 16, FIG. 17, FIG. 18, FIG. 21, or FIG. 22.

The MCE includes the apparatus shown in any one of FIG. 15, FIG. 19, FIG. 23, or FIG. 24.

In conclusion, according to the group communication system provided in this embodiment of the present invention, a system device obtains location information of UE; when determining that an L-BM-SC is deployed at a location of an eNB to which the UE belongs, determines, according to the location information of the UE, an MCE that manages the eNB to which the UE belongs; and sends a first bearer activation request to the MCE. The first bearer activation request includes the location information of the UE. Therefore, the MCE determines, according to the location information of the UE, a first L-BM-SC deployed at the location of the eNB to which the UE belongs, and establishes a bearer between the first L-BM-SC and a GCS AS. The bearer between the first L-BM-SC and the GCS AS is used by the GCS AS to send a packet to the first L-BM-SC. A first L-BM-SC is located at a same location as an eNB. A packet sent by a GCS AS to the first L-BM-SC may directly reach the eNB. A BM-SC does not need to determine a synchronization cycle. In this way, a problem that a data transmission delay is relatively large in existing group communication is resolved, and the data transmission delay is shortened.

The term "and/or" in the present invention describes only an association relationship for describing associated objects, and represents that three relationships may exist. For example, A and/or B may represent the following three cases: Only A exists, both A and B exist, and only B exists. In addition, the character "/" in this specification generally indicates an "or" relationship between the associated objects.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is only an example. For example, the unit division may be only logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The storage medium includes: any medium that can store program code, such as a USB flash drive, a removable hard disk, a read-only memory (Read-Only Memory, ROM), a random access memory (Random Access Memory, RAM), a magnetic disk, or an optical disc.

The descriptions are only specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A group communication method, applied to a system device, wherein the system device is located in a group communication system (GCS) in Long Term Evolution (LTE), and the method comprises:
   obtaining location information of user equipment (UE);
   when determining that a local broadcast/multicast service center (L-BM-SC) is deployed at a location of an evolved NodeB (eNB) to which the UE belongs, determining, according to the location information of the UE, a multi-cell/multicast coordination entity (MCE) that manages the eNB to which the UE belongs; and
   sending a first bearer activation request to the MCE, wherein the first bearer activation request comprises the location information of the UE, so that the MCE determines, according to the location information of the UE, a first L-BM-SC deployed at the location of the eNB to which the UE belongs, and establishes a bearer between the first L-BM-SC and a group communication service application server (GCS AS), wherein the bearer between the first L-BM-SC and the GCS AS is used by the GCS AS to send a packet to the first L-BM-SC.

2. The method according to claim 1, wherein
the determining, according to the location information of the UE, a multi-cell/multicast coordination entity (MCE) that manages the eNB to which the UE belongs comprises:
querying a locally configured correspondence between location information and an MCE according to the location information of the UE; and
using, as the MCE that manages the eNB to which the UE belongs, an MCE that is obtained by means of query and is corresponding to the location information of the UE.

3. The method according to claim 1, wherein after the sending a first bearer activation request to the MCE, the method further comprises:
receiving a first bearer response message sent by the MCE, wherein the first bearer response message comprises an address of the first L-BM-SC; and
determining, according to the first bearer response message, that the bearer between the first L-BM-SC and the GCS AS is successfully established.

4. The method according to claim 3, wherein when the system device is the GCS AS,
before the determining that a local broadcast/multicast service center (L-BM-SC) is deployed at a location of an eNB to which the UE belongs, the method further comprises:
receiving indication information reported by the UE, wherein the indication information comprises capability indication information, and the capability indication information is used to indicate that the UE is capable of performing multicast transmission; and
determining, according to the capability indication information, that the UE is capable of performing multicast transmission.

5. A group communication apparatus, applied to a system device, wherein the system device is located in a group communication system (GCS) in Long Term Evolution (LTE), and the group communication apparatus comprises a processor and a transmitter, wherein
the processor is configured to obtain location information of user equipment (UE);
the processor is further configured to: when determining that a local broadcast/multicast service center (L-BM-SC) is deployed at a location of an evolved NodeB (eNB) to which the UE belongs, determine, according to the location information of the UE, a multi-cell/multicast coordination entity (MCE) that manages the eNB to which the UE belongs; and
the transmitter is configured to send a first bearer activation request to the MCE, wherein the first bearer activation request comprises the location information of the UE, so that the MCE determines, according to the location information of the UE, a first L-BM-SC deployed at the location of the eNB to which the UE belongs, and establishes a bearer between the first L-BM-SC and a group communication service application server (GCS AS), wherein the bearer between the first L-BM-SC and the GCS AS is used by the GCS AS to send a packet to the first L-BM-SC.

6. The group communication apparatus according to claim 5, wherein the processor is further configured to query a locally configured correspondence between location information and an MCE according to the location information of the UE; and
the processor is further configured to use, as the MCE that manages the eNB to which the UE belongs, an MCE that is obtained by means of query and is corresponding to the location information of the UE.

7. The group communication apparatus according to claim 5, wherein the group communication apparatus further comprises a receiver;
the receiver is configured to receive a first bearer response message sent by the MCE, wherein the first bearer response message comprises an address of the first L-BM-SC; and
the processor is further configured to determine, according to the first bearer response message, that the bearer between the first L-BM-SC and the GCS AS is successfully established.

8. The group communication apparatus according to claim 7, wherein when the system device is the GCS AS,
the receiver is further configured to receive indication information reported by the UE, wherein the indication information comprises capability indication information, and the capability indication information is used to indicate that the UE is capable of performing multicast transmission; and
the processor is further configured to determine, according to the capability indication information, that the UE is capable of performing multicast transmission.

9. The group communication apparatus according to claim 8, wherein
the processor is further configured to receive the indication information reported by the UE, wherein the indication information further comprises the location information of the UE; or
the processor is further configured to: when the capability indication information indicates that the UE is capable of performing multicast transmission, obtain the location information of the UE from a policy and charging rules function (PCRF) unit.

10. The group communication apparatus according to claim 8, wherein
the first bearer activation request further comprises a first security key, and the first security key is generated by the GCS AS when the GCS AS determines that the GCS AS generates a security key; or
the first bearer activation request does not comprise a security key, the first bearer response message further comprises a second security key, the second security key is generated by the first L-BM-SC when the first L-BM-SC determines that a second bearer activation request does not comprise a security key, and is sent by the first L-BM-SC to the MCE, and the first bearer activation request does not comprise a security key when the GCS AS determines that the first L-BM-SC generates the security key.

11. The group communication apparatus according to claim 8, wherein
the first bearer activation request further comprises a first group identity, the first group identity is used to identify a group of the UE, the first group identity is preallocated by an original broadcast/multicast service center (BM-SC) to the group of the UE and is stored by the GCS AS, and the original BM-SC is used to perform data transmission between the GCS AS and each eNB; or the first bearer response message further comprises a second group identity, the second group identity is used to identify a group of the UE, and the second group identity is allocated by the first L-BM-SC to the group of the UE when the first L-BM-SC determines that the second bearer activation request does not comprise a group identity, and is sent by the first L-BM-SC to the MCE.

12. The group communication apparatus according to claim 7, wherein when the first L-BM-SC is obtained by establishing a new broadcast/multicast service center (BM-SC) at the location of the eNB to which the UE belongs, the system device is an original BM-SC, and the original BM-SC is used to perform data transmission between the GCS AS and each eNB, the processor is further configured to receive a third bearer activation request sent by the GCS AS, wherein the third bearer activation request comprises the location information of the UE, and the third bearer activation request is sent by the GCS AS when the GCS AS determines that the UE is capable of performing multicast transmission; and the processor is further configured to extract the location information of the UE from the third bearer activation request.

13. The group communication apparatus according to claim 12, wherein the transmitter is further configured to send a third bearer response message to the GCS AS, wherein the third bearer response message comprises the address of the first L-BM-SC, so that the GCS AS sends a packet to the first L-BM-SC by using the bearer between the first L-BM-SC and the GCS AS.

14. The group communication apparatus according to claim 13, wherein when the first L-BM-SC is obtained by establishing a new BM-SC at the location of the eNB to which the UE belongs, and the system device is a mobility management entity (MME), the processor is further configured to receive a third bearer activation request sent by an original BM-SC by using an original multimedia broadcast/multicast service gateway (MBMS GW), wherein the third bearer activation request comprises the location information of the UE, the third bearer activation request is sent by the GCS AS to the original MBMS GW when the GCS AS determines that the UE is capable of being switched between unicast transmission and multicast transmission, and is forwarded by the original MBMS GW to the original BM-SC, and the original BM-SC and the original MBMS GW are used to perform data transmission between the GCS AS and each eNB; and the processor is further configured to extract the location information of the UE from the third bearer activation request.

15. The group communication apparatus according to claim 14, wherein the transmitter is further configured to send a third bearer response message to the original BM-SC by using the original MBMS GW, wherein the third bearer response message comprises the address of the first L-BM-SC, so that the original BM-SC sends the third bearer response message to the GCS AS, and triggers the GCS AS to send a packet to the first L-BM-SC by using the bearer between the first L-BM-SC and the GCS AS.

16. The group communication apparatus according to claim 13, wherein the first bearer response message further comprises a second security key, the third bearer response message further comprises the second security key, the second security key is generated by the first L-BM-SC when the first L-BM-SC determines that a second bearer activation request does not comprise a security key, and is sent by the first L-BM-SC to the MCE, and the second bearer activation request does not comprise a security key when the GCS AS determines that the first L-BM-SC generates a security key.

17. The group communication apparatus according to claim 13, wherein the first bearer response message further comprises a second group identity, the third bearer response message further comprises the second group identity, the second group identity is used to identify a group of the UE, and the second group identity is allocated by the first L-BM-SC to the group of the UE when the first L-BM-SC determines that the second bearer activation request does not comprise a group identity, and is sent by the first L-BM-SC to the MCE.

18. The group communication apparatus according to claim 12, wherein the third bearer activation request further comprises a first security key, the first bearer activation request further comprises the first security key, and the first security key is generated by the GCS AS when the GCS AS determines that the GCS AS generates a security key.

19. The group communication apparatus according to claim 12, wherein the third bearer activation request further comprises a first group identity, the first bearer activation request further comprises the first group identity, the first group identity is used to identify a group of the UE, and the first group identity is preallocated by the original BM-SC to the group of the UE and is stored by the GCS AS.

20. The group communication apparatus according to claim 8, wherein the first L-BM-SC is obtained by moving the original broadcast/multicast service center (BM-SC) to the location of the eNB to which the UE belongs; or the first L-BM-SC is obtained by establishing a new BM-SC at the location of the eNB to which the UE belongs.

* * * * *